US012273507B2

(12) United States Patent
Chen et al.

(10) Patent No.: US 12,273,507 B2
(45) Date of Patent: *Apr. 8, 2025

(54) VIDEO PICTURE PREDICTION METHOD AND APPARATUS TO INDICATE A MAXIMUM LENGTH OF A FIRST CANDIDATE MOTION VECTOR LIST

(71) Applicant: HUAWEI TECHNOLOGIES CO., LTD., Guangdong (CN)

(72) Inventors: Huanbang Chen, Shenzhen (CN); Haitao Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,914

(22) Filed: Dec. 4, 2023

(65) Prior Publication Data

US 2024/0187571 A1 Jun. 6, 2024

Related U.S. Application Data

(63) Continuation of application No. 17/740,591, filed on May 10, 2022, now Pat. No. 12,047,559, which is a
(Continued)

(30) Foreign Application Priority Data

Oct. 29, 2018 (CN) .......................... 201811268188.2
Dec. 29, 2018 (CN) .......................... 201811642717.0

(51) Int. Cl.
*G06T 9/40* (2006.01)
*H04N 19/105* (2014.01)
(Continued)

(52) U.S. Cl.
CPC ............. *H04N 19/105* (2014.11); *G06T 9/40* (2013.01); *H04N 19/127* (2014.11);
(Continued)

(58) Field of Classification Search
CPC ....................................................... G06T 9/40
See application file for complete search history.

(56) References Cited

U.S. PATENT DOCUMENTS 9,516,314 B2 12/2016 Takehara et al.
2016/0029029 A1 1/2016 Lee et al.
(Continued)

FOREIGN PATENT DOCUMENTS

CN 103563384 A 2/2014
CN 105163116 A 12/2015
(Continued)

OTHER PUBLICATIONS

Han Huang et al., Control-Point Representation and Differential Coding Affine-Motion Compensation. IEEE Transactions on Circuits and Systems for Video Technology, vol. 23, No. 10, Oct. 2013, 10 pages.
(Continued)

*Primary Examiner* — Young Lee
(74) *Attorney, Agent, or Firm* — WOMBLE BOND DICKINSON (US) LLP

(57) ABSTRACT

A video picture prediction method and apparatus are provided, to provide a manner of determining a maximum length of a candidate motion vector list corresponding to a subblock merge mode. The method includes: parsing a first indicator from a bitstream; if the first indicator indicates that a candidate mode used to inter predict the to-be-processed block includes an affine mode, parsing a second indicator from the bitstream, where the second indicator is used to indicate a maximum length of a first candidate motion vector
(Continued)

list, and the first candidate motion vector list is constructed for the to-be-processed block, a subblock merge prediction mode is used for the to-be-processed block; and determining the maximum length of the first candidate motion vector list based on the second indicator.

18 Claims, 18 Drawing Sheets

Related U.S. Application Data continuation of application No. 17/242,545, filed on Apr. 28, 2021, now Pat. No. 11,438,578, which is a continuation of application No. PCT/CN2019/112749, filed on Oct. 23, 2019.

(51) Int. Cl.
| | |
|---|---|
| H04N 19/127 | (2014.01) |
| H04N 19/159 | (2014.01) |
| H04N 19/176 | (2014.01) |
| H04N 19/46 | (2014.01) |

(52) U.S. Cl.
CPC ......... *H04N 19/159* (2014.11); *H04N 19/176* (2014.11); *H04N 19/46* (2014.11)

(56) References Cited

U.S. PATENT DOCUMENTS

| | | | |
|---|---|---|---|
| 2017/0214932 | A1 | 7/2017 | Huang |
| 2017/0332095 | A1 | 11/2017 | Zou et al. |
| 2018/0310017 | A1 | 10/2018 | Chen et al. |

FOREIGN PATENT DOCUMENTS

| | | | |
|---|---|---|---|
| CN | 107071488 | A | 8/2017 |
| CN | 107113424 | A | 8/2017 |
| CN | 108432250 | A | 8/2018 |
| EP | 3331242 | A1 | 6/2018 |
| JP | 2016026435 | A | 2/2016 |
| KR | 20140089487 | A | 7/2014 |
| RU | 2639647 | C2 | 12/2017 |
| TW | 201739252 | A | 11/2017 |
| WO | 2012116212 | A1 | 8/2012 |
| WO | 2016008408 | A1 | 1/2016 |
| WO | 2017054630 | A1 | 4/2017 |
| WO | 2020085800 | A1 | 4/2020 |

OTHER PUBLICATIONS

ITU-T H.261 (03/93), Line Transmission of Non-Telephone Signals, Video Codec for Audiovisual Services at p x 64 kbits, total 29 pages.
Vivienne Sze et al., High Efficiency Video Coding(HEVC)—Algorithms and Architectures. Integrated Circuits and Systems, Jul. 2014, 384 pages.
ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.
ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Document: JVET-K1001-v7, Benjamin Bross et al, Versatile Video Coding (Draft 2), Joint Video Experts Team (JVET) of ITU-T SG 16 WP 3 and ISO/IEC JTC 1/SC 29/WG 11, 11th Meeting: Ljubljana, SI, Jul. 10-18, 2018, total 147 pages.
Frank Bossen: VVC VTM reference software (VTM 3.0rc1) file: source/Lib/DecoderLib/VLCReader.cpp Nov. 9, 2018 (Nov. 9, 2018) XP055852041 total:43pages.
Document: JVET-L1001-v9, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 235 pages.
Ting Fu, Huanbang Chen, Haitao Yang, and Jianle Chen, Non-CE4: separate merge candidate list for sub-block modes, Joint Video Experts Team (JVET) of ITU-T SG 16 WP 3 and ISO/IEC JTC 1/SC 29/WG 11, JVET-K0364-v3, 11th Meeting: Ljubljana, SI, Jul. 2018, pp. 1-5.
Benjamin Bross, Jianle Chen, and Shan Liu, Versatile Video Coding (Draft 2), Joint Video Experts Team (JVET) of ITU-T SG 16 WP3 and ISO/IEC JTC 1/SC 29/WG 11, JVET-K1001-v6, 11th Meeting: Ljubljana, SI, Sep. 2018, pp. 25,41-42.
Xiaozhong Xu, Xiang Li, and Shan Liu, CE2/4-related: Unified merge list size for block and sub-block merge modes, Joint Video Exploration Team (JVET) of ITU-T SG 16 WP 3 and ISO/IEC JTC 1/SC 29/WG 11, JVET-M0406-v1, JVET-M0406-v1, Jan. 2019, pp. 1-4.
Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v6, 141 pages.
Chen et al., "CE4: Separate list for sub-block merge candidates (Test 4.2.8)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0369-v2, 5 pages.
JVET-L1001-v5, Benjamin Bross et al., Versatile Video Coding (Draft 3), Joint Video Experts Team (JVET) of ITU-T SG 16 WP 3 and ISO/IEC JTC 1/SC 29/WG 11, 12th Meeting: Macao, CN, 3 Oct. 12, 2018, 192 pages.
Frank Bossen: "VVC VTM reference software (VTM-3.0rc1)—file:source/Lib/DecoderLib/VLCReader.cpp", Nov. 9, 2018 (Nov. 9, 2018), XP055852041, Retrieved from the Internet [retrieved on 20211018]total:68pages.
Zhou Yun et al.,"Study on the Development of Video Coding Standard VVC",2018,total:6pages.
Minjie Yang et al.,"Research on Intra and Inter Prediction Techniques in Video Coding",May 16, 2018,total:85 pages.
Han Huang et al,"Control-Point Representation and Differential Coding Affine-Motion Compensation",IEEE Transactions on Cirtuits and Systems for Video Technology Dec. 2013.total 11 pages.
Shen yan-fei et al,"High Efficiency Video Coding",Chineses Journal of Computers,vol. 36 No. 11,Nov. 2013, with English abstract total 16 pages.

VIDEO PICTURE PREDICTION METHOD AND APPARATUS TO INDICATE A MAXIMUM LENGTH OF A FIRST CANDIDATE MOTION VECTOR LIST

CROSS-REFERENCE TO RELATED APPLICATIONS

This application is a continuation of U.S. patent application Ser. No. 17/740,591, filed on May 10, 2020, which is a continuation of U.S. patent application Ser. No. 17/242,545, filed on Apr. 28, 2021, now U.S. Pat. No. 11,438,578, which is a continuation of International Application No. PCT/CN2019/112749, filed on Oct. 23, 2019, which claims priority to Chinese Patent Application No. 201811268188.2, filed on Oct. 29, 2018 and Chinese Patent Application No. 201811642717.0, filed on Dec. 29, 2018. All of the aforementioned patent applications are hereby incorporated by reference in their entireties.

TECHNICAL FIELD

This application relates to the field of picture coding technologies, and in particular, to a video picture prediction method and apparatus.

BACKGROUND

With development of information technologies, video services such as high definition television, web conferencing, IPTV, and 3D television rapidly develop. Because of advantages such as intuitiveness and high efficiency, video signals become a main information obtaining manner in people's daily life. The video signals comprise a large amount of data, and therefore occupy a large amount of transmission bandwidth and storage space. To effectively transmit and store the video signals, compression coding needs to be performed on the video signals. A video compression technology has gradually become an indispensable key technology in the field of video application.

A basic principle of video coding compression is to maximally reduce redundancy by using correlations between a space domain, a time domain, and a codeword. Currently, a prevalent method is to implement video coding compression by using a picture block based hybrid video coding framework and by performing operations such as prediction (including intra prediction and inter prediction), transform, quantization, and entropy encoding.

In various video encoding/decoding solutions, motion estimation/motion compensation in inter prediction is a key technology that affects encoding/decoding performance. In existing inter prediction, subblock-based merging motion vector prediction is added based on block-based motion compensation (MC) prediction in which a translational motion model is used. In the existing technology, there is no feasible manner of determining a maximum length of a candidate motion vector list corresponding to a subblock merge mode.

SUMMARY

This application provides a video picture prediction method and apparatus, to provide a manner of determining a maximum length of a candidate motion vector list in a subblock merge mode.

According to a first aspect, an embodiment of this application provides a video picture prediction method, including:

parsing a first indicator (for example, sps_affine_enable_flag) from a bitstream; when the first indicator indicates that a candidate mode used to inter predict a to-be-processed block comprises an affine mode, parsing a second indicator (for example, five_minus_max_num_subblock_merge_cand or six_minus_max_num_subblock_merge_cand) from the bitstream, where the second indicator is used to indicate a maximum length of a first candidate motion vector list, and the first candidate motion vector list is a candidate motion vector list constructed for the to-be-processed block, a subblock merge prediction mode is used for the to-be-processed block; and determining the maximum length of the first candidate motion vector list based on the second indicator.

The foregoing method provides a manner of determining a maximum length of a candidate motion vector list in the subblock merge mode. This is simple and easy to implement.

In an embodiment, before the determining the maximum length of the first candidate motion vector list based on the second indicator, the method further comprises: parsing a third indicator (for example, sps_sbtmvp_enabled_flag) from the bitstream, where the third indicator is used to indicate a presence state of an advanced temporal motion vector prediction mode in the subblock merge prediction mode.

In an embodiment, the subblock merge prediction mode comprises at least one of a planar motion vector prediction mode, the advanced temporal motion vector prediction mode, or the affine mode; and when the third indicator indicates that the advanced temporal motion vector prediction mode is not present in the subblock merge prediction mode, the determining the maximum length of the first candidate motion vector list based on the second indicator comprises: determining a first number based on the third indicator, and determining the maximum length of the first candidate motion vector list based on the second indicator and the first number.

For example, when sps_sbtmvp_enabled_flag=0, it indicates that the advanced temporal motion vector prediction mode is not present in the subblock merge prediction mode. For example, the first number is equal to the number of motion vectors that are supported in prediction performed by using the advanced temporal motion vector prediction mode. When sps_sbtmvp_enabled_flag=0, the first number is equal to the number of motion vectors that are supported in prediction performed by using the advanced temporal motion vector prediction mode.

In an embodiment, before the determining the maximum length of the first candidate motion vector list based on the second indicator, the method further comprises: parsing a fourth indicator (for example, sps_planar_enabled_flag) from the bitstream, where the fourth indicator is used to indicate a presence state of the planar motion vector prediction mode in the subblock merge prediction mode.

In an embodiment, when the third indicator indicates that the advanced temporal motion vector prediction mode is present in the subblock merge prediction mode, and the fourth indicator indicates that the planar motion vector prediction mode is not present in the subblock merge prediction mode, the determining the maximum length of the first candidate motion vector list based on the second indicator comprises: determining a second number based on the fourth indicator, and determining the maximum length of the first candidate motion vector list based on the second indicator and the second number.

For example, when sps_planar_enabled_flag=0, it indicates that the planar motion vector prediction mode is not present in the subblock merge prediction mode. For example, the second number is equal to the number of motion vectors that are supported in prediction performed by using the planar motion vector prediction mode.

In an embodiment, when the third indicator indicates that the advanced temporal motion vector prediction mode is not present in the subblock merge prediction mode, and the fourth indicator indicates that the planar motion vector prediction mode is present in the subblock merge prediction mode, the determining the maximum length of the first candidate motion vector list based on the second indicator comprises: determining the maximum length of the first candidate motion vector list based on the second indicator and the first number.

In an embodiment, when the third indicator indicates that the advanced temporal motion vector prediction mode is not present in the subblock merge prediction mode, and the fourth indicator indicates that the planar motion vector prediction mode is not present in the subblock merge prediction mode, the determining the maximum length of the first candidate motion vector list based on the second indicator comprises: determining the maximum length of the first candidate motion vector list based on the second indicator, the first number, and the second number.

In an embodiment, the maximum length of the first candidate motion vector list is obtained according to the following formula:

$$MaxNumSubblockMergeCand = K - K\_minus\_max\_num\_subblock\_merge\_cand,$$

where MaxNumSubblockMergeCand represents the maximum length of the first candidate motion vector list, K_minus_max_num_subblock_merge_cand represents the second indicator, and K is a preset non-negative integer.

In an embodiment, when the maximum length of the first candidate motion vector list is determined based on the second indicator and the first number, the maximum length of the first candidate motion vector list is obtained according to the following formula:

$$MaxNumSubblockMergeCand = K - K\_minus\_max\_num\_subblock\_merge\_cand - L1,$$

where MaxNumSubblockMergeCand represents the maximum length of the first candidate motion vector list, K_minus_max_num_subblock_merge_cand represents the second indicator, L1 represents the first number, and K is a preset non-negative integer.

In an embodiment, when the maximum length of the first candidate motion vector list is determined based on the second indicator and the second number, the maximum length of the first candidate motion vector list is obtained according to the following formula:

$$MaxNumSubblockMergeCand = K - K\_minus\_max\_num\_subblock\_merge\_cand - L2,$$

where MaxNumSubblockMergeCand represents the maximum length of the first candidate motion vector list, K_minus_max_num_subblock_merge_cand represents the second indicator, L2 represents the second number, and K is a preset non-negative integer.

In an embodiment, when the maximum length of the first candidate motion vector list is determined based on the second indicator, the first number, and the second number, the maximum length of the first candidate motion vector list is obtained according to the following formula: MaxNumSubblockMergeCand=K−K_minus_max_num_subblock_merge_cand−L1−L2, where MaxNumSubblockMergeCand represents the maximum length of the first candidate motion vector list, K_minus_max_num_subblock_merge_cand represents the second indicator, L1 represents the first number, L2 represents the second number, and K is a preset non-negative integer.

In an embodiment, the parsing a second indicator from the bitstream comprises:
parsing the second indicator from a sequence parameter set in the bitstream, or parsing the second indicator from a slice header of a slice in the bitstream, the to-be-processed block is comprised in the slice.

In an embodiment, the method further comprises: when the first indicator indicates that the candidate mode used to inter predict the to-be-processed block only comprises the translational motion vector prediction mode, and the third indicator (for example, sps_sbtmvp_enabled_flag) indicates that the advanced temporal motion vector prediction mode is present in the subblock merge prediction mode, determining a third number based on the third indicator, and determining the maximum length of the first candidate motion vector list based on the third number. For example, when sps_sbtmvp_enabled_flag=1, it indicates that the advanced temporal motion vector prediction mode is present in the subblock merge prediction mode. The third number is equal to the number of motion vectors that are supported in prediction performed by using the advanced temporal motion vector prediction mode. For example, the maximum length of the first candidate motion vector list is equal to the third number.

In an embodiment, when the fourth indicator (for example, sps_planar_enabled_flag) indicates that the planar motion vector prediction mode is present in the subblock merge prediction mode, the determining the maximum length of the first candidate motion vector list based on the first number comprises: determining a fourth number based on the fourth indicator, and determining the maximum length of the first candidate motion vector list based on the third number and the fourth number. For example, the maximum length of the first candidate motion vector list is equal to a sum of the third number and the fourth number.

For example, when sps_planar_enabled_flag=1, it indicates that the planar motion vector prediction mode is present in the subblock merge prediction mode. The fourth number is equal to the number of motion vectors that are supported in prediction performed by using the planar motion vector list.

In an embodiment, the method further comprises: when the first indicator indicates that the candidate mode used to inter predict the to-be-processed block only comprises the translational motion vector prediction mode, the third indicator indicates that the advanced temporal motion vector prediction mode is not present in the subblock merge prediction mode, and the fourth indicator indicates that the planar motion vector prediction mode is present in the subblock merge prediction mode, determining a fourth number based on the fourth indicator, and determining the maximum length of the first candidate motion vector list based on the fourth number. For example, the maximum length of the first candidate motion vector list is equal to the fourth number.

In an embodiment, when the first indicator indicates that the candidate mode used to inter predict the to-be-processed block only comprises the translational motion vector prediction mode, and the third indicator indicates that the advanced temporal motion vector prediction mode is not present in the subblock merge prediction mode, the maximum length of the first candidate motion vector list is zero.

In an embodiment, when the first indicator indicates that the candidate mode used to inter predict the to-be-processed block only comprises the translational motion vector prediction mode, the third indicator indicates that the advanced temporal motion vector prediction mode is not present in the subblock merge prediction mode, and the fourth indicator indicates that the planar motion vector prediction mode is not present in the subblock merge prediction mode, the maximum length of the first candidate motion vector list is zero.

In an embodiment, the third indicator is equal to a first value, and the first number is equal to 1.

In an embodiment, the fourth indicator is equal to a third value, and the second number is equal to 1.

In an embodiment, the third indicator is equal to a second value, and the third number is equal to 1.

In an embodiment, the fourth indicator is equal to a fourth value, and the fourth number is equal to 1.

According to a second aspect, an embodiment of this application provides a video picture prediction apparatus, including:

a parsing unit, configured to: parse a first indicator from a bitstream; and when the first indicator indicates that a candidate mode used to inter predict the to-be-processed block comprises an affine mode, parse a second indicator from the bitstream, where the second indicator is used to indicate a maximum length of a first candidate motion vector list, and the first candidate motion vector list is a candidate motion vector list constructed for the to-be-processed block, a subblock merge prediction mode is used for the to-be-processed block; and a determining unit, configured to determine the maximum length of the first candidate motion vector list based on the second indicator.

In an embodiment, the parsing unit is further configured to parse a third indicator from the bitstream before the maximum length of the first candidate motion vector list is determined based on the second indicator, where the third indicator is used to indicate a presence state of an advanced temporal motion vector prediction mode in the subblock merge prediction mode.

In an embodiment, the subblock merge prediction mode comprises at least one of a planar motion vector prediction mode, the advanced temporal motion vector prediction mode, or the affine mode; and when the third indicator indicates that the advanced temporal motion vector prediction mode is not present in the subblock merge prediction mode, the determining unit is specifically configured to:

determine a first number based on the third indicator, and
determine the maximum length of the first candidate motion vector list based on the second indicator and the first number.

In an embodiment, before the maximum length of the first candidate motion vector list is determined based on the second indicator, the parsing unit is further configured to: parse a fourth indicator from the bitstream, where the fourth indicator is used to indicate a presence state of the planar motion vector prediction mode in the subblock merge prediction mode.

In an embodiment, when the third indicator indicates that the advanced temporal motion vector prediction mode is present in the subblock merge prediction mode, and the fourth indicator indicates that the planar motion vector prediction mode is not present in the subblock merge prediction mode, the determining unit is specifically configured to:

determine a second number based on the fourth indicator, and
determine the maximum length of the first candidate motion vector list based on the second indicator and the second number.

In an embodiment, when the third indicator indicates that the advanced temporal motion vector prediction mode is not present in the subblock merge prediction mode, and the fourth indicator indicates that the planar motion vector prediction mode is present in the subblock merge prediction mode, the determining unit is specifically configured to:

determine the maximum length of the first candidate motion vector list based on the second indicator and the first number.

In an embodiment, when the third indicator indicates that the advanced temporal motion vector prediction mode is not present in the subblock merge prediction mode, and the fourth indicator indicates that the planar motion vector prediction mode is not present in the subblock merge prediction mode, the determining unit is specifically configured to:

determine the maximum length of the first candidate motion vector list based on the second indicator, the first number, and the second number.

In an embodiment, the maximum length of the first candidate motion vector list is obtained according to the following formula:

$$MaxNumSubblockMergeCand = K - K\_minus\_max\_num\_subblock\_merge\_cand,$$

where MaxNumSubblockMergeCand represents the maximum length of the first candidate motion vector list, K_minus_max_num_subblock_merge_cand represents the second indicator, and K is a preset non-negative integer.

In an embodiment, the maximum length of the first candidate motion vector list is obtained according to the following formula:

$$MaxNumSubblockMergeCand = K - K\_minus\_max\_num\_subblock\_merge\_cand - L1,$$

where MaxNumSubblockMergeCand represents the maximum length of the first candidate motion vector list, K_minus_max_num_subblock_merge_cand represents the second indicator, L1 represents the first number, and K is a preset non-negative integer.

In an embodiment, the maximum length of the first candidate motion vector list is obtained according to the following formula:

$$MaxNumSubblockMergeCand = K - K\_minus\_max\_num\_subblock\_merge\_cand - L2,$$

where MaxNumSubblockMergeCand represents the maximum length of the first candidate motion vector list, K_minus_max_num_subblock_merge_cand represents the second indicator, L2 represents the second number, and K is a preset non-negative integer.

In an embodiment, the maximum length of the first candidate motion vector list is obtained according to the following formula:

$$MaxNumSubblockMergeCand = K - K\_minus\_max\_num\_subblock\_merge\_cand - L1 - L2,$$

where MaxNumSubblockMergeCand represents the maximum length of the first candidate motion vector list, K_minus_max_num_subblock_merge_cand represents the second indicator, L1 represents the first number, L2 represents the second number, and K is a preset non-negative integer.

In an embodiment, when parsing the second indicator from the bitstream, the parsing unit is specifically configured to:
parse the second indicator from a sequence parameter set in the bitstream, or parse the second indicator from a slice header of a slice in the bitstream, the to-be-processed block is comprised in the slice.

In an embodiment, when the first indicator indicates that the candidate mode used to inter predict the to-be-processed block only comprises the translational motion vector prediction mode, and the third indicator indicates that the advanced temporal motion vector prediction mode is present in the subblock merge prediction mode, the determining unit is further configured to: determine a third number based on the third indicator, and determine the maximum length of the first candidate motion vector list based on the third number.

In an embodiment, when the fourth indicator indicates that the planar motion vector prediction mode is present in the subblock merge prediction mode, when determining the maximum length of the first candidate motion vector list based on the first number, the determining unit is specifically configured to:
determine a fourth number based on the fourth indicator, and
determine the maximum length of the first candidate motion vector list based on the first number and the fourth number.

In an embodiment, when the first indicator indicates that the candidate mode used to inter predict the to-be-processed block only comprises the translational motion vector prediction mode, the third indicator indicates that the advanced temporal motion vector prediction mode is not present in the subblock merge prediction mode, and the fourth indicator indicates that the planar motion vector prediction mode is present in the subblock merge prediction mode, the determining unit is further configured to: determine a fourth number based on the fourth indicator, and determine the maximum length of the first candidate motion vector list based on the fourth number.

In an embodiment, when the first indicator indicates that the candidate mode used to inter predict the to-be-processed block only comprises the translational motion vector prediction mode, and the third indicator indicates that the advanced temporal motion vector prediction mode is not present in the subblock merge prediction mode, the maximum length of the first candidate motion vector list is zero.

In an embodiment, when the first indicator indicates that the candidate mode used to inter predict the to-be-processed block only comprises the translational motion vector prediction mode, the third indicator indicates that the advanced temporal motion vector prediction mode is not present in the subblock merge prediction mode, and the fourth indicator indicates that the planar motion vector prediction mode is not present in the subblock merge prediction mode, the maximum length of the first candidate motion vector list is zero.

In an embodiment, the maximum length of the first candidate motion vector list is equal to the third number.

In an embodiment, the maximum length of the first candidate motion vector list is equal to a sum of the third number and the fourth number.

In an embodiment, the maximum length of the first candidate motion vector list is equal to the fourth number.

In an embodiment, the third indicator is equal to a first value, and the first number is equal to 1.

In an embodiment, the fourth indicator is equal to a third value, and the second number is equal to 1.

In an embodiment, the third indicator is equal to a second value, and the third number is equal to 1.

In an embodiment, the fourth indicator is equal to a fourth value, and the fourth number is equal to 1.

According to a third aspect, an embodiment of this application provides an apparatus. The apparatus may be a decoder and comprises a processor and a memory. The memory is configured to store an instruction. When the apparatus runs, the processor executes the instruction stored in the memory, to enable the apparatus to perform the method according to any one of the first aspect or the designs of the first aspect. It should be noted that the memory may be integrated into the processor, or may be independent of the processor.

According to a fourth aspect, an embodiment of this application provides a video picture prediction method, used on an encoder side, and including:
encoding a first indicator in a bitstream; and
when the first indicator indicates that a candidate mode used to inter predict the to-be-processed block comprises an affine mode, encoding a second indicator in the bitstream, where the second indicator is used to indicate a maximum length of a first candidate motion vector list, and the first candidate motion vector list is a candidate motion vector list constructed for the to-be-processed block, a subblock merge prediction mode is used for the to-be-processed block.

According to a fifth aspect, an embodiment of this application provides a video picture prediction apparatus. The apparatus may be an encoder and comprises a processor and a memory. The memory is configured to store an instruction. When the apparatus runs, the processor executes the instruction stored in the memory, to enable the apparatus to perform the method according to the fourth aspect. It should be noted that the memory may be integrated into the processor, or may be independent of the processor.

According to a sixth aspect of this application, a computer-readable storage medium is provided. The computer-readable storage medium stores an instruction. When the instruction is run on a computer, the computer is enabled to perform the method according to each of the foregoing aspects.

According to a seventh aspect of this application, a computer program product including an instruction is provided. When the computer program product runs on a computer, the computer is enabled to perform the method according to each of the foregoing aspects.

It should be understood that technical solutions described in the second aspect to the seventh aspect of this application are consistent with technical solutions described in the first aspect of this application, and beneficial effects achieved in all the aspects and corresponding implementation designs are similar. Therefore, details are not described again.

Figure 1A:
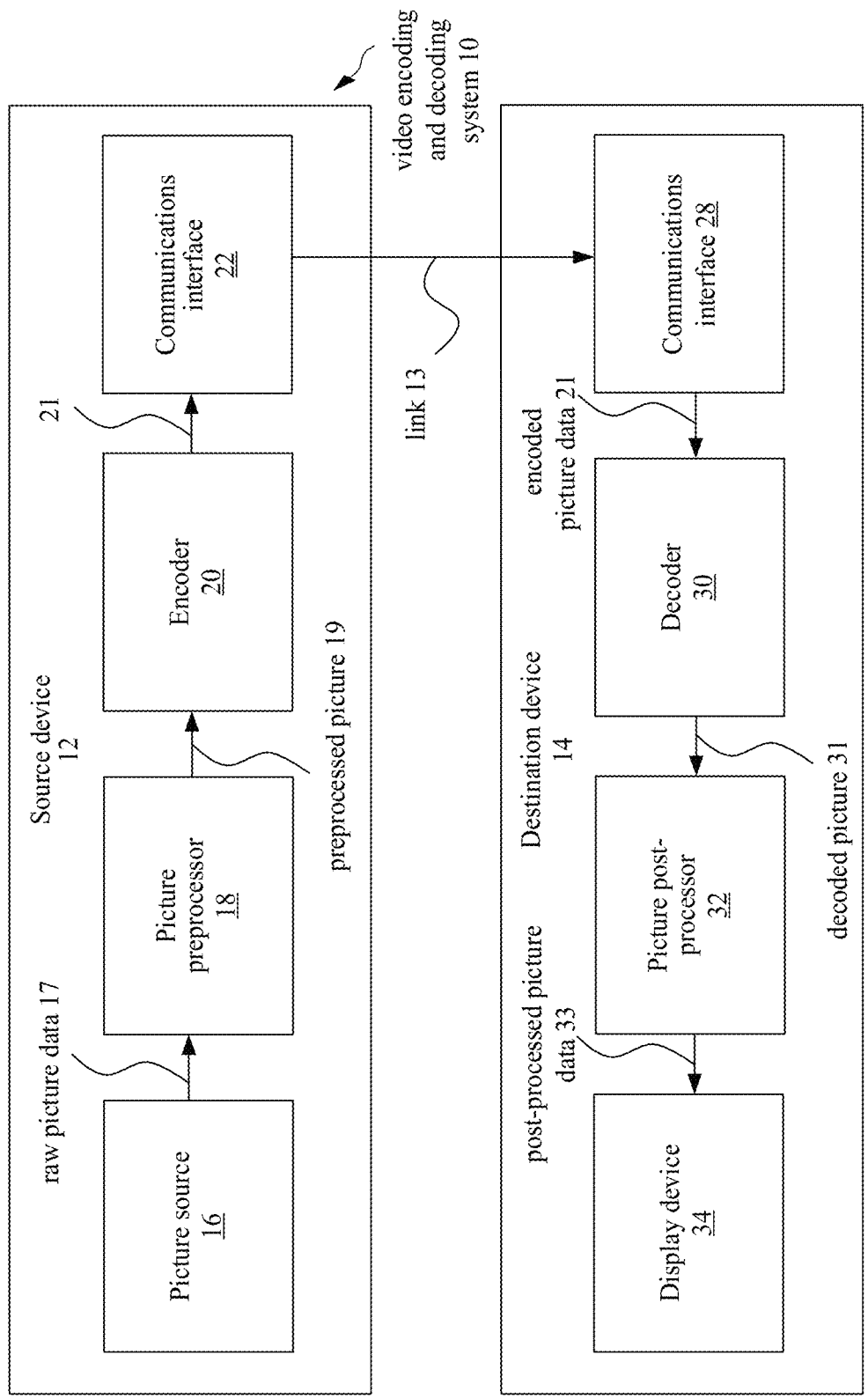
FIG. 1A is a block diagram of an example of a video encoding and decoding system 10 for implementing embodiments of this application.

Reference numerals: 10—system; 13—link; 17—raw picture data; 19—preprocessed picture data; 21—encoded picture data; 31—decoded picture data; 33—post-processed picture data; 530—memory; 535—application program; and 550—bus system.

DESCRIPTION OF EMBODIMENTS

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in other aspects, and may comprise structural or logical changes not depicted in the accompanying drawings. Therefore, the following detailed descriptions shall not be taken in a limiting sense, and the scope of this application is defined by the appended claims. For example, it should be understood that a disclosure in connection with a described method may also hold true for a corresponding device or system configured to perform the method and vice versa. For example, if one or more specific method operations are described, a corresponding device may comprise one or more units such as functional units, to perform the described one or more method operations (for example, one unit performing the one or more operations; or a plurality of units each performing one or more of the plurality of operations), even if such one or more units are not explicitly described or illustrated in the accompanying drawings. On the other hand, for example, if a specific apparatus is described based on one or more units such as functional units, a corresponding method may comprise one operation used to perform functionality of the one or more units (for example, one operation used to perform the functionality of the one or more units, or a plurality of operations each used to perform functionality of one or more of a plurality of units), even if such one or more operations are not explicitly described or illustrated in the accompanying drawings. Further, it should be understood that features of the various example embodiments and/or aspects described in this specification may be combined with each other, unless specifically noted otherwise.

The technical solutions in the embodiments of this application are not only applicable to an existing video coding standard (for example, the standard such as H.264 or HEVC), but also applicable to a future video coding standard (for example, the H.266 standard). Terms used in this application are only used to explain specific embodiments of this application, but are not intended to limit this application. The following first briefly describes related concepts in the embodiments of this application.

Video coding usually refers to processing of a sequence of pictures that form a video or a video sequence. The term "picture", "frame", or "image" may be used as synonyms in the field of video coding. Video coding in this specification represents video encoding or video decoding. Video coding is performed at a source side, and usually comprises processing (for example, by compression) an original video picture to reduce an amount of data required for representing the video picture, for more efficient storage and/or transmission. Video decoding is performed at a destination side, and usually comprises inverse processing compared to an encoder to reconstruct a video picture. "Coding" of a video picture in the embodiments should be understood as "encoding" or "decoding" of a video sequence. A combination of an encoding part and a decoding part is also referred to as codec (encoding and decoding).

A video sequence comprises a series of pictures, a picture is further split into slices, and a slice is further split into blocks. Video coding processing is performed by block. In some new video coding standards, a concept of block is further extended. For example, a macroblock (MB) is introduced in the H.264 standard. The macroblock may be further split into a plurality of prediction blocks (partitions) that can be used for predictive coding. In the high efficiency video coding (HEVC) standard, basic concepts such as coding unit (CU), prediction unit (PU), and transform unit (TU) are used. A plurality of block units are obtained through functional split, and are described by using a new tree-based structure. For example, a CU may be split into smaller CUs based on a quadtree, and the smaller CU may be further split, to generate a quadtree structure. The CU is a basic unit used for splitting and encoding a coded picture. A PU and a TU also have similar tree structures. The PU may correspond to a prediction block, and is a basic unit used for predictive coding. The CU is further split into a plurality of PUs based on a splitting pattern. The TU may correspond to a transform block, and is a basic unit used for transforming a prediction residual. However, in essence, all of the CU, the PU, and the TU are conceptually blocks (or picture blocks).

For example, in HEVC, a CTU is split into a plurality of CUs by using a quadtree structure represented as a coding tree. A decision on whether to encode a picture area by using inter-picture (temporal) or intra-picture (spatial) prediction is made at a CU level. Each CU may be further split into one, two, or four PUs based on a PU splitting pattern. Inside one PU, a same prediction process is applied, and related information is transmitted to a decoder on a PU basis. After obtaining a residual block by applying the prediction process based on the PU splitting pattern, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, a current block is a block currently being encoded; and in decoding, a current block is a block currently being decoded. A decoded picture block, in a reference picture, used to predict a current block is referred to as a reference block. In other words, a reference block is a block that provides a reference signal for a current block. The reference signal represents a pixel value in the picture block. A block that provides a prediction signal for a current block in a reference picture may be referred to as a prediction block. The prediction signal represents a pixel value, a sampling value, or a sampling signal in the prediction block. For example, after traversing a plurality of reference blocks, an optimal reference block is found, and the optimal reference block provides prediction for the current block, and this block is referred to as a prediction block.

In a case of lossless video coding, original video pictures can be reconstructed. That is, reconstructed video pictures have same quality as the original video pictures (assuming that no transmission loss or other data loss is caused during storage or transmission). In a case of lossy video coding, further compression is performed through, for example, quantization, to reduce an amount of data required for representing video pictures, and the video pictures cannot be completely reconstructed at a decoder side. That is, quality of reconstructed video pictures is lower or worse than quality of the original video pictures.

Several H.261 video coding standards are for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, at an encoder side, a video is usually processed, that is, encoded, at a block (video block) level. For example, a prediction block is generated through spatial (intra-picture) prediction and temporal (inter-picture) prediction, the prediction block is subtracted from a current block (a block currently being processed or to be processed) to obtain a residual block, and the residual block is transformed and quantized in the transform domain to reduce an amount of data that is to be transmitted (compressed). At a decoder side, inverse processing compared to the encoder is performed on the encoded or compressed block to reconstruct the current block for representation. Furthermore, the encoder duplicates a decoder processing loop, so that the encoder and the decoder generate same predictions (for example, intra prediction and inter prediction) and/or reconstruction for processing, that is, for coding a subsequent block.

The following describes a system architecture used in the embodiments of this application. FIG. 1A is a schematic block diagram of an example of a video encoding and decoding system 10 used in the embodiments of this application. As shown in FIG. 1A, the video encoding and decoding system 10 may comprise a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may comprise one or more processors and a memory coupled to the one or more processors. The memory may comprise but is not limited to a RAM, a ROM, an EEPROM, a flash memory, or any other medium that can be used to store desired program code in a form of an instruction or a data structure accessible to a computer, as described in this specification. The source device 12 and the destination device 14 may comprise various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively comprise both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded video data from the source device 12 over the link 13. The link 13 may comprise one or more media or apparatuses that can transfer the encoded video data from the source device 12 to the destination device 14. In an example, the link 13 may comprise one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may comprise a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may comprise a router, a switch, a base station, or another device that facilitates communication from the source device 12 to the destination device 14.

The source device 12 comprises an encoder 20. Optionally, the source device 12 may further comprise a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows:

The picture source 16 may comprise or may be any type of picture capturing device configured to, for example, capture a real-world picture; and/or any type of device for generating a picture or a comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further comprise any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 comprises an interface, the interface may be, for example, an external interface for receiving a picture from an external video source. The external video source is, for example, an external picture capturing device such as a camera, an external memory, or an external picture generating device. The external picture generating device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of pixel elements. The pixel element in the array may also be referred to as a sample. A quantity of samples in horizontal and vertical directions (or axes) of the array or the picture defines a size and/or resolution of the picture. For representation of color, three color components are usually employed, to be specific, the picture may be represented as or comprise three sample arrays. For example, in an RBG format or a color space, a picture comprises corresponding red, green, and blue sample arrays. However, in video coding, each pixel is usually represented in a luminance/chrominance format or a color space. For example, a picture in a YUV format comprises a luminance component indicated by Y (sometimes indicated by L instead) and two chrominance components indicated by U and V. The luminance (luma) component Y represents brightness or gray level intensity (for example, both are the same in a grayscale picture), and the two chrominance (chroma) components U and V represent chrominance or color information components. Correspondingly, the picture in the YUV format comprises a luminance sample array of luminance sample values (Y) and two chrominance sample arrays of chrominance values (U and V). Pictures in an RGB format may be transformed or converted to a YUV format and vice versa. This process is also referred to as color conversion or transformation. If a picture is monochrome, the picture may comprise only a luminance sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may comprise trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 by using a related prediction mode (for example, a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform each embodiment described below, to implement encoder-side application of a chroma block prediction method described in this application.

The communications interface 22 may be configured to receive the encoded picture data 21, and transmit the encoded picture data 21 to the destination device 14 or any other device (for example, a memory) over the link 13, for storage or direct reconstruction. The another device may be any device used for decoding or storage. The communications interface 22 may be, for example, configured to package the encoded picture data 21 into an appropriate format, for example, a data packet, for transmission over the link 13.

The destination device 14 comprises a decoder 30. Optionally, the destination device 14 may further comprise a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network, or any combination thereof. The communications interface 28 may be, for example, configured to de-package the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (or referred to as a decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform each embodiment described below, to implement decoder-side application of a chroma block prediction method described in this application.

The picture post-processor 32 is configured to post-process the decoded picture data 31 (also referred to as reconstructed picture data) to obtain post-processed picture data 33. The post-processing performed by the picture post-processor 32 may comprise color format conversion (for example, from a YUV forma to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may comprise any type of display for presenting a reconstructed picture, for example, an integrated or external display or monitor. For example, the display may comprise a liquid crystal display (LCD), an organic light emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively comprise both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of different units or functionalities of the source device 12 and/or the destination device 14 shown in FIG. 1A may vary depending on an actual device and application. The source device 12 and the destination device 14 may comprise any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example, and the technologies of this application are applicable to video coding settings (for example, video encoding or video decoding) that do not necessarily comprise any data communication between an encoding device and a decoding device. In another example, data may be retrieved from a local memory, streamed over a network, or the like. A video encoding device may encode data and store the data to a memory, and/or a video decoding device may retrieve data from the memory and decode the data. In some examples, encoding and decoding are performed by devices that do not communicate with each other, but simply encode data to a memory and/or retrieve data from the memory and decode the data.

Figure 1B:
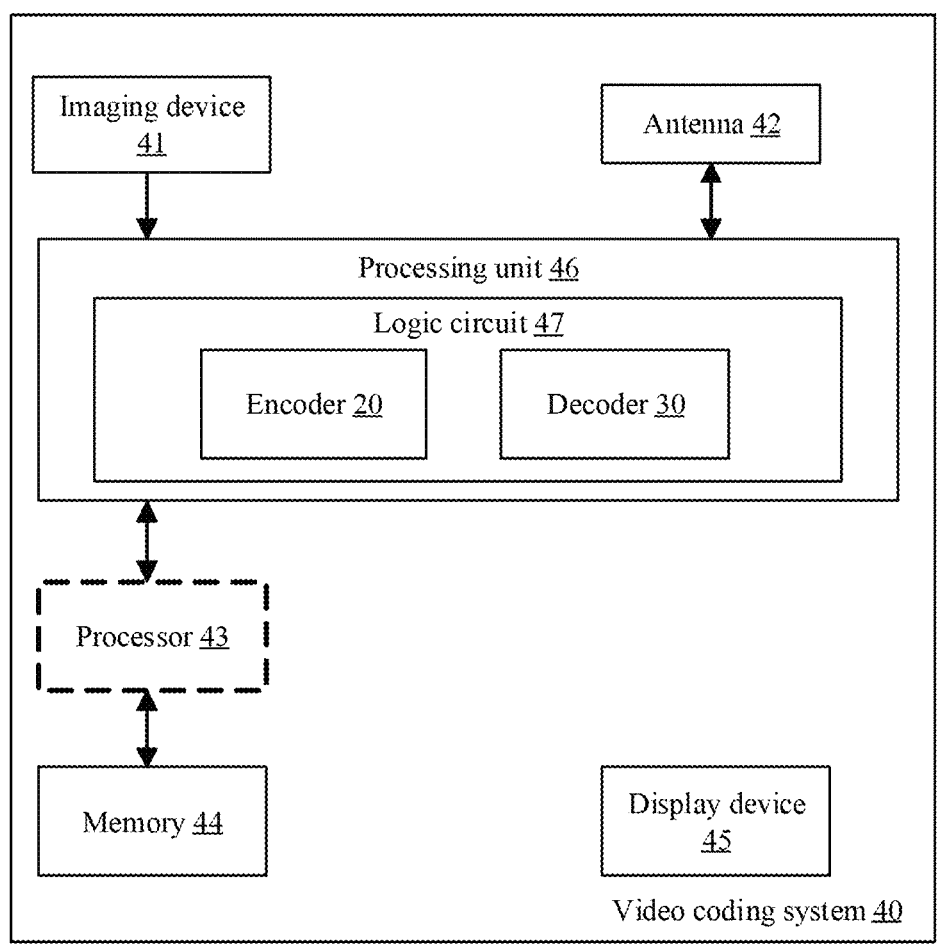
FIG. 1B is a block diagram of an example of a video coding system 40 for implementing embodiments of this application.
Figure 2:
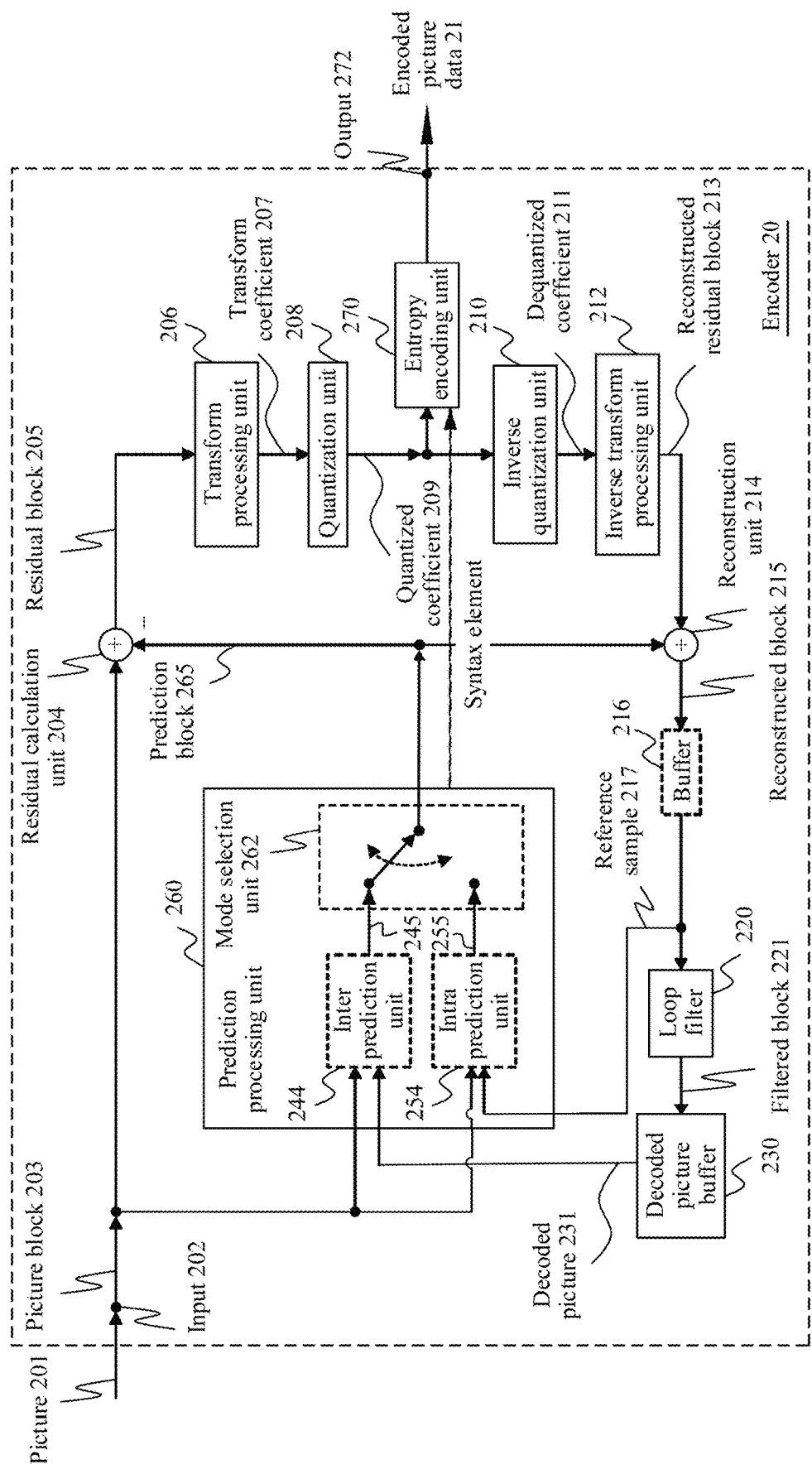
FIG. 2 is a block diagram of an example structure of an encoder 20 for implementing embodiments of this application.
Figure 3:
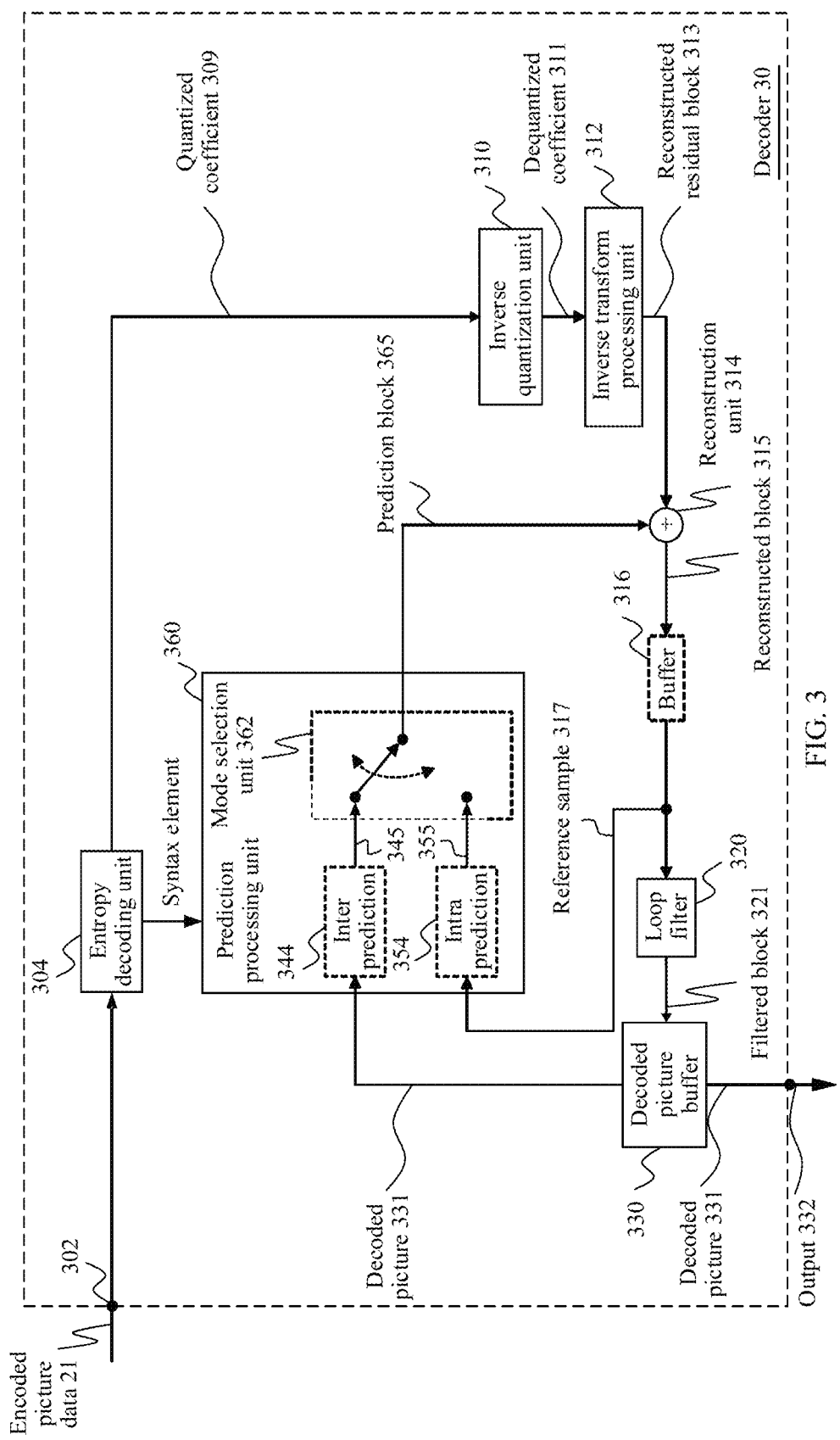
FIG. 3 is a block diagram of an example structure of a decoder 30 for implementing embodiments of this application.

FIG. 1B is a diagram illustrating an example of a video coding system 40 including the encoder 20 in FIG. 2 and/or the decoder 30 in FIG. 3 according to an example embodiment. The video coding system 40 can implement a combination of various technologies in the embodiments of this application. In an illustrated implementation, the video coding system 40 may comprise an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with both the encoder 20 and the decoder 30, in different examples, the video coding system 40 may comprise only the encoder 20 or only the decoder 30.

In some examples, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may comprise an application-specific integrated circuit (ASIC) logic, a graphics processor, a general-purpose processor, or the like. The video coding system 40 may also comprise the optional processor 43. Likewise, the optional processor 43 may comprise application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by using general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-limitative example, the memory 44 may be implemented by a cache memory. In some examples, the logic circuit 47 may access the memory 44 (for example, for implementation of a picture buffer). In other examples, the logic circuit 47 and/or the processing unit 46 may comprise a memory (for example, a cache) for implementation of a picture buffer or the like.

In some examples, the encoder 20 implemented by the logic circuit may comprise a picture buffer (for example, implemented by the processing unit 46 or the memory 44) and a graphics processing unit (for example, implemented by the processing unit 46). The graphics processing unit may be communicatively coupled to the picture buffer. The graphics processing unit may comprise the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to a decoder 30 in FIG. 3 and/or any other decoder system or subsystem described in this specification. In some examples, the decoder 30 implemented by the logic circuit may comprise a picture buffer (for example, implemented by the processing unit 2820 or the memory 44) and a graphics processing unit (for example, implemented by the processing unit 46). The graphics processing unit may be communicatively coupled to the picture buffer. The graphics processing unit may comprise the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may comprise data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further comprise the decoder 30 coupled to the antenna 42 and configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element in an encoded video bitstream. In such examples, the decoder 30 may parse the syntax element and correspondingly decode related video data.

It should be noted that a method described in the embodiments of this application is mainly used in an inter prediction process. This process is performed by both the encoder 20 and the decoder 30. The encoder 20 and the decoder 30 in the embodiments of this application may be, for example, an encoder and a decoder corresponding to a video standard protocol such as H.263, H.264, HEVC, MPEG-2, MPEG-4, VP8, or VP9, or a next-generation video standard protocol (such as H.266).

FIG. 2 is a schematic/conceptual block diagram of an example of an encoder 20 for implementing embodiments of this application. In the example in FIG. 2, the encoder 20 comprises a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may comprise an inter prediction unit 244, an intra prediction unit 254, and a mode selection unit 262. The inter prediction unit 244 may comprise a motion estimation unit and a motion compensation unit (not shown). The encoder 20 shown in FIG. 2 may also be referred to as a hybrid video encoder or a video encoder according to a hybrid video codec.

For example, the residual calculation unit 204, the transform processing unit 206, the quantization unit 208, the prediction processing unit 260, and the entropy encoding unit 270 form a forward signal path of the encoder 20, while for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (referring to a decoder 30 in FIG. 3).

The encoder 20 receives, for example, via an input 202, a picture 201 or a picture block 203 of a picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (in particular in video coding to distinguish the current picture from other pictures, for example, previously encoded and/or decoded pictures of a same video sequence, that is, the video sequence which also comprises the current picture).

An embodiment of the encoder 20 may comprise a partitioning unit (which is not depicted in FIG. 2), configured to partition the picture 201 into a plurality of blocks such as picture blocks 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an example, the prediction processing unit 260 in the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may comprise, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by block. For example, encoding and prediction are performed per picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at the decoder 30 side (and a corresponding inverse transform by, for example, the inverse transform processing unit 212 at the encoder 20 side), and correspondingly, a corresponding scale factor may be specified for the forward transform by the transform processing unit 206 at the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be used to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), or vice versa. The quantization may comprise division by a quantization step size and corresponding quantization or inverse quantization, for example, performed by the inverse quantization unit 210, or may comprise multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where the loss increases with increasing of the quantization step size.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (namely, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 ("buffer" 216 for short) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are stored in the buffer unit 216 for performing any type of estimation and/or prediction, for example, intra prediction.

For example, in an embodiment, the encoder 20 may be configured so that the buffer unit 216 is configured to store the reconstructed block 215 not only used for the intra prediction unit 254 but also used for the loop filter unit 220 (which is not shown in FIG. 2), and/or so that, for example, the buffer unit 216 and the decoded picture buffer unit 230 form one buffer. In other embodiments, a filtered block 221 and/or a block or sample (which is not shown in FIG. 2) from the decoded picture buffer 230 is used as an input or a basis for the intra prediction unit 254.

The loop filter unit 220 ("loop filter" 220 for short) is configured to filter the reconstructed block 215 to obtain a filtered block 221, to smooth pixel transitions or improve video quality. The loop filter unit 220 is intended to represent one or more loop filters such as a deblocking filter, a sample-adaptive offset (SAO) filter, or other filters, for example, a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of storage devices such as a dynamic random access memory (DRAM) (including a synchronous DRAM (SDRAM), a magnetoresistive RAM (MRAM), a resistive RAM (RRAM)), or other types of storage devices. The DPB 230 and the buffer 216 may be provided by a same storage device or separate storage devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, namely, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), that is, select a prediction mode that provides a minimum rate distortion or select a prediction mode for which related rate distortion at least satisfies a prediction mode selection criterion.

The following describes in detail prediction processing (for example, performed by the prediction processing unit 260) and mode selection (for example, performed by the mode selection unit 262) that are performed by an example of the encoder 20.

As described above, the encoder 20 is configured to determine or select the best or optimal prediction mode from a set of (pre-determined) prediction modes. The set of prediction modes may comprise, for example, an intra prediction mode and/or an inter prediction mode.

A set of intra prediction modes may comprise 35 different intra prediction modes, for example, non-directional modes such as a DC (or average) mode and a planar mode, or directional modes such as those defined in H.265, or may comprise 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least partially decoded pictures stored in the DBP 230, as described above) and other inter prediction parameters, for example, depends on whether an entire reference picture or only a part of a reference picture, for example, a search window area around an area of a current block, is used to search for a best matching reference block, and/or for example, depends on whether pixel interpolation such as half-pel and/or quarter-pel interpolation is applied. The set of inter prediction modes may comprise, for example, an advanced motion vector prediction (AMVP) mode and a merge mode. In a specific implementation, the set of inter prediction modes may comprise a refined control point-based AMVP mode and a refined control point-based merge mode in the embodiments of this application. In an example, the intra prediction unit 254 may be configured to perform any combination of inter prediction technologies described below.

In addition to the foregoing prediction modes, a skip mode and/or a direct mode may also be applied in the embodiments of this application.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and perform, for example, prediction on each of the block partitions or subblocks. Mode selection comprises selection of a tree structure of the partitioned picture block 203 and selection of a prediction mode used for each of the block partitions or subblocks.

The inter prediction unit 244 may comprise a motion estimation (motion estimation, ME) unit (which is not shown in FIG. 2) and a motion compensation (MC) unit (which is not shown in FIG. 2). The motion estimation unit is configured to receive or obtain a picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may comprise the current picture and the previously decoded picture 31. In other words, the current picture and the previously decoded picture 31 may be a part of or form a sequence of pictures forming a video sequence.

For example, the encoder 20 may be configured to select a reference block from a plurality of reference blocks of a same picture or different pictures of a plurality of other pictures, and provide a reference picture and/or an offset (a spatial offset) between a location (X, Y coordinates) of the reference block and a location of the current block as an inter prediction parameter to the motion estimation unit (which is not shown in FIG. 2). This offset is also called a motion vector (MV).

The motion compensation unit is configured to obtain an inter prediction parameter, and perform inter prediction based on or by using the inter prediction parameter to obtain an inter prediction block 245. Motion compensation performed by the motion compensation unit (which is not shown in FIG. 2) may comprise fetching or generating the prediction block based on a motion/block vector determined through motion estimation (possibly performing interpolation in sub-pixel precision). Interpolation filtering may generate additional pixel samples from known pixel samples. This potentially increases a quantity of candidate prediction blocks that may be used to code a picture block. Upon receiving a motion vector for a PU of the current picture block, the motion compensation unit 246 may locate a prediction block to which the motion vector points in one of the reference picture lists. The motion compensation unit 246 may also generate a syntax element associated with a block and a video slice, so that the decoder 30 uses the syntax element to decode the picture block in the video slice.

Specifically, the inter prediction unit 244 may transmit a syntax element to the entropy encoding unit 270. The syntax element comprises the inter prediction parameter (such as indication information of selection of an inter prediction mode used for prediction of the current block after a plurality of inter prediction modes are traversed). In a possible application scenario, if there is only one inter prediction mode, the inter prediction parameter may not be carried in the syntax element. In this case, the decoder side 30 may directly perform decoding by using a default prediction mode. It may be understood that the inter prediction unit 244 may be configured to perform any combination of inter prediction technologies.

The intra prediction unit 254 is configured to obtain, for example, receive, a picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, to the entropy encoding unit 270. In an example, the intra prediction unit 254 may be configured to perform any combination of intra prediction technologies.

Specifically, the intra prediction unit 254 may transmit the syntax element to the entropy encoding unit 270. The syntax element comprises the intra prediction parameter (such as indication information of selection of an intra prediction mode used for prediction of the current block after a plurality of intra prediction modes are traversed). In a possible application scenario, if there is only one intra prediction mode, the intra prediction parameter may not be carried in the syntax element. In this case, the decoder side 30 may directly perform decoding by using a default prediction mode.

The entropy encoding unit 270 is configured to apply (or not apply) an entropy encoding algorithm or scheme (for example, a variable length coding (VLC) scheme, a context-adaptive VLC (CAVLC) scheme, an arithmetic coding scheme, a context-adaptive binary arithmetic coding (CABAC) scheme, a syntax-based context-adaptive binary arithmetic coding (SBAC) scheme, a probability interval partitioning entropy (PIPE) coding scheme, or another entropy coding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or stored for subsequent transmission or retrieval by the video decoder 30. The entropy encoding unit 270 may be further configured to entropy encode another syntax element for a current video slice that is being encoded.

Other structural variations of the video encoder 20 may be used to encode a video stream. For example, the non-transform based encoder 20 can quantize a residual signal directly without the transform processing unit 206 for some blocks or frames. In another implementation, the encoder 20 can have the quantization unit 208 and the inverse quantization unit 210 combined into a single unit.

Specifically, in this embodiment of this application, the encoder 20 may be configured to implement an inter prediction method described in the following embodiments.

It should be understood that other structural variations of the video encoder 20 may be used to encode a video stream. For example, for some picture blocks or picture frames, the video encoder 20 may directly quantize a residual signal. In this case, processing by the transform processing unit 206 is not required, and correspondingly, processing by the inverse transform processing unit 212 is not required either. Alternatively, for some picture blocks or picture frames, the video encoder 20 does not generate residual data. Correspondingly, in this case, processing by the transform processing unit 206, the quantization unit 208, the inverse quantization unit 210, and the inverse transform processing unit 212 is not required. Alternatively, the video encoder 20 may directly store a reconstructed picture block as a reference block. In this case, processing by the filter 220 is not required. Alternatively, the quantization unit 208 and the inverse quantization unit 210 in the video encoder 20 may be combined. The loop filter 220 is optional. In addition, in a case of lossless compression coding, the transform processing unit 206, the quantization unit 208, the inverse quantization unit 210, and the inverse transform processing unit 212 are also optional. It should be understood that, in different application scenarios, the inter prediction unit 244 and the intra prediction unit 254 may be used selectively.

FIG. 3 is a schematic/conceptual block diagram of an example of a decoder 30 for implementing embodiments of this application. The video decoder 30 is configured to receive, for example, encoded picture data (for example, an encoded bitstream) 21 obtained through encoding by an encoder 20, to obtain a decoded picture 231. In a decoding process, the video decoder 30 receives, from the video encoder 20, video data, for example, an encoded video bitstream that represents a picture block in an encoded video slice and an associated syntax element.

In the example in FIG. 3, the decoder 30 comprises an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may comprise an inter prediction unit 344, an intra prediction unit 354, and a mode selection unit 362. In some examples, the video decoder 30 may perform a decoding pass that is generally inverse to an encoding pass described with reference to the video encoder 20 in FIG. 2.

The entropy decoding unit 304 is configured to entropy decode the encoded picture data 21 to obtain, for example, a quantized coefficient 309 and/or a decoded encoding parameter (which is not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive a syntax element at a video slice level and/or a picture block level.

The inverse quantization unit 310 may be identical in function to the inverse quantization unit 110, the inverse transform processing unit 312 may be identical in function to the inverse transform processing unit 212, the reconstruction unit 314 may be identical in function to the reconstruction unit 214, the buffer 316 may be identical in function to the buffer 216, the loop filter 320 may be identical in function to the loop filter 220, and the decoded picture buffer 330 may be identical in function to the decoded picture buffer 230.

The prediction processing unit 360 may comprise the inter prediction unit 344 and the intra prediction unit 354. The inter prediction unit 344 may be similar in function to the inter prediction unit 244, and the intra prediction unit 354 may be similar in function to the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra encoded (I) slice, the intra prediction unit 354 in the prediction processing unit 360 is configured to generate a prediction block 365 of a picture block in the current video slice based on a signaled intra prediction mode and data of a previously decoded block of a current frame or picture. When the video frame is encoded into an inter encoded (namely, B or P) slice, the inter prediction unit 344 (for example, a motion compensation unit) in the prediction processing unit 360 is configured to generate a prediction block 365 of a video block in the current video slice based on a motion vector and the another syntax element that is received from the entropy decoding unit 304. In inter prediction, a prediction block may be generated from a reference picture in a reference picture list. The video decoder 30 may construct reference frame lists, a list 0 and a list 1, by using a default construction technology and based on reference pictures stored in the DPB 330.

The prediction processing unit 360 is configured to determine prediction information of the video block in the current video slice by parsing the motion vector and the another syntax element, and generate, by using the prediction information, the prediction block of the current video block that is being decoded. In an example embodiment of this application, the prediction processing unit 360 determines, by using some received syntax elements, a prediction mode (for example, intra prediction or inter prediction) for encoding the video block in the video slice, an inter prediction slice type (for example, a B slice, a P slice, or a GPB slice), construction information of one or more of the reference picture lists for the slice, a motion vector of each inter encoded video block in the slice, an inter prediction status of each inter encoded video block in the slice, and other information, to decode the video block in the current video slice. In another example of this disclosure, the syntax element received by the video decoder 30 from the bitstream comprises a syntax element in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may comprise use of a quantization parameter calculated by the video encoder 20 for each video block in the video slice, to determine a degree of quantization that should be applied and likewise, a degree of inverse quantization that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (either in a coding loop or after a coding loop) is configured to filter the reconstructed block 315 to obtain a filtered block 321, to smooth pixel transitions or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or other filters, for example, a bilateral filter, an adaptive loop filter (ALF), a sharpening or smoothing filter, or a collaborative filter. Although the loop filter unit 320 is shown as an in-loop filter in FIG. 3, in another implementation, the loop filter unit 320 may be implemented as a post-loop filter.

Then, a decoded video block 321 in a given frame or picture is stored in the decoded picture buffer 330 that stores a reference picture used for subsequent motion compensation.

The decoder 30 is configured to output, for example, the decoded picture 31 via an output 332, for present or viewing to a user.

Other variations of the video decoder 30 may be used to decode a compressed bitstream. For example, the decoder 30 can generate an output video stream without the loop filter unit 320. For example, the non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Specifically, in this embodiment of this application, the decoder 30 may be configured to implement an inter prediction method described in the following embodiments.

It should be understood that other structural variations of the video decoder 30 may be used to decode an encoded video bitstream. For example, the video decoder 30 may generate an output video stream without processing by the filter 320. Alternatively, for some picture blocks or picture frames, the entropy decoding unit 304 in the video decoder 30 does not obtain a quantized coefficient through decoding. Correspondingly, in this case, processing by the inverse quantization unit 310 and the inverse transform processing unit 312 is not required. The loop filter 320 is optional. In addition, in a case of lossless compression, the inverse quantization unit 310 and the inverse transform processing unit 312 are also optional. It should be understood that, in different application scenarios, the inter prediction unit and the intra prediction unit may be used selectively.

It should be understood that, in the encoder 20 and the decoder 30 in this application, a processing result of an operation may be further processed and then output to a next operation. For example, after an operation such as interpolation filtering, motion vector derivation, or loop filtering, a further operation, such as clip or shift, is performed on a processing result of the corresponding operation.

For example, a motion vector that is of a control point of a current picture block and that is derived based on a motion vector of a neighboring affine coded block may be further processed. This is not limited in this application. For example, a value of the motion vector is constrained to be within a specific bit width range. Assuming that an allowed bit width of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. The value of the motion vector may be constrained in either of the following two manners:

Manner 1: An overflow most significant bit of the motion vector is removed:

$ux=(vx+2^{bitDepth})\%2^{bitDepth}$ $vx=(ux>=2^{bitDepth-1})?(ux-2^{bitDepth}):ux$ $uy=(vy+2^{bitDepth})\%2^{bitDepth}$ $vy=(uy>=2^{bitDepth-1})?(uy-2^{bitDepth}):uy$ For example, a value of vx is −32769, and 32767 is derived according to the foregoing formulas. A value is stored on a computer in a two's complement representation, a two's complement representation of −32769 is 1,0111,1111,1111,1111 (17 bits), and processing performed by the computer for overflowing is discarding a most significant bit. Therefore, a value of vx is 0111,1111, 1111, 1111, that is, 32767. This value is consistent with the result derived through processing according to the formulas.

Manner 2: Clipping is performed on the motion vector, and the following formulas are used:

$vx=Clip3(-2^{bitDepth-1},2^{bitDepth-1}-1,vx)$ $vy=Clip3(-2^{bitDepth-1},2^{bitDepth-1}-1,vy)$ In the foregoing formulas, Clip3 is defined as clipping a value of z to a range [x, y].

$$Clip3(x, y, z) = \begin{cases} x; & z < x \\ y; & z > y \\ z; & \text{otherwise} \end{cases}$$

Figure 4:
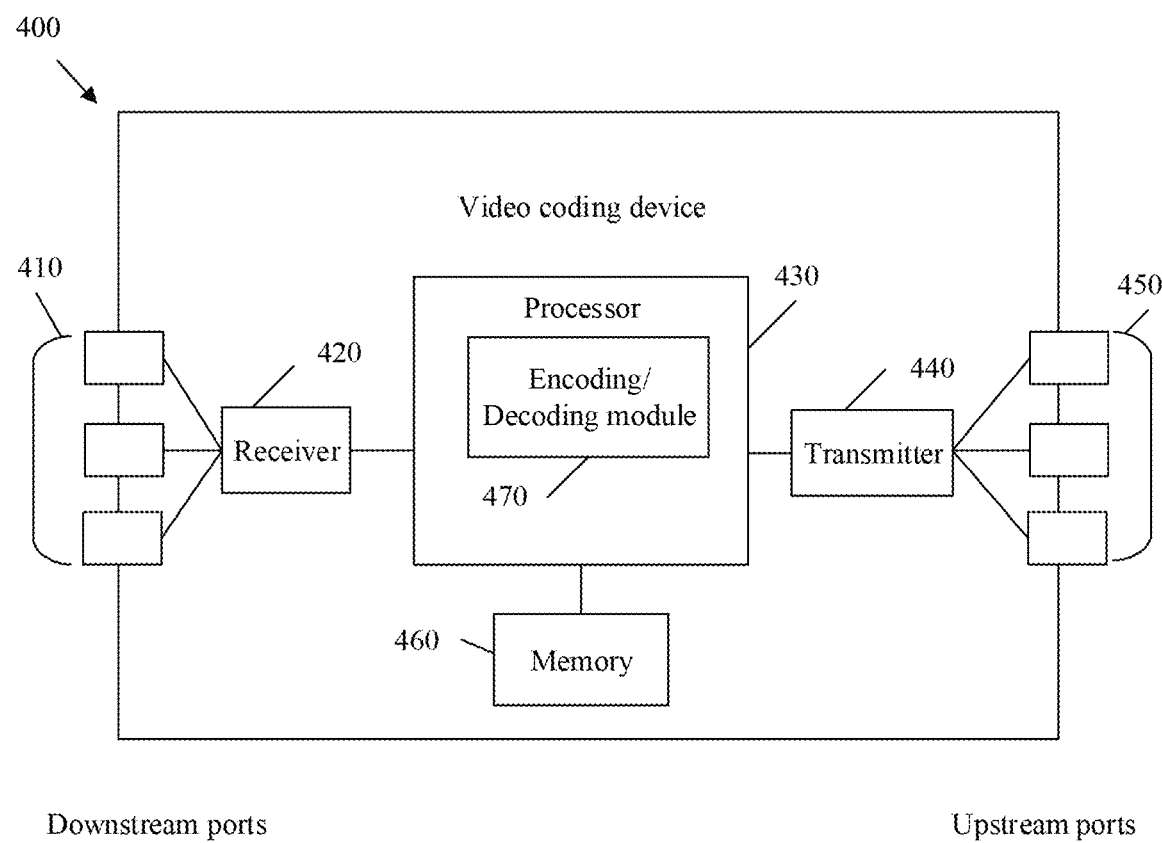
FIG. 4 is a block diagram of an example of a video coding device 400 for implementing embodiments of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 comprises: ingress ports 410 and a receiver (Rx) 420 that are configured to receive data; a processor, a logic unit, or a central processing unit (CPU) 430 that is configured to process data; a transmitter (Tx) 440 and egress ports 450 that are configured to transmit data; and a memory 460 configured to store data. The video coding device 400 may further comprise optical-to-electrical components and electrical-to-optical (EO) components that are coupled to the ingress ports 410, the receiver 420, the transmitter 440, and the egress ports 450, for egress or ingress of an optical or electrical signal.

The processor 430 is implemented by hardware and software. The processor 430 may be implemented as one or more CPU chips, cores (for example, a multi-core processor), FPGAS, ASICs, and DSPs. The processor 430 communicates with the ingress ports 410, the receiver 420, the transmitter 440, the egress ports 450, and the memory 460. The processor 430 comprises a coding module 470 (for example, an encoding module 470 or a decoding module 470). The encoding/decoding module 470 implements the embodiments disclosed in this specification, to implement a chroma block prediction method provided in the embodiments of this application. For example, the encoding/decoding module 470 implements, processes, or provides various coding operations. Therefore, the encoding/decoding module 470 provides a substantial improvement to a function of the video coding device 400, and affects transformation of the video coding device 400 to a different state. Alternatively, the encoding/decoding module 470 is implemented as an instruction that is stored in the memory 460 and executed by the processor 430.

The memory 460 comprises one or more disks, tape drives, and solid-state drives, and may be used as an overflow data storage device, to store programs when such programs are selected for execution, and to store an instruction and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
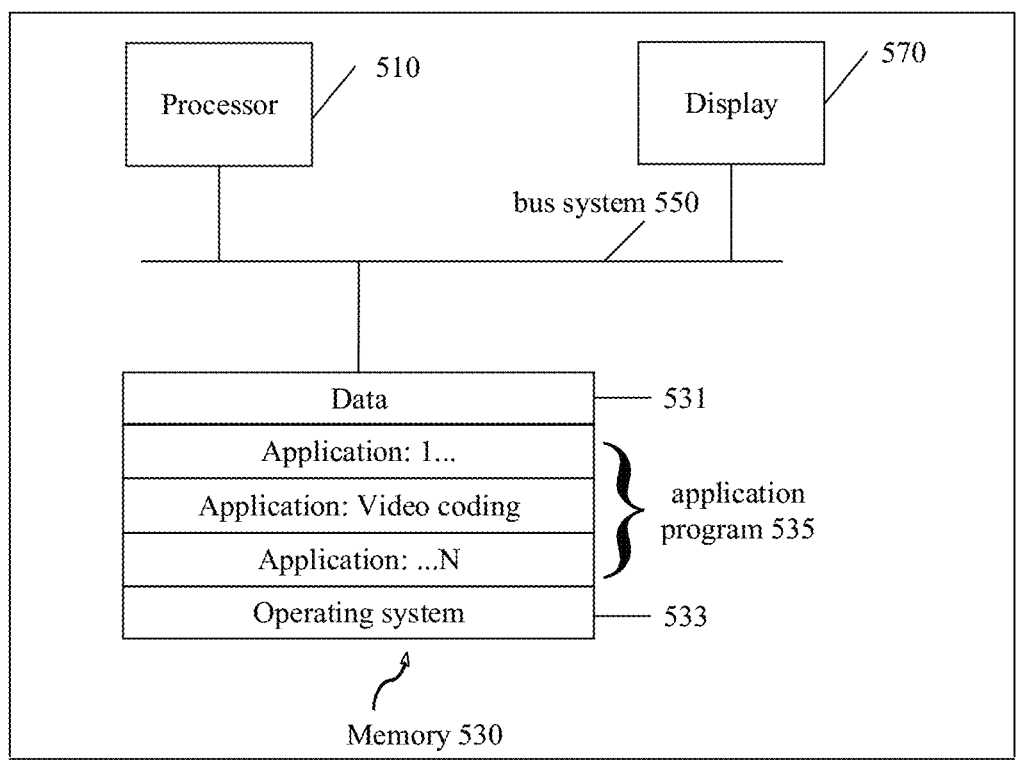
FIG. 5 is a block diagram of an example of another encoding apparatus or decoding apparatus for implementing embodiments of this application.

FIG. 5 is a simplified block diagram of an apparatus 500 that may be used as either or both of the source device 12 and the destination device 14 in FIG. 1A according to an example embodiment. The apparatus 500 can implement the technologies of this application. In other words, FIG. 5 is a schematic block diagram of an implementation of an encoding device or a decoding device (referred to as a coding device 500 for short) according to an embodiment of this application. The coding device 500 may comprise a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory to perform various video encoding or decoding methods described in embodiments of this application. To avoid repetition, details are not described herein.

In this embodiment of this application, the processor 510 may be a central processing unit ("CPU" for short). Alternatively, the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like.

The memory 530 may comprise a read-only memory (ROM) device or a random access memory (RAM) device. Any other suitable type of storage device may alternatively be used as the memory 530. The memory 530 may comprise code and data 531 accessed by the processor 510 through the bus 550. The memory 530 may further comprise an operating system 533 and an application program 535. The application program 535 comprises at least one program that allows the processor 510 to perform a video encoding or decoding method described embodiments of in this application. For example, the application programs 535 may comprise applications 1 to N. The applications further comprise a video encoding or decoding application (referred to as a video coding application for short) that performs the video encoding or decoding method described in embodiments of this application.

The bus system 550 may not only comprise a data bus, but also comprise a power bus, a control bus, a status signal bus, and the like. However, for clear description, various types of buses in the figure are marked as the bus system 550.

Optionally, the coding device 500 may further comprise one or more output devices, for example, a display 570. In an example, the display 570 may be a touch sensitive display that combines a display and a touch sensitive unit that is operable to sense a touch input. The display 570 may be connected to the processor 510 through the bus 550.

The following first describes concepts in embodiments of this application.

1. Inter Prediction Mode:

In HEVC, two inter prediction modes are used: an advanced motion vector prediction (AMVP) mode and a merge mode.

In the AMVP mode, spatial or temporal neighboring encoded blocks (denoted as adjacent blocks) of a current block are first traversed; a candidate motion vector list (which may also be referred to as a motion information candidate list) is constructed based on motion information of the neighboring blocks; and then an optimal motion vector is determined from the candidate motion vector list based on a rate-distortion cost. Candidate motion information corresponding to a minimum rate-distortion cost is used as a motion vector predictor (MVP) of the current block. Both locations of the neighboring blocks and a traversal order thereof are predefined. The rate-distortion cost is calculated according to Formula (1), where J represents the rate-distortion cost (RD cost), SAD is a sum of absolute differences (SAD) between original sample values and prediction sample values obtained through motion estimation by using a candidate motion vector predictor, R represents a bit rate, and λ represents a Lagrange multiplier. An encoder side transfers an index value of the selected motion vector predictor in the candidate motion vector list and a reference frame index value to a decoder side. Further, motion search is performed in a neighborhood centered on the MVP, to obtain an actual motion vector of the current block. The encoder side transfers a difference (motion vector difference) between the MVP and the actual motion vector to the decoder side.

$$J=SAD+\lambda R \tag{1}$$

Figure 6A:
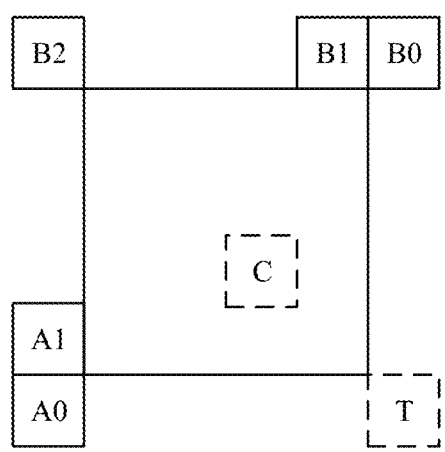
FIG. 6A is a schematic diagram of a candidate location for motion information for implementing embodiments of this application.

In the merge mode, a candidate motion vector list is first constructed based on motion information of spatial or temporal neighboring encoded blocks of a current block. Then, optimal motion information is determined from the candidate motion vector list as motion information of the current block based on a rate-distortion cost. An index value (denoted as a merge index hereinafter) of a location of the optimal motion information in the candidate motion vector list is transferred to a decoder side. Spatial and temporal candidate motion information of the current block is shown in FIG. 6A. The spatial candidate motion information is from five spatial neighboring blocks (A0, A1, B0, B1, and B2). If a neighboring block is unavailable (the neighboring block does not exist, or the neighboring block is not encoded, or a prediction mode used for the neighboring block is not an inter prediction mode), motion information of the neighboring block is not added to the candidate motion vector list. The temporal candidate motion information of the current block is obtained by scaling an MV of a block at a corresponding location in a reference frame based on picture order counts (POC) of the reference frame and a current frame. Whether a block at a location T in the reference frame is available is first determined. If the block is unavailable, a block at a location C is selected.

Similar to the AMVP mode, in the merge mode, both locations of the neighboring blocks and a traversal order thereof are also predefined. In addition, the locations of the neighboring blocks and the transversal order thereof may be different in different modes.

It can be learned that one candidate motion vector list needs to be maintained in both the AMVP mode and the merge mode. Before new motion information is added to the candidate list each time, whether same motion information exists in the list is first checked. If the same motion information exists in the list, the motion information is not added to the list. This checking process is referred to as pruning of the candidate motion vector list. Pruning of the list is to avoid existence of the same motion information in the list, to avoid redundant rate-distortion cost calculation.

In inter prediction in HEVC, same motion information is used for all samples of a coding block, and then motion compensation is performed based on the motion information, to obtain predictors of the samples of the coding block. In the coding block, however, not all samples have same motion features. Using the same motion information may result in inaccurate motion compensation prediction and more residual information.

In existing video coding standards, translational motion model based block matching motion estimation is used, and it is assumed that motion of all samples in a block is consistent. However, in the real world, there are a variety of motion. Many objects are in non-translational motion, for example, a rotating object, a roller coaster spinning in different directions, a display of fireworks, and some stunts in movies, especially moving object in a UGC scenario. For these moving objects, if a translational motion model based block motion compensation technology in the existing coding standards is used for coding, coding efficiency may be greatly affected. In view of this, a non-translational motion model, for example, an affine motion model, is introduced to improve the coding efficiency.

Based on this, in terms of different motion models, the AMVP mode may be classified into a translational model based AMVP mode and a non-translational model based AMVP mode, and the merge mode may be classified into a translational model based merge mode and a non-translational model based merge mode.

2. Non-Translational Motion Model:

Non-translational motion model based prediction means that a same motion model is used on both encoder and decoder sides to derive motion information of each subblock of a current block, and motion compensation is performed based on the motion information of the subblock to obtain a prediction block. In this way, prediction efficiency is improved. Common non-translational motion models comprise a 4-parameter affine motion model and a 6-parameter affine motion model.

A subblock in the embodiments of this application may be a sample or an $N_1 \times N_2$ sample block obtained by using a particular partitioning method, where both $N_1$ and $N_2$ are positive integers, and $N_1$ may be equal to $N_2$ or may not be equal to $N_2$.

The 4-parameter affine motion model is expressed according to Formula (2):

$$\begin{cases} vx = a_1 + a_3 x + a_4 y \\ vy = a_2 - a_4 x + a_3 y \end{cases} \quad (2)$$

The 4-parameter affine motion model may be represented by motion vectors of two samples and their coordinates relative to the top-left sample of the current block. A sample used for representing a motion model parameter is referred to as a control point. If the top-left sample (0, 0) and the top-right sample (W, 0) are used as control points, respective motion vectors $(vx_0, vy_0)$ and $(vx_1, vy_1)$ of the top-left vertex and the top-right vertex of the current block are first determined. Then, motion information of each subblock of the current block is obtained according to Formula (3), where (x, y) represents coordinates of the subblock relative to the top-left sample of the current block, and W represents the width of the current block.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

The 6-parameter affine motion model is expressed according to Formula (4):

$$\begin{cases} vx = a_1 + a_3 x + a_4 y \\ vy = a_2 + a_5 x + a_6 y \end{cases} \quad (4)$$

The 6-parameter affine motion model may be represented by motion vectors of three samples and their coordinates relative to the top-left sample of the current block. If the top-left sample (0, 0), the top-right sample (W, 0), and the bottom-left sample (0, H) of the current block are used as control points, respective motion vectors $(vx_0, vy_0)$, $(vx_1, vy_1)$, and $(vx_2, vy_2)$ of the top-left control point, the top-right control point, and the bottom-left control point of the current block are first determined. Then, motion information of each subblock of the current block is obtained according to Formula (5), where (x, y) represents coordinates of the subblock relative to the top-left sample of the current block, and W and H represent the width and the height of the current block, respectively.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

A coding block that is predicted by using an affine motion model is referred to as an affine coded block.

Generally, motion information of a control point of an affine coded block may be obtained by using an affine motion model based advanced motion vector prediction (AMVP) mode or an affine motion model based merge mode.

The motion information of the control point of the current coding block may be obtained by using an inherited control point motion vector prediction method or a constructed control point motion vector prediction method.

3. Inherited Control Point Motion Vector Prediction Method:

The inherited control point motion vector prediction method is to use a motion model of a neighboring encoded affine coded block to determine candidate control point motion vectors of a current block.

Figure 6B:
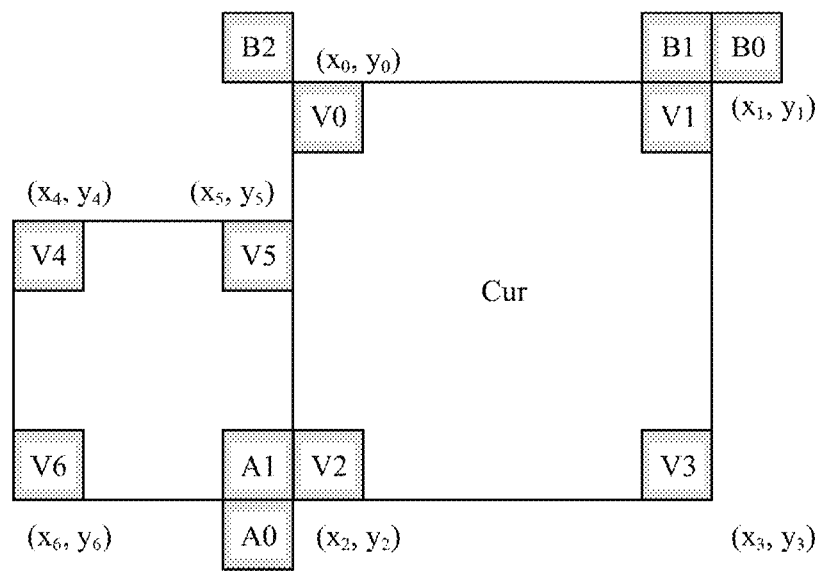
FIG. 6B is a schematic diagram of inherited control point motion vector prediction for implementing embodiments of this application.

A current block shown in FIG. 6B is used as an example. Blocks at neighboring locations around the current block are traversed in a specified order, for example, A1→B1→B0→A0→B2, to find an affine coded block including a block at a neighboring location of the current block, and to obtain control point motion information of the affine coded block. Further, a control point motion vector (used in the merge mode) or a control point motion vector predictor (used in the AMVP mode) of the current block is derived by using a motion model constructed based on the control point motion information of the affine coded block. The order A1→B1→B0→A0→B2 is merely used as an example. Another combination order may also be used in to this application. In addition, the blocks at the neighboring locations are not limited to A1, B1, B0, A0, and B2.

The block at the neighboring location may be a sample or a sample block of a preset size obtained by using a particular partitioning method. For example, the sample block may be a 4×4 sample block, a 4×2 sample block, or a sample block of another size. This is not limited herein.

The following describes a determining process by using A1 as an example, and similar processes can be employed for other cases.

As shown in FIG. 4, if a coding block in which A1 is located is a 4-parameter affine coded block, a motion vector $(vx_4, vy_4)$ of the top-left vertex $(x_4, y_4)$ and a motion vector $(vx_5, vy_5)$ of the top-right vertex $(x_5, y_5)$ of the affine coded block are obtained. A motion vector $(vx_0, vy_0)$ of the top-left vertex $(x_0, y_0)$ of the current affine coded block is calculated according to Formula (6), and a motion vector $(vx_1, vy_1)$ of the top-right vertex $(x_1, y_1)$ of the current affine coded block is calculated according to Formula (7).

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vy_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (6)$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vy_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (7)$$

A combination of the motion vector ($vx_0$, $vy_0$) of the top-left vertex ($x_0$, $y_0$) and the motion vector ($vx_1$, $vy_1$) of the top-right vertex ($x_1$, $y_1$) of the current block that are obtained based on the affine coded block in which A1 is located is the candidate control point motion vectors of the current block.

If a coding block in which A1 is located is a 6-parameter affine coded block, a motion vector ($vx_4$, $vy_4$) of the top-left vertex ($x_4$, $y_4$), a motion vector ($vx_5$, $vy_5$) of the top-right vertex ($x_5$, $y_5$), and a motion vector ($vx_6$, $vy_6$) of the bottom-left vertex ($x_6$, $y_6$) of the affine coded block are obtained. A motion vector ($vx_0$, $vy_0$) of the top-left vertex ($x_0$, $y_0$) of the current block is calculated according to Formula (8), a motion vector ($vx_1$, $vy_1$) of the top-right vertex ($x_1$, $y_1$) of the current block is calculated according to Formula (9), and a motion vector ($vx_2$, $vy_2$) of the bottom-left vertex ($x_2$, $y_2$) of the current block is calculated according to Formula (10).

$$\begin{cases} vx_0 = vx_4 + \dfrac{(vx_5 - vx_4)}{x_5 - x_4} \times (x_0 - x_4) - \dfrac{(vx_6 - vx_4)}{y_6 - y_4} \times (y_0 - y_4) \\ vy_0 = vy_4 + \dfrac{(vy_5 - vy_4)}{x_5 - x_4} \times (x_0 - x_4) + \dfrac{(vy_6 - vy_4)}{y_6 - y_4} \times (y_0 - y_4) \end{cases} \quad (8)$$

$$\begin{cases} vx_1 = vx_4 + \dfrac{(vx_5 - vx_4)}{x_5 - x_4} \times (x_1 - x_4) - \dfrac{(vx_6 - vx_4)}{y_6 - y_4} \times (y_1 - y_4) \\ vy_1 = vy_4 + \dfrac{(vy_5 - vy_4)}{x_5 - x_4} \times (x_1 - x_4) + \dfrac{(vy_6 - vy_4)}{y_6 - y_4} \times (y_1 - y_4) \end{cases} \quad (9)$$

$$\begin{cases} vx_2 = vx_4 + \dfrac{(vx_5 - vx_4)}{x_5 - x_4} \times (x_2 - x_4) - \dfrac{(vx_6 - vx_4)}{y_6 - y_4} \times (y_2 - y_4) \\ vy_2 = vy_4 + \dfrac{(vy_5 - vy_4)}{x_5 - x_4} \times (x_2 - x_4) + \dfrac{(vy_6 - vy_4)}{y_6 - y_4} \times (y_2 - y_4) \end{cases} \quad (10)$$

A combination of the motion vector ($vx_0$, $vy_0$) of the top-left vertex ($x_0$, $y_0$), the motion vector ($vx_1$, $vy_1$) of the top-right vertex ($x_1$, $y_1$), and the motion vector ($vx_2$, $vy_2$) of the bottom-left vertex ($x_2$, $y_2$) of the current block that are obtained based on the affine coded block in which A1 is located is the candidate control point motion vector of the current block.

It should be noted that other motion models, candidate locations, and search and traversal orders may also be used in embodiments of this application. Details are not described in the embodiments of this application.

It should be noted that methods for representing motion models of neighboring and current coding blocks based on other control points may also be used in embodiments of this application. Details are not described herein.

4. Constructed Control Point Motion Vector Prediction Method 1:

The constructed control point motion vector prediction method according to an embodiment is to combine motion vectors of neighboring encoded blocks around a control point of a current block as a control point motion vector of a current affine coded block, without considering whether the neighboring encoded blocks are affine coded blocks.

Figure 6C:
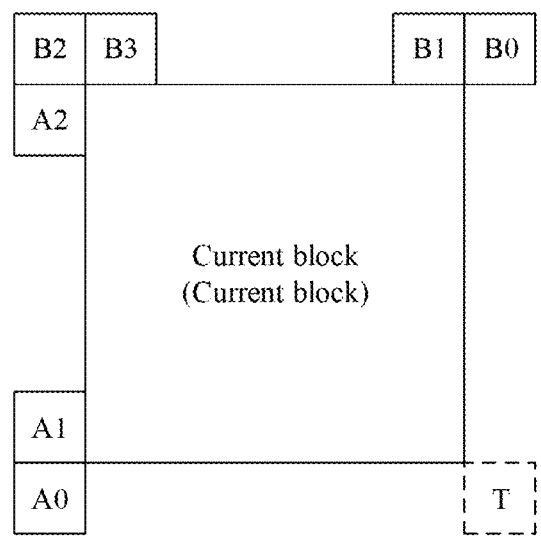
FIG. 6C is a schematic diagram of constructed control point motion vector prediction for implementing embodiments of this application.

Motion vectors of the top-left vertex and the top-right vertex of the current block are determined based on motion information of the neighboring encoded blocks around the current coding block. FIG. 6C is used as an example to describe the constructed control point motion vector prediction method. It should be noted that FIG. 6C is merely used as an example.

As shown in FIG. 6C, motion vectors of neighboring encoded blocks A2, B2, and B3 at the top-left corner are used as candidate motion vectors for a motion vector of the top-left vertex of the current block; and motion vectors of neighboring encoded blocks B1 and B0 at the top-right corner are used as candidate motion vectors for a motion vector of the top-right vertex of the current block. The candidate motion vectors of the top-left vertex and the top-right vertex are combined to constitute a plurality of 2-tuples. Motion vectors of two encoded blocks comprised in a 2-tuple may be used as candidate control point motion vectors of the current block, as shown in the following Formula (11A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\},$$
$$\{v_{B3}, v_{B0}\} \quad (11A)$$

where $v_{A2}$ represents the motion vector of A2, $v_{B1}$ represents the motion vector of B1, $v_{B0}$ represents the motion vector of B0, $v_{B2}$ represents the motion vector of B2, and $v_{B3}$ represents the motion vector of B3.

As shown in FIG. 6C, motion vectors of neighboring encoded blocks A2, B2, and B3 at the top-left corner are used as candidate motion vectors for a motion vector of the top-left vertex of the current block; motion vectors of neighboring encoded blocks B1 and B0 at the top-right corner are used as candidate motion vectors for a motion vector of the top-right vertex of the current block; and motion vectors of neighboring encoded blocks A0 and A1 at the bottom-left corner are used as candidate motion vectors for a motion vector of the bottom-left vertex of the current block. The candidate motion vectors of the top-left vertex, the top-right vertex, and the bottom-left vertex are combined to constitute 3-tuples. Motion vectors of three encoded blocks comprised in a 3-tuple may be used as candidate control point motion vectors of the current block, as shown in the following Formulas (11B) and (11C):

$$\{v_{A2}, v_{B1}, v_{A0}\}, \{v_{A2}, v_{B0}, v_{A0}\}, \{v_{B2}, v_{B1}, v_{A0}\}, \{v_{B2}, v_{B0},$$
$$v_{A0}\}, \{v_{B3}, v_{B1}, v_{A0}\}, \{v_{B3}, v_{B0}, v_{A0}\} \quad (11B)$$

$$\{v_{A2}, v_{B1}, v_{A1}\}, \{v_{A2}, v_{B0}, v_{A1}\}, \{v_{B2}, v_{B1}, v_{A1}\}, \{v_{B2}, v_{B0},$$
$$v_{A1}\}, \{v_{B3}, v_{B1}, v_{A1}\}, \{v_{B3}, v_{B0}, v_{A1}\} \quad (11C)$$

where $v_{A2}$ represents the motion vector of A2, $v_{B1}$ represents the motion vector of B1, $v_{B0}$ represents the motion vector of B0, $v_{B2}$ represents the motion vector of B2, $v_{B3}$ represents the motion vector of B3, $v_{A0}$ represents the motion vector of A0, and $v_{A1}$ represents the motion vector of A1.

It should be noted that other methods for combining control point motion vectors may also be used in embodiments of this application. Details are not described herein.

It should be noted that methods for representing motion models of neighboring and current coding blocks based on other control points may also be used in embodiments of this application. Details are not described herein.

Figure 6D:
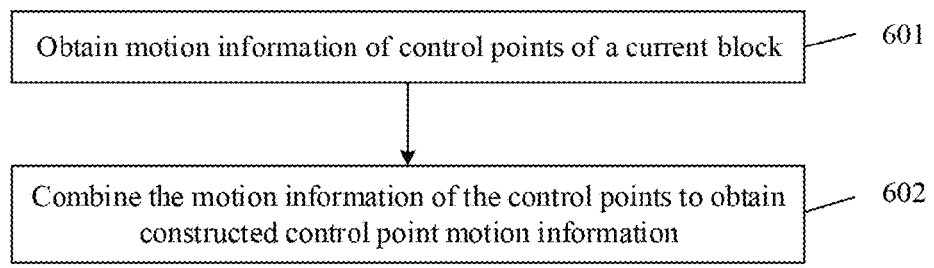
FIG. 6D is a schematic diagram of a procedure of combining control point motion information to obtain constructed control point motion information for implementing embodiments of this application.

5. Constructed Control Point Motion Vector Prediction Method 2, According to Some Embodiments, as shown in FIG. 6D:

Operation 601: Obtain motion information of control points of a current block.

For example, in FIG. 6C, CPk (k=1, 2, 3, 4) represents a $k^{th}$ control point. A0, A1, A2, B0, B1, B2, and B3 are spatial neighboring locations of the current block and are used to predict CP1, CP2, or CP3. T is a temporal neighboring location of the current block and is used to predict CP4.

It is assumed that coordinates of CP1, CP2, CP3, and CP4 are (0, 0), (W, 0), (H, 0), and (W, H), respectively, where W and H represent the width and the height of the current block.

For each control point, motion information of the control point is obtained in the following order:

(1) For CP1, a check order is B2→A2→B3. If B2 is available, motion information of B2 is used for CP1. Otherwise, A2 and B3 are checked. If motion information of all the three locations is unavailable, motion information of CP1 cannot be obtained.

(2) For CP2, a check order is B0→B1. If B0 is available, motion information of B0 is used for CP2. Otherwise, B1 is checked. If motion information of both the locations is unavailable, motion information of CP2 cannot be obtained.

(3) For CP3, a checking order is A0→A1.

(4) For CP4, motion information of T is used.

Herein, that X is available means that a block at X (X is A0, A1, A2, B0, B1, B2, B3 or T) is already encoded and an inter prediction mode is used for the block. Otherwise, X is unavailable.

It should be noted that other methods for obtaining control point motion information may also be used in embodiments of this application. Details are not described herein.

Operation 602: Combine the motion information of the control points to obtain constructed control point motion information.

Motion information of two control points is combined to constitute a 2-tuple, to construct a 4-parameter affine motion model. Combinations of two control points may be {CP1, CP4}, {CP2, CP3}, {CP1, CP2}, {CP2, CP4}, {CP1, CP3}, and {CP3, CP4}. For example, a 4-parameter affine motion model constructed by using a 2-tuple including the control points CP1 and CP2 may be denoted as Affine (CP1, CP2).

Motion information of three control points is combined to constitute a 3-tuple, to construct a 6-parameter affine motion model. Combinations of three control points may be {CP1, CP2, CP4}, {CP1, CP2, CP3}, {CP2, CP3, CP4}, and {CP1, CP3, CP4}. For example, a 6-parameter affine motion model constructed by using a 3-tuple including the control points CP1, CP2, and CP3 may be denoted as Affine (CP1, CP2, CP3).

Motion information of four control points is combined to constitute a 4-tuple, to construct an 8-parameter bilinear motion model. An 8-parameter bilinear model constructed by using a 4-tuple including the control points CP1, CP2, CP3, and CP4 may be denoted as Bilinear (CP1, CP2, CP3, CP4).

In the embodiments of this application, for ease of description, a combination of motion information of two control points (or two encoded blocks) is simply referred to as a 2-tuple, a combination of motion information of three control points (or three encoded blocks) is simply referred to as a 3-tuple, and a combination of motion information of four control points (or four encoded blocks) is simply referred to as a 4-tuple.

These models are traversed in a preset order. If motion information of a control point corresponding to a combination model is unavailable, it is considered that the model is unavailable. Otherwise, a reference frame index of the model is determined, and a motion vector of the control point is scaled. If motion information of all control points after scaling is consistent, the model is invalid. If all motion information of control points controlling the model is available, and the model is valid, the motion information of the control points used to construct the model is added to a motion information candidate list.

A control point motion vector scaling method is shown in Formula (12):

$$MV_s = \frac{CurPoc - DesPoc}{CurPoc - SrcPoc} \times MV \qquad (12)$$

where CurPoc represents a POC number of a current frame, DesPoc represents a POC number of a reference frame of a current block, SrcPoc represents a POC number of a reference frame of a control point, MVs represents a motion vector obtained after scaling, and MV represents a motion vector of a control point.

It should be noted that different combinations of control points may be converted into control points at a same location.

For example, a 4-parameter affine motion model obtained based on a combination of {CP1, CP4}, {CP2, CP3}, {CP2, CP4}, {CP1, CP3}, or {CP3, CP4} is represented by {CP1, CP2} or {CP1, CP2, CP3} after conversion. A conversion method comprises: substituting motion vectors and coordinate information of control points into Formula (2) to obtain model parameters; and then substituting coordinate information of {CP1, CP2} into Formula (3) to obtain motion vectors of {CP1, CP2}.

More directly, conversion may be performed according to Formulas (13) to (21), where W represents the width of the current block, and H represents the height of the current block. In Formulas (13) to (21), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2} may be converted into {CP1, CP2, CP3} according to Formula (13). In other words, the motion vector of CP3 in {CP1, CP2, CP3} may be determined according to Formula (13):

$$\begin{cases} vx_2 = -\dfrac{vy_1 - vy_0}{W}H + vx_0 \\ vy_2 = +\dfrac{vx_1 - vx_0}{W}H + vy_0 \end{cases} \qquad (13)$$

{CP1, CP3} may be converted to {CP1, CP2} or {CP1, CP2, CP3} according to Formula (14):

$$\begin{cases} vx_1 = +\dfrac{vy_2 - vy_0}{H}W + vx_0 \\ vy_1 = -\dfrac{vx_2 - vx_0}{H}W + vy_0 \end{cases} \qquad (14)$$

{CP2, CP3} may be converted into {CP1, CP2} or {CP1, CP2, CP3} according to Formula (15):

$$\begin{cases} vx_0 = \dfrac{vx_2 - vx_1}{W*W + H*H}W*W - \dfrac{vy_2 - vy_1}{W*W + H*H}H*W + vx_1 \\ vy_0 = \dfrac{vy_2 - vy_1}{W*W + H*H}W*W + \dfrac{vx_2 - vx_1}{W*W + H*H}H*W + vy_1 \end{cases} \qquad (15)$$

{CP1, CP4} may be converted into {CP1, CP2} or {CP1, CP2, CP3} according to Formula (16) or (17):

$$\begin{cases} vx_1 = \dfrac{vx_3 - vx_0}{W*W + H*H} W*W + \dfrac{vy_3 - vy_0}{W*W + H*H} H*W + vx_0 \\ vy_1 = \dfrac{vy_3 - vy_0}{W*W + H*H} W*W - \dfrac{vx_3 - vx_0}{W*W + H*H} H*W + vy_0 \end{cases} \quad (16)$$

$$\begin{cases} vx_2 = \dfrac{vx_3 - vx_0}{W*W + H*H} H*H - \dfrac{vy_3 - vy_0}{W*W + H*H} H*W + vx_0 \\ vy_2 = \dfrac{vy_3 - vy_0}{W*W + H*H} W*H + \dfrac{vx_3 - vx_0}{W*W + H*H} H*H + vy_0 \end{cases} \quad (17)$$

{CP2, CP4} may be converted into {CP1, CP2} according to Formula (18), and {CP2, CP4} may be converted into {CP1, CP2, CP3} according to Formulas (18) and (19):

$$\begin{cases} vx_0 = -\dfrac{vy_3 - vy_1}{H} W + vx_1 \\ vy_0 = +\dfrac{vx_3 - vx_1}{H} W + vy_1 \end{cases} \quad (18)$$

$$\begin{cases} vx_2 = -\dfrac{vy_3 - vy_1}{H} W + vx_3 \\ vy_2 = +\dfrac{vx_3 - vx_1}{H} W + vy_3 \end{cases} \quad (19)$$

{CP3, CP4} may be converted into {CP1, CP2} according to Formula (20), and {CP3, CP4} may be converted into {CP1, CP2, CP3} according to Formulas (20) and (21):

$$\begin{cases} vx_0 = +\dfrac{vy_3 - vy_2}{W} H + vx_2 \\ vy_0 = -\dfrac{vx_3 - vx_2}{W} H + vy_2 \end{cases} \quad (20)$$

$$\begin{cases} vx_1 = +\dfrac{vy_3 - vy_2}{W} H + vx_3 \\ vy_1 = -\dfrac{vx_3 - vx_2}{W} H + vy_3 \end{cases} \quad (21)$$

For example, a 6-parameter affine motion model obtained based on a combination {CP1, CP2, CP4}, {CP2, CP3, CP4}, or {CP1, CP3, CP4} is converted and represented by using {CP1, CP2, CP3}. A conversion method comprises: substituting motion vectors and coordinate information of control points into Formula (4) to obtain model parameters; and then substituting coordinate information of {CP1, CP2, CP3} into Formula (5) to obtain motion vectors of {CP1, CP2, CP3}.

More directly, conversion may be performed according to Formulas (22) to (24), where W represents the width of the current block, and H represents the height of the current block. In Formulas (13) to (21), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2, CP4} may be converted into {CP1, CP2, CP3} according to Formula (22):

$$\begin{cases} vx_2 = vx_3 + vx_0 - vx_1 \\ vy_2 = vy_3 + vy_0 - vy_1 \end{cases} \quad (22)$$

{CP2, CP3, CP4} may be converted into {CP1, CP2, CP3} according to Formula (23):

$$\begin{cases} vx_0 = vx_1 + vx_2 - vx_3 \\ vy_0 = vy_1 + vy_2 - vy_3 \end{cases} \quad (23)$$

{CP1, CP3, CP4} may be converted into {CP1, CP2, CP3} according to Formula (24):

$$\begin{cases} vx_1 = vx_3 + vx_0 - vx_2 \\ vy_1 = vy_3 + vy_0 - vy_2 \end{cases} \quad (24)$$

6. Advanced Temporal Motion Vector Prediction (Advanced Temporal Motion Vector Prediction, ATMVP):

In inter prediction in HEVC, motion compensation is performed on all samples of a current block based on same motion information to obtain predictors of the samples of the to-be-processed block. However, not all the samples of the to-be-processed block have same motion features. Using the same motion information to predict all the samples of the to-be-processed block may reduce motion compensation accuracy and increase residual information.

To resolve the foregoing problems, an advanced temporal motion vector prediction (ATMVP) technology is provided in an existing solution.

Figure 6E:
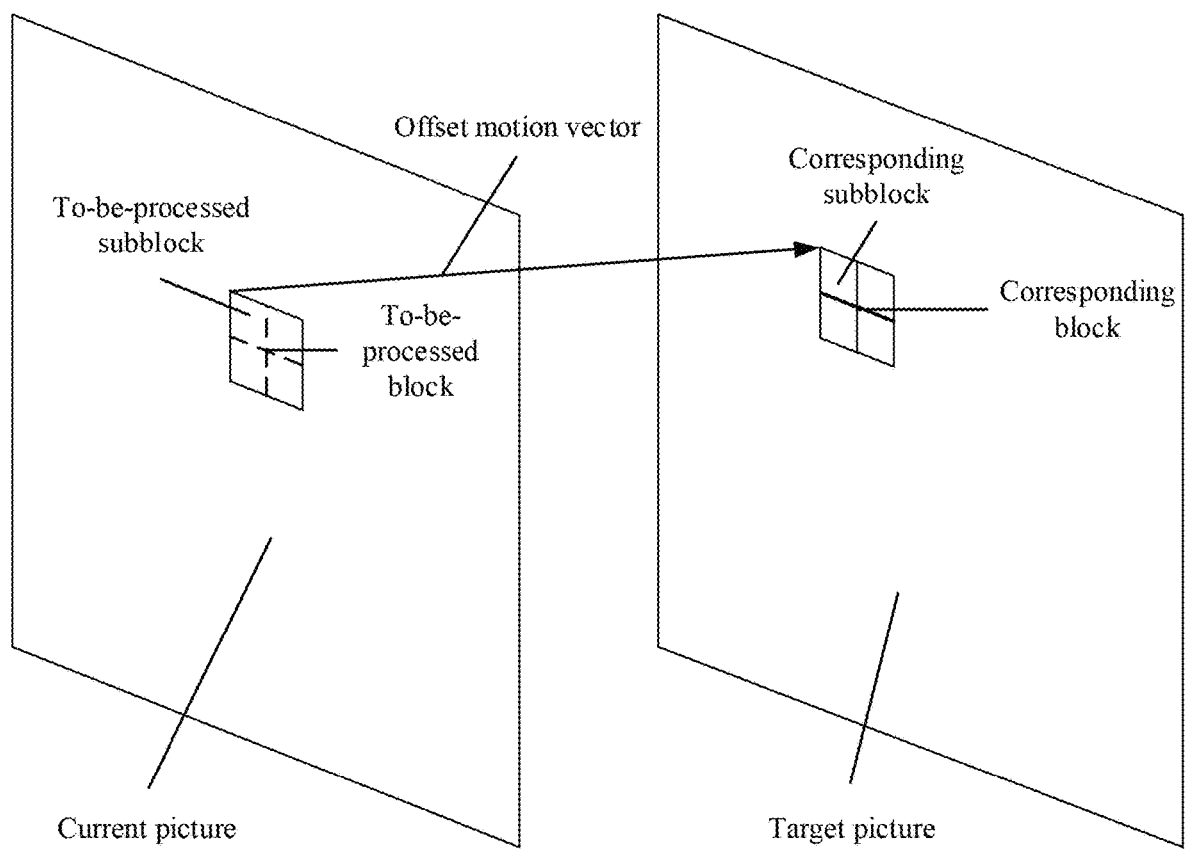
FIG. 6E is a schematic diagram of an ATMVP prediction manner for implementing embodiments of this application.

A process of performing prediction by using the ATMVP technology mainly comprises the following operations, as shown in FIG. 6E:

(1) Determine an offset vector of the to-be-processed block.

(2) Determine, in a corresponding target picture based on a location of a to-be-processed subblock of the to-be-processed block and the offset vector, a subblock corresponding to the to-be-processed subblock, where the target picture is one of encoded pictures.

(3) Determine a motion vector of the to-be-processed subblock based on a motion vector of the corresponding subblock.

For example, the motion vector of the current to-be-processed subblock may be determined by using a scaling method. For example, the scaling method is implemented according to Formula (25):

$$MV_c = \dfrac{CPoc - DPoc}{DPoc - SPoc} \times MV_g \quad (25)$$

where CPoc represents a POC number of a frame in which the to-be-processed block is located, DPoc represents a POC number of a frame in which the corresponding subblock is located, SrcPoc represents a POC number of a reference frame of the corresponding subblock, $MV_c$ represents a motion vector obtained through scaling, and $MV_g$ represents the motion vector of the corresponding subblock.

(4) Perform motion compensation prediction on the to-be-processed subblock based on the motion vector of the to-be-processed subblock, to obtain a prediction sample value of the to-be-processed subblock.

7. Planar Motion Vector Prediction (PLANAR):

In planar motion vector prediction, motion information on a top spatial neighboring location, a left spatial neighboring location, a right location, and a bottom location of each to-be-processed subblock of the to-be-processed block is obtained, and an average of the motion information is calculated, and converted into motion information of the current to-be-processed subblock.

For a to-be-processed subblock whose coordinates are (x, y), a motion vector P(x, y) of the to-be-processed subblock is calculated based on a horizontal interpolation motion vector $P_h(x, y)$ and a horizontal interpolation motion vector $P_v(x,y)$ according to Formula (26):

$$P(x,y)=(H \times P_h(x,y)+W \times P_v(x,y)+H \times W)/(2 \times H \times W) \quad (26)$$

where H represents the height of the to-be-processed block, and W represents the width of the to-be-processed block.

The horizontal interpolation motion vector $P_h(x, y)$ and the horizontal interpolation motion vector $P_v(x, y)$ may be calculated based on motion vectors of subblocks on the left, the right, the top, and the bottom of the current to-be-processed subblock according to Formulas (27) and (28):

$$P_h(x,y)=(W-1-x) \times L(-1,y)+(x+1) \times R(w,y) \quad (27)$$

$$P_v(x,y)=(H-1-y) \times A(x,-1)+(y+1) \times B(x,H) \quad (28)$$

where $L(-1, y)$ represents a motion vector of a subblock on the left of the to-be-processed subblock, $R(w, y)$ represents a motion vector of a subblock on the right of the to-be-processed subblock, $A(x, -1)$ represents a motion vector of a subblock on the top of the to-be-processed subblock, and $B(x, H)$ represents a motion vector of a subblock on the bottom of the to-be-processed subblock.

A motion vector L of a left block and a motion vector A of a top block are obtained based on a spatial neighboring block of a current coding block. Motion vectors $L(-1,y)$ and $A(x, -1)$ of coding blocks at preset locations $(-1, y)$ and $(x, -1)$ are obtained based on the coordinates $(x, y)$ of the to-be-processed subblock.

Figure 7:
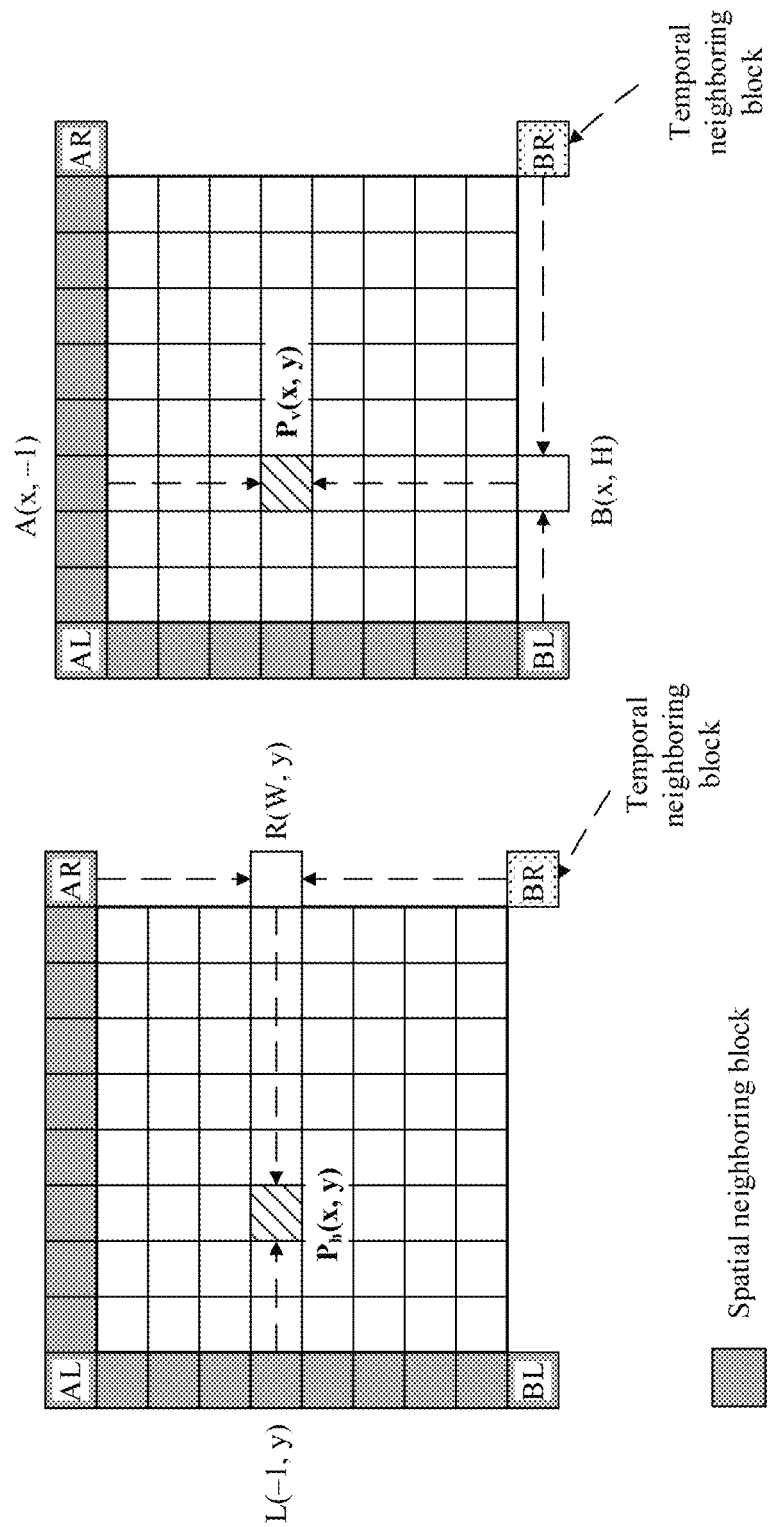
FIG. 7 is a schematic diagram of a planar motion vector prediction manner for implementing embodiments of this application.

As shown in FIG. 7, a motion vector $R(w,y)$ of a right block and a motion vector $B(x, H)$ of a bottom block may be extracted by using the following method:

(1) Extract temporal motion information BR on a bottom-right spatial neighboring location of the to-be-processed block.

(2) Obtain the motion vector $R(w, y)$ of the right block by performing weighting calculation based on extracted motion vector AR on a top-right spatial neighboring location and the extracted temporal motion information BR on the bottom-right spatial neighboring location, as shown in Formula (29):

$$R(w,y)=((H-y-1)*AR+(y+1)*BR)/H \quad (29)$$

(3) Obtain the motion vector $B(x, H)$ of the bottom block by performing weighting calculation based on extracted motion vector BL on a bottom-left spatial neighboring location and the extracted temporal motion information BR on the bottom-right spatial neighboring location, as shown in Formula (30):

$$B(x,H)=((W-x-1)*BL+(x+1)*BR)/H \quad (30)$$

It should be noted that the motion vector used in the calculation is a motion vector obtained through scaling after the motion vector is scaled to point to the first reference frame in a specific reference frame queue.

8. Affine Motion Model Based Advanced Motion Vector Prediction Mode (Affine AMVP Mode):

(1) Construct a Candidate Motion Vector List.

A candidate motion vector list corresponding to the affine motion model based AMVP mode is constructed by using the inherited control point motion vector prediction method and/or the constructed control point motion vector prediction method. In the embodiments of this application, the candidate motion vector list corresponding to the affine motion model based AMVP mode may be referred to as a control point motion vector predictor candidate list (control point motion vectors predictor candidate list). A motion vector predictor of each control point comprises motion vectors of two control points (for a 4-parameter affine motion model) or motion vectors of three control points (for a 6-parameter affine motion model).

Optionally, the control point motion vector predictor candidate list is pruned and sorted according to a particular rule, and may be truncated or padded to a particular quantity.

(2) Determine an Optimal Control Point Motion Vector Predictor.

On an encoder side, a motion vector of each subblock of a current coding block is obtained based on each control point motion vector predictor in the control point motion vector predictor candidate list according to Formula (3) or (5). The obtained motion vector is used to obtain a sample value on a corresponding location in a reference frame to which the motion vector of the subblock points. The obtained sample value is used as a predictor to perform motion compensation using an affine motion model. An average difference between an original value and a prediction value of each sample of the current coding block is calculated. A control point motion vector predictor corresponding to a minimum average difference is selected as the optimal control point motion vector predictor, and used as motion vector predictors of two or three control points of the current coding block. An index number representing a location of the control point motion vector predictor in the control point motion vector predictor candidate list is encoded in a bitstream and sent to a decoder.

On the decoder side, the index number is parsed, and the control point motion vector predictor (CPMVP) is determined from the control point motion vector predictor candidate list based on the index number.

(3) Determine a Control Point Motion Vector

On the encoder side, a control point motion vector predictor is used as a search start point for motion search within a specific search range, to obtain a control point motion vector (CPMV). A difference between the control point motion vector and the control point motion vector predictor (control point motion vectors differences, CPMVD) is transferred to the decoder side.

On the decoder side, the control point motion vector difference is parsed and added to the control point motion vector predictor, to obtain the control point motion vector.

9. Subblock Merge Mode (Sub-Block Based Merging Mode):

A subblock-based merging candidate list (sub-block based merging candidate list) is constructed by using at least one of the advanced temporal motion vector prediction, the inherited control point motion vector prediction method, the constructed control point motion vector prediction method, and the planar prediction method.

Optionally, the subblock-based merging candidate list is pruned and sorted according to a particular rule, and may be truncated or padded to a particular quantity.

On an encoder side, if the advanced temporal motion vector prediction is used, a motion vector of each subblock (a sample or a $N_1 \times N_2$ sample block obtained by using a particular partitioning method) is obtained by using the method described in the foregoing descriptions in "7. Planar motion vector prediction". If the planar prediction method is used, a motion vector of each subblock is obtained by using the method described in the foregoing descriptions in "8. Affine motion model based advanced motion vector prediction mode".

If the inherited control point motion vector prediction method or the constructed control point motion vector prediction method is used, a motion vector of each subblock (a sample or a $N_1 \times N_2$ sample block obtained by using a particular partitioning method) of a current block is obtained according to Formula (3) or (5). After the motion vector of each subblock is obtained, a sample value on a location in a reference frame to which the motion vector of the subblock points is further obtained, and the sample value is used as a predictor of the subblock for affine motion compensation. An average difference between an original value and a predictor of each sample of a current coding block is calculated. A control point motion vector corresponding to a minimum average difference is selected as motion vectors of two or three control points of the current coding block. An index number representing a location of the control point motion vector in the candidate list is encoded in a bitstream and sent to a decoder.

On the decoder side, the index number is parsed, and the control point motion vector (CPMV) is determined from the control point motion vector merging candidate list based on the index number.

In addition, it should be noted that in this application, "at least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In an embodiment this application, when an inter prediction mode is used to decode a current block, a syntax element may be used to signal the inter prediction mode.

For some currently used syntax structures of the inter prediction mode used to parse the current block, refer to Table 1. It should be noted that a syntax element in a syntax structure may alternatively be represented by other indicators. This is not specifically limited in this application.

TABLE 1

|  | Descriptor |
|---|---|
| coding_unit(x0, y0, cbWidth, cbHeight, treeType) { | |
|   if(slice_type != I) { | |
|     cu_skip_flag[x0][y0] | ae(v) |
|     if(cu_skip_flag[x0][y0] == 0) | |
|       pred_mode_flag[x0][y0] | ae(v) |
|   } | |
|   if(CuPredMode[x0][y0] == MODE_INTRA) { | |
|     if(treeType == SINGLE_TREE \|\| treeType == DUAL_TREE_LUMA) { | |
|       intra_luma_mpm_flag[x0][y0] | ae(v) |
|       if(intra_luma_mpm_flag[x0][y0]) | |
|         intra_luma_mpm_idx[x0][y0] | ae(v) |
|       else | |
|         intra_luma_mpm_remainder[x0][y0] | ae(v) |
|     } | |
|     if(treeType == SINGLE_TREE \|\| treeType == DUAL_TREE_CHROMA) | |
|       intra_chroma_pred_mode[x0][y0] | ae(v) |
|   } else { /* MODE_INTER (inter mode) */ | |
|     if(cu_skip_flag[x0][y0]) { | |
|       if(MaxNumSubblockMergeCand > 0 && cbWidth >= 8 && cbHeight >= 8) | |
|         merge_subblock_flag[x0][y0] | ae(v) |
|       if(merge_subblock_flag[x0][y0] == 0 && MaxNumMergeCand > 1) | |
|         merge_idx[x0][y0] | ae(v) |
|       if(merge_subblock_flag[x0][y0] == 1 && MaxNumSubblockMergeCand > 1) | |
|         merge_subblock_idx[x0][y0] | ae(v) |
|     } else { | |
|       merge_flag[x0][y0] | ae(v) |
|       if(merge_flag[x0][y0]) { | |
|         if((sps_affine_enabled_flag \|\| sps_sbtmvp_enabled_flag) && cbWidth >= 8 && cbHeight >= 8) | |
|           merge_subblock_flag[x0][y0] | ae(v) |
|         if(merge_subblock_flag[x0][y0] == 0 && MaxNumMergeCand > 1) | |
|           merge_idx[x0][y0] | ae(v) |
|         if(merge_subblock_flag[x0][y0] == 1) | |
|           merge_subblock_idx[x0][y0] | ae(v) |
|       } else { | |
|         if(slice_type == B) | |
|           inter_pred_idc[x0][y0] | ae(v) |
|         if(sps_affine_enabled_flag && cbWidth >= 16 && cbHeight >= 16) { | |
|           inter_affine_flag[x0][y0] | ae(v) |
|           if(sps_affine_type_flag && inter_affine_flag[x0][y0]) | |
|             cu_affine_type_flag[x0][y0] | |
|         } | |
|         if(inter_pred_idc[x0][y0] != PRED_L1) { | |
|           if(num_ref_idx_l0_active_minus1 > 0) | |
|             ref_idx_l0[x0][y0] | ae(v) |
|           mvd_coding(x0, y0, 0, 0) | |
|           if(MotionModelIdc[x0][y0] > 0) | |
|             mvd_coding(x0, y0, 0, 1) | |
|           if(MotionModelIdc[x0][y0] > 1) | |
|             mvd_coding(x0, y0, 0, 2) | |

TABLE 1-continued

| | Descriptor |
|---|---|
|       mvp_l0_flag[x0][y0] | ae(v) |
|     } else { | |
|       MvdL0[x0][y0][0] = 0 | |
|       MvdL0[x0][y0][1] = 0 | |
|     } | |
|     if(inter_pred_idc[x0][y0] != PRED_L0) { | |
|       if(num_ref_idx_l1_active_minus1 > 0) | |
|         ref_idx_l1[x0][y0] | ae(v) |
|       if(mvd_l1_zero_flag && inter_pred_idc[x0][y0] == PRED_BI) { | |
|         MvdL1[x0][y0][0] = 0 | |
|         MvdL1[x0][y0][1] = 0 | |
|         MvdCpL1[x0][y0][0][0] = 0 | |
|         MvdCpL1[x0][y0][0][1] = 0 | |
|         MvdCpL1[x0][y0][1][0] = 0 | |
|         MvdCpL1[x0][y0][1][1] = 0 | |
|         MvdCpL1[x0][y0][2][0] = 0 | |
|         MvdCpL1[x0][y0][2][1] = 0 | |
|       } else { | |
|         mvd_coding(x0, y0, 1, 0) | |
|         if(MotionModelIdc[x0][y0] > 0) | |
|           mvd_coding(x0, y0, 1, 1) | |
|         if(MotionModelIdc[x0][y0] > 1) | |
|           mvd_coding(x0, y0, 1, 2) | |
|         mvp_l1_flag[x0][y0] | ae(v) |
|     } else { | |
|       MvdL1[x0][y0][0] = 0 | |
|       MvdL1[x0][y0][1] = 0 | |
|     } | |
|     if(sps_amvr_enabled_flag && inter_affine_flag == 0 && | |
|       (MvdL0[x0][y0][0] != 0 \|\| MvdL0[x0][y0][1] != 0 \|\| | |
|       MvdL1[x0][y0][0] != 0 \|\| MvdL1[x0][y0][1] != 0)) | |
|       amvr_mode[x0][y0] | ae(v) |
|   } | |
|  } | |
| } | |
| if(CuPredMode[x0][y0] != MODE_INTRA && cu_skip_flag[x0][y0] == 0) | |
|   cu_cbf | ae(v) |
| if(cu_cbf) { | |
|   transform_tree(x0, y0, cbWidth, cbHeight, treeType) | |
| } | |

The variable treeType specifies a coding tree type used to encode a current block.

The variable slice_type is used to specify a type of a slice in which a current block is located, for example, a P type, a B type, or an I type.

The syntax element cu_skip_flag[x0][y0] may be used to specify whether a current block has a residual. For example, when cu_skip_flag[x0][y0]=1, it indicates that the current block has the residual; or when cu_skip_flag[x0][y0]=0, it indicates that the current block has no residual.

It should be noted that a skip mode is a special merge mode. After a merge mode is used to find a motion vector, if an encoder determines, by using a method, that the current block is basically the same as a reference block, residual data does not need to be transmitted, and only an index of the motion vector and a cu_skip_flag need to be transmitted. Therefore, if cu_skip_flag[x0][y0]=0, it indicates that the current block has no residual and residual data does not need to be parsed.

The syntax element pred_mode_flag[x0][y0] is used to specify whether a prediction mode for a current block is an inter prediction or intra prediction mode.

The variable CuPredMode[x0][y0] is determined based on pre_mode_flag[x0][y0]. MODE_INTRA specifies an intra prediction mode.

The syntax element merge_flag[x0][y0] may be used to specify whether a merge (merge) mode is used for a current block. For example, when merge_flag[x0][y0]=1, it indicates that the merge mode is used for the current block; or when merge_flag[x0][y0]=0, it indicates that the merge mode is not used for the current block, where x0 and y0 represent coordinates of the current block in a video picture.

cb Width specifies the width of the current block, and cbHeight specifies the height of the current block.

The syntax element sps_affine_enabled_flag may be used to specify whether an affine motion model may be used to inter predict on a picture block comprised in a video picture. For example, when sps_affine_enabled_flag=0, it indicates that the affine motion model cannot be used to inter predict the picture block comprised in the video picture; or when sps_affine_enabled_flag=1, it indicates that the affine motion model can be used to inter predict the picture block comprised in the video picture.

The syntax element merge_subblock_flag[x0][y0] may be used to specify whether a subblock-based merge mode is used for a current block. A type (slice_type) of a slice in which the current block is located is a P type or a B type. For example, when merge_subblock_flag[x0][y0]=1, it indicates that the subblock-based merge mode is used for the current block; or when merge_subblock_flag[x0][y0]=0, it indicates that the subblock-based merge mode is not used for the current block, but a translational motion model based merge mode can be used.

The syntax element merge_idx[x0][y0] may be used to specify an index of a merging candidate list.

The syntax element merge_subblock_idx[x0][y0] may be used to specify an index of a subblock-based merging candidate list.

sps_sbtmvp_enabled_flag may be used to specify whether an ATMVP mode can be used to inter predict a picture block comprised in a video picture. For example, when sps_sbtmvp_enabled_flag=1, it indicates that the ATMVP mode can be used to inter predict the picture block comprised in the video picture; or when sps_sbtmvp_enabled_flag=0, it indicates that the ATMVP mode cannot be used to inter predict the picture block comprised in the video picture.

The syntax element inter_affine_flag[x0][y0] may be used to specify whether an affine motion model based AMVP mode is used for a current block when a slice in which the current block is located is a P-type slice or a B-type slice. For example, when inter_affine_flag[x0][y0]=0, it indicates that the affine motion model based AMVP mode is used for the current block; or when inter_affine_flag[x0][y0]=1, it indicates that the affine motion model based AMVP mode is not used for the current block, but a translational motion model based AMVP mode can be used. The syntax element cu_affine_type_flag[x0][y0] may be used to specify whether a 6-parameter affine motion model is used to perform motion compensation for a current block when a slice in which the current block is located is a P-type slice or a B-type slice. When cu_affine_type_flag[x0][y0]=0, it indicates that the 6-parameter affine motion model is not used to perform motion compensation for the current block, but only a 4-parameter affine motion model may be used to perform motion compensation; or when cu_affine_type_flag[x0][y0]=1, it indicates that the 6-parameter affine motion model is used to perform motion compensation for the current block.

As shown in Table 2, when MotionModelIdc[x0][y0]=1, it indicates that a 4-parameter affine motion model is used; when MotionModelIdc[x0][y0]=2, it indicates that a 6-parameter affine motion model is used; or when MotionModelIdc[x0][y0]=0, it indicates that a translational motion model is used.

TABLE 2

| MotionModelIdc[x0][y0] | Motion model for motion compensation (motion model for motion compensation) |
|---|---|
| 0 | Translational motion (translational motion) |
| 1 | 4-parameter affine motion (4-parameter affine motion) |
| 2 | 6-parameter affine motion (6-parameter affine motion) |

The variable MaxNumMergeCand is used to specify a maximum length of a merging candidate motion vector list, the variable MaxNumSubblockMergeCand is used to specify a maximum length of a subblock-based merging candidate motion vector list, inter_pred_idc[x0][y0] is used to specify a prediction direction, PRED_L0 specifies forward prediction, num_ref_idx_l0_active_minus1 specifies the number of reference frames in a forward reference frame list, ref_idx_l0[x0][y0] specifies an index value for a forward reference frame of a current block, mvd_coding(x0, y0, 0, 0) specifies the first motion vector difference, mvp_l0_flag[x0][y0] specifies an index value for a forward MVP candidate list, PRED_L1 is used to indicate backward prediction, num_ref_idx_l1_active_minus1 indicates the number of reference frames in a backward reference frame list, ref_idx_l1[x0][y0] specifies an index value for a backward reference frame of the current block, and mvp_l1_flag[x0][y0] specifies an index value for a backward MVP candidate list.

In Table 1, ae(v) represents a syntax element encoded by using a context-based adaptive binary arithmetic coding (CABAC).

Figure 8A:
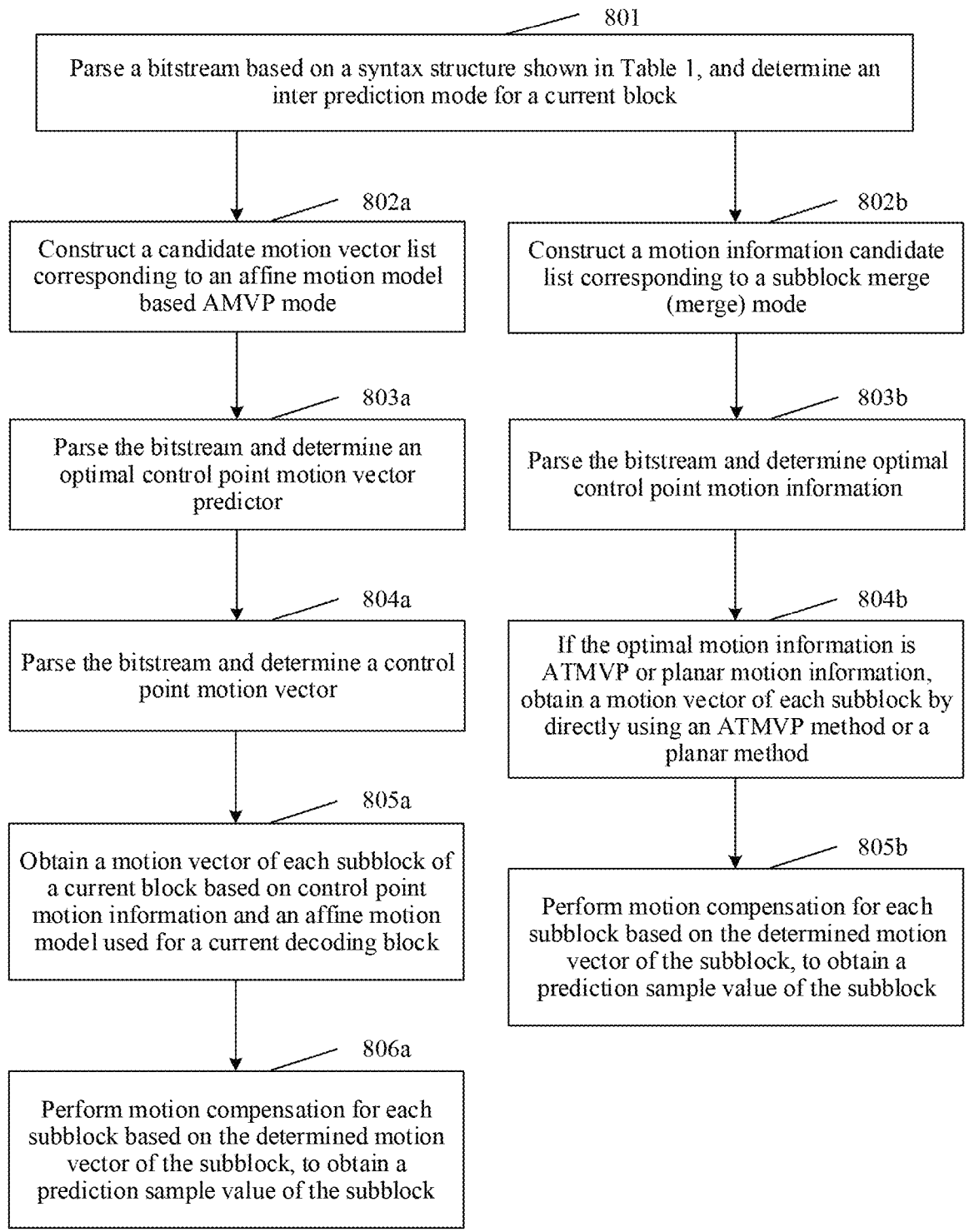
FIG. 8A is a flowchart of an inter prediction method for implementing embodiments of this application.

The following describes an inter prediction process in detail according to some embodiments, as shown in FIG. 8A.

Operation 801: Parse a bitstream based on a syntax structure shown in Table 1, and determine an inter prediction mode for a current block.

If it is determined that the inter prediction mode for the current block is an affine motion model based AMVP mode, operation 802a is performed.

The syntax elements sps_affine_enabled_flag=1, merge_flag=0, and inter_affine_flag=1 indicate that the inter prediction mode for the current block is the affine motion model based AMVP mode.

If it is determined that the inter prediction mode for the current block is a subblock merge (merge) mode, operation 802b is performed.

The syntax element sps_affine_enabled_flag=1 or the syntax element sps_sbtmvp_enabled_flag=1, and the syntax elements merge_flag=1 and merge_subblock_flag=1 indicate that the inter prediction mode for the current block is the subblock merge mode.

Operation 802a: Construct a candidate motion vector list corresponding to the affine motion model based AMVP mode. Perform operation 803a.

A candidate control point motion vector of the current block is derived by using an inherited control point motion vector prediction method and/or a constructed control point motion vector prediction method, and is added to the candidate motion vector list.

The candidate motion vector list may comprise a 2-tuple list (a 4-parameter affine motion model is used for the current coding block) or a 3-tuple list. The 2-tuple list comprises one or more 2-tuples used to construct a 4-parameter affine motion model. The 3-tuple list comprises one or more 3-tuples used to construct a 6-parameter affine motion model.

Optionally, the candidate motion vector 2-tuple/3-tuple list is pruned and sorted according to a particular rule, and may be truncated or padded to a particular quantity.

A1: A process of constructing the candidate motion vector list by using the inherited control point motion vector prediction method is described.

FIG. 4 is used as an example. In the example in FIG. 4, blocks at neighboring locations around the current block are traversed in an order of A1→B1→B0→A0→B2, to find an affine coded block including a block at a neighboring location of the current block, and to obtain control point motion information of the affine coded block. Further, the control point motion information of the affine coded block is used to construct a motion model, to derive candidate control point motion information of the current block. For details, refer to the foregoing descriptions in "3. Inherited control point motion vector prediction method". Details are not described herein again.

For example, an affine motion model used for the current block is a 4-parameter affine motion model (that is, MotionModelIdc=1). If a 4-parameter affine motion model is used for a neighboring affine decoding block, motion vectors of two control points of the affine decoding block are obtained: a motion vector $(vx_4, vy_4)$ of the top-left control point $(x_4, y_4)$ and a motion vector $(vx_5, vy_5)$ of the top-right control point ($x_5$, $y_5$). The affine decoding block is an affine coded block for which prediction is performed by using an affine motion model during encoding.

Motion vectors of two control points, namely, the top-left and top-right control points of the current block are derived respectively according to Formulas (6) and (7) corresponding to the 4-parameter affine motion model, by using the 4-parameter affine motion model including the two control points of the neighboring affine decoding block.

If a 6-parameter affine motion model is used for the neighboring affine decoding block, motion vectors of three control points of the neighboring affine decoding block are obtained, for example, a motion vector ($vx_4$, $vy_4$) of the top-left control point ($x_4$, $y_4$), a motion vector ($vx_5$, $vy_5$) of the top-right control point ($x_5$, $y_5$), and a motion vector ($vx_6$, $vy_6$) of the bottom-left vertex ($x_6$, $y_6$) in FIG. 4.

Motion vectors of two control points, namely, the top-left and top-right control points of the current block are derived respectively according to Formulas (8) and (9) corresponding to the 6-parameter affine motion model, by using the 6-parameter affine motion model including the three control points of the neighboring affine decoding block.

For example, an affine motion model used for a current decoding block is a 6-parameter affine motion model (that is, MotionModelIdc=2). If an affine motion model used for a neighboring affine decoding block is a 6-parameter affine motion model, motion vectors of three control points of the neighboring affine decoding block are obtained, for example, a motion vector ($vx_4$, $vy_4$) of the top-left control point ($x_4$, $y_4$), a motion vector ($vx_5$, $vy_5$) of the top-right control point ($x_5$, $y_5$), and a motion vector ($vx_6$, $vy_6$) of the bottom-left vertex ($x_6$, $y_6$) in FIG. 4.

Motion vectors of three control points, namely, the top-left, top-right, and bottom-left control points of the current block are derived respectively according to Formulas (8), (9), and (10) corresponding to the 6-parameter affine motion model, by using the 6-parameter affine motion model including the three control points of the neighboring affine decoding block.

If an affine motion model used for the neighboring affine decoding block is a 4-parameter affine motion model, motion vectors of two control points of the neighboring affine decoding block are obtained: a motion vector ($vx_4$, $vy_4$) of the top-left control point ($x_4$, $y_4$) and a motion vector ($vx_5$, $vy_5$) of the top-right control point ($x_5$, $y_5$).

Motion vectors of three control points, namely, the top-left, top-right, and bottom-left control points of the current block are derived respectively according to Formulas (6) and (7) corresponding to the 4-parameter affine motion model, by using the 4-parameter affine motion model including the two control points of the neighboring affine decoding block.

It should be noted that other motion models, candidate locations, and search orders may also be used in embodiments of this application. Details are not described herein. It should be noted that methods for representing motion models of neighboring and current coding blocks based on other control points may also be used in embodiments of this application. Details are not described herein.

A2: A process of constructing the candidate motion vector list by using the constructed control point motion vector prediction method is described.

For example, an affine motion model used for a current decoding block is a 4-parameter affine motion model (that is, MotionModelIdc=1), and motion vectors of the top-left vertex and the top-right vertex of the current coding block are determined based on motion information of a neighboring encoded block of the current coding block. Specifically, the candidate motion vector list may be constructed by using the constructed control point motion vector prediction method 1 or the constructed control point motion vector prediction method 2. For the specific method, refer to the foregoing descriptions in "4. Constructed control point motion vector prediction method 1" and "5. Constructed control point motion vector prediction method 2". Details are not described herein again.

For example, an affine motion model used for a current decoding block is a 6-parameter affine motion model (that is, MotionModelIdc=2), and motion vectors of the top-left vertex, the top-right vertex, and the bottom-left vertex of the current coding block are determined based on motion information of a neighboring encoded block of the current coding block. Specifically, the candidate motion vector list may be constructed by using the constructed control point motion vector prediction method 1 or the constructed control point motion vector prediction method 2. For the specific method, refer to the foregoing descriptions in "4. Constructed control point motion vector prediction method 1" and "5. Constructed control point motion vector prediction method 2". Details are not described herein again.

It should be noted that other combinations of control point motion information may also be used in embodiments of this application. Details are not described herein.

Operation 803*a*: Parse the bitstream and determine an optimal control point motion vector predictor. Perform operation 804*a*.

B1: If the affine motion model used for the current decoding block is the 4-parameter affine motion model (MotionModelIdc=1), an index number is parsed, and an optimal motion vector predictor for the two control points are determined from the candidate motion vector list based on the index number.

For example, the index number is mvp_10_flag or mvp_11_flag.

B2: If the affine motion model used for the current decoding block is the 6-parameter affine motion model (MotionModelIdc=2), an index number is parsed, and an optimal motion vector predictor for the three control points are determined from the candidate motion vector list based on the index number.

Operation 804*a*: Parse the bitstream and determine a control point motion vector.

C1: If the affine motion model used for the current decoding block is the 4-parameter affine motion model (MotionModelIdc=1), motion vector differences of the two control points of the current block are obtained by decoding the bitstream, and motion vectors of the two control points are then obtained based on the motion vector differences and the motion vector predictors of the control points. Using forward prediction as an example, the motion vector differences of the two control points are mvd_coding(x0, y0, 0, 0) and mvd_coding(x0, y0, 0, 1), respectively.

For example, motion vector differences of the top-left control point and the top-right control point are obtained by decoding the bitstream, and are added to respective motion vector predictors, to obtain motion vectors of the top-left control point and the top-right control point of the current block.

C2: If the affine motion model used for the current decoding block is the 6-parameter affine motion model (MotionModelIdc=2), motion vector differences of the three control points of the current block are obtained by decoding the bitstream, and motion vectors of the three control points are then obtained based on the motion vector differences and the motion vector predictors of the control points. Using forward prediction as an example, motion vector differences of three control points are mvd_coding(x0, y0, 0, 0), mvd_coding(x0, y0, 0, 1), and mvd_coding(x0, y0, 0, 2), respectively.

For example, motion vector differences of the top-left control point, the top-right control point, and the bottom-left control point are obtained by decoding the bitstream, and are added to respective motion vector predictors, to obtain motion vectors of the top-left control point, the top-right control point, and the bottom-left control point of the current block.

Operation 805a: Obtain a motion vector of each subblock of the current block based on control point motion information and the affine motion model used for the current decoding block.

Figure 8B:
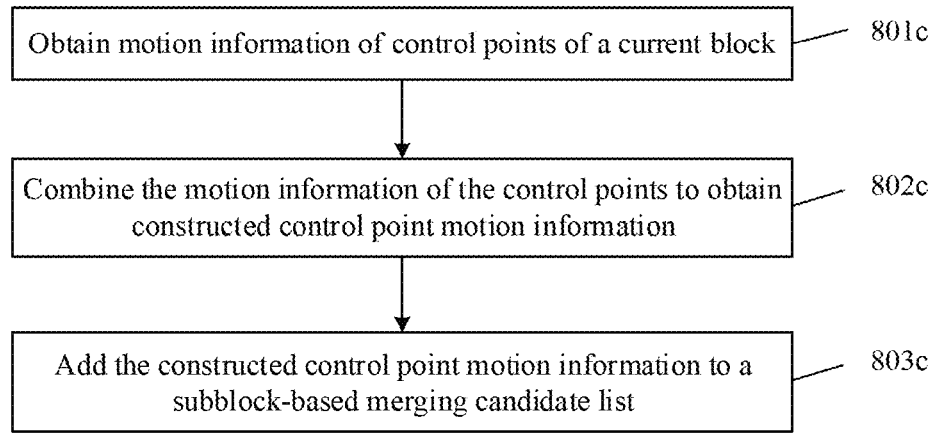
FIG. 8B is a schematic diagram of constructing a candidate motion vector list for implementing embodiments of this application.
Figure 8C:
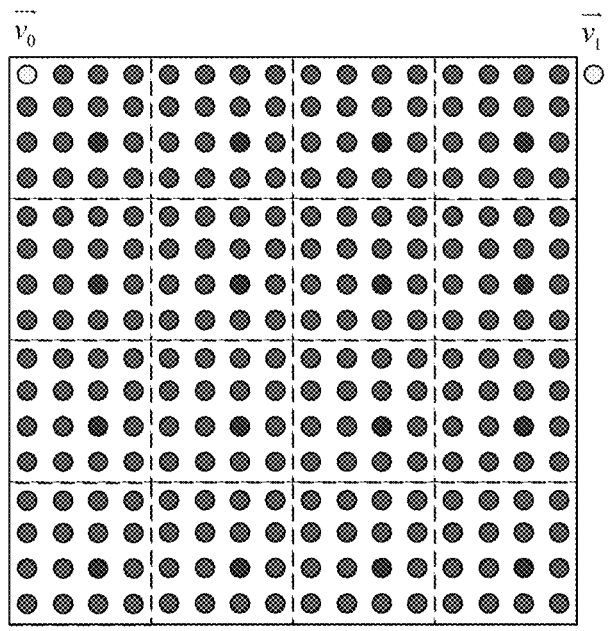
FIG. 8C is a schematic diagram of a motion compensation unit for implementing embodiments of this application.

One subblock in the current affine decoding block may be equivalent to one motion compensation unit, and the width and the height of the subblock are less than the width and the height of the current block. Motion information of a sample at a preset location in a motion compensation unit may be used to represent motion information of all samples of the motion compensation unit. Assuming that the size of the motion compensation unit is M×N, the sample at the preset location may be a center sample (M/2, N/2), the top-left sample (0, 0), the top-right sample (M−1, 0), or a sample at another location in the motion compensation unit. The center sample of the motion compensation unit is used as an example for description below, as shown in FIG. 8C. In FIG. 8C, $V_0$ represents a motion vector of the top-left control point, and $V_1$ represents a motion vector of the top-right control point. Each small box represents one motion compensation unit.

Coordinates of a center sample of a motion compensation unit relative to the top-left sample of the current affine decoding block are calculated according to Formula (31). In Formula (31), i represents the $i^{th}$ motion compensation unit in the horizontal direction (from left to right), j represents the $j^{th}$ motion compensation unit in the vertical direction (from top to bottom), and $(x_{(i,j)}, y_{(i,j)})$ represents coordinates of the center sample of the $(i, j)^{th}$ motion compensation unit relative to the top-left control point sample of the current affine decoding block.

If the affine motion model used for the current affine decoding block is the 6-parameter affine motion model, $(x_{(i,j)}, y_{(i,j)})$ is substituted into Formula (32) corresponding to the 6-parameter affine motion model to obtain a motion vector $(vx_{(i,j)}, vy_{(i,j)})$ of a center sample of each motion compensation unit, and the motion vector is used as motion vectors of all samples of the motion compensation unit.

If the affine motion model used for the current affine decoding block is the 4-parameter affine motion model, $(x_{(i,j)}, y_{(i,j)})$ is substituted into Formula (33) corresponding to the 4-parameter affine motion model to obtain a motion vector $(vx_{(i,j)}, vy_{(i,j)})$ of a center sample of each motion compensation unit, and the motion vector is used as motion vectors of all samples of the motion compensation unit.

$$\begin{cases} x_{(i,j)} = M \times i + \frac{M}{2}, i = 0, 1.. \\ y_{(i,j)} = N \times j + \frac{N}{2}, j = 0, 1.. \end{cases} \quad (31)$$

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (32)$$

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (33)$$

Operation 806a: Perform motion compensation for each subblock based on the determined motion vector of the subblock, to obtain a prediction sample value of the subblock.

Operation 802b: Construct a motion information candidate list corresponding to a subblock merge (merge) mode.

Specifically, the motion information candidate list corresponding to the subblock merge mode (sub-block based merging candidate list) may be constructed by using one or more of advanced temporal motion vector prediction, an inherited control point motion vector prediction method, a constructed control point motion vector prediction method, or a planar method. In this embodiment of this application, the motion information candidate list corresponding to the subblock merge mode may be referred to as a subblock-based merging candidate list for short.

Optionally, the motion information candidate list is pruned and sorted according to a particular rule, and may be truncated or padded to a particular quantity.

D0: If sps_sbtmvp_enabled_flag=1, a candidate motion vector is obtained by using the ATMVP, and added to the subblock-based merging candidate list. For details, refer to the foregoing descriptions in "6. Advanced temporal motion vector prediction".

D1: If sps_affine_enabled_flag=1, candidate control point motion information of the current block is derived by using the inherited control point motion vector prediction method, and is added to the subblock-based merging candidate list. For details, refer to the foregoing descriptions in "3. Inherited control point motion vector prediction method".

For example, in FIG. 6C, blocks at neighboring locations around the current block are traversed in an order of A1→B1→B0→A0→B2, to find an affine coded block including a block at a neighboring location of the current block, and to obtain control point motion information of the affine coded block. Further, a motion model corresponding to the affine coded block is used to derive candidate control point motion information of the current block.

If the subblock-based merging candidate list is empty, the candidate control point motion information is added to the subblock-based merging candidate list. Otherwise, motion information in the subblock-based merging candidate list is traversed sequentially to check whether motion information that is the same as the candidate control point motion information exists in the subblock-based merging candidate list. If no motion information that is the same as the candidate control point motion information exists in the subblock-based merging candidate list, the candidate control point motion information is added to the subblock-based merging candidate list.

Determining whether two pieces of candidate motion information are the same is to be implemented by determining whether forward and backward reference frames of the two pieces of candidate motion information and horizontal and vertical components of each forward motion vector and backward motion vector are the same. The two pieces of candidate motion information are considered as being different only when all these elements are different.

If a quantity of pieces of motion information in the subblock-based merging candidate list reaches a maximum list length MaxNumSubblockMergeCand (MaxNumSubblockMergeCand is a positive integer such as 1, 2, 3, 4, or 5, where 5 is used as an example in the following descriptions, and details are not described herein), construction of the candidate list is completed. Otherwise, a block at a next neighboring location is traversed.

D2: If sps_affine_enabled_flag=1, candidate control point motion information of the current block is derived by using the constructed control point motion vector prediction method, and is added to the subblock-based merging candidate list according to some embodiments, as shown in FIG. 8B.

Operation 801c: Obtain motion information of control points of the current block. For example, for details, refer to operation 601 in the foregoing descriptions in "5. Constructed control point motion vector prediction method 2". The details are not described herein again.

Operation 802c: Combine the motion information of the control points to obtain constructed control point motion information. For details, refer to operation 602 in FIG. 6D. The details are not described herein again.

Operation 803c: Add the constructed control point motion information to the subblock-based merging candidate list.

If the length of the subblock-based merging candidate list is less than a maximum list length MaxNumSubblock-MergeCand, the combinations of the motion information of the control points are traversed in a preset order, and a resulting valid combination is used as the candidate control point motion information. In this case, if the subblock-based merging candidate list is empty, the candidate control point motion information is added to the subblock-based merging candidate list. Otherwise, motion information in the candidate motion vector list is traversed sequentially to check whether motion information that is the same as the candidate control point motion information exists in the subblock-based merging candidate list. If no motion information that is the same as the candidate control point motion information exists in the subblock-based merging candidate list, the candidate control point motion information is added to the subblock-based merging candidate list.

For example, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3). There are six combinations in total.

For example, if sps_affine_type_flag=1, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3). There are six combinations in total. An order for adding the six combinations to the candidate motion vector list is not specifically limited in this embodiment of this application.

If sps_affine_type_flag=0, a preset order is as follows: Affine (CP1, CP2)→Affine (CP1, CP3). There are two combinations in total. An order for adding the two combinations to the candidate motion vector list is not specifically limited in this embodiment of this application.

If control point motion information corresponding to a combination is unavailable, the combination is deemed unavailable. If a combination is available, a reference frame index of the combination is determined (when there are two control points, a minimum reference frame index is selected as the reference frame index of the combination; when there are more than two control points, a reference frame index with a maximum presence frequency is selected as the reference frame index of the combination; and if a plurality of reference frame indexes have a same presence frequency, a minimum reference frame index is selected as the reference frame index of the combination). Control point motion vectors are further scaled. If motion information of all control points after scaling are the same, the combination is invalid.

D3: Optionally, if sps_planar_enabled_flag=1, motion information constructed by using the ATMVP is added to the subblock-based merging candidate list. For details, refer to the foregoing descriptions in "7. Planar motion vector prediction".

Optionally, in this embodiment of this application, the candidate motion vector list may be padded. For example, after the foregoing traversal process, if the length of the candidate motion vector list is less than the maximum list length MaxNumSubblockMergeCand, the candidate motion vector list may be padded until the list length is equal to MaxNumSubblockMergeCand.

The padding may be performed by using a zero motion vector padding method, or by using a method for combining or weighted averaging existing candidate motion information in the existing list. It should be noted that other methods for padding the candidate motion vector list may also be used in this application. Details are not described herein.

Operation 803b: Parse the bitstream and determine optimal control point motion information.

An index number merge_subblock_idx is parsed, and the optimal motion information is determined from the subblock-based merging candidate list based on the index number.

merge_subblock_idx is usually binarized by using a TR code (truncated unary, truncated unary code). In other words, merge_subblock_idx is mapped to different bin strings based on a maximum index value. The maximum index value is preconfigured or transmitted. For example, if the maximum index value is 4, merge_subblock_idx is binarized according to Table 3.

TABLE 3

| Index | Bin string | | | |
|---|---|---|---|---|
| 0 | 0 | | | |
| 1 | 1 | 0 | | |
| 2 | 1 | 1 | 0 | |
| 3 | 1 | 1 | 1 | 0 |
| 4 | 1 | 1 | 1 | 1 |

When the maximum index value is 2, merge_subblock_idx is binarized according to Table 4.

TABLE 4

| Index | Bin string | |
|---|---|---|
| 0 | 0 | |
| 1 | 1 | 0 |
| 2 | 1 | 1 |

If merge_subblock_idx is transmitted by using a bin string, a decoder side may determine the index number based on the maximum index value and Table 2 or Table 3. For example, the maximum index value is 4. When decoding is performed to obtain the index number, if 0 is obtained or the index number obtained through decoding is equal to the maximum index value, the index number is determined. For example, when decoding is performed to obtain the index number, if the first bit is 0, the decoding that is performed to obtain the index number ends, and the index number is determined to be 0. For another example, if the first bit is 1 and the second bit is 0, the decoding that is performed to obtain the index number ends, and the index number is determined to be 1.

Setting of the maximum index value and a binarization table is not specifically limited in this embodiment of this application.

Operation 804b: If the optimal motion information is ATMVP or planar motion information, obtain a motion vector of each subblock by directly using the ATMVP or planar method.

If a motion mode indicated by the optimal motion information is an affine mode, the motion vector of each subblock of the current block is obtained based on the optimal control point motion information and an affine motion model used for a current decoding block. This process is the same as operation 805a.

Operation 805b: Perform motion compensation for each subblock based on the determined motion vector of the subblock, to obtain a prediction sample value of the subblock.

In the existing technology, there is no feasible manner of determining a maximum length (MaxNumSubblockMergeCand) of the candidate motion vector list corresponding to the subblock merge mode.

In view of this, the embodiments of this application provide a video picture prediction method and apparatus, to provide a manner of determining a maximum length (MaxNumSubblockMergeCand) of a candidate motion vector list corresponding to a subblock merge mode. The method and the apparatus are based on a same inventive concept. Because a problem-resolving principle of the method is similar to that of the apparatus, mutual reference may be made between implementations of the apparatus and the method. No repeated descriptions are provided.

The manner of determining the maximum length of the candidate motion vector list corresponding to the subblock merge mode is described below in detail in two cases.

In a first case, the subblock merge mode may comprise at least one of an affine mode, an advanced temporal motion vector prediction mode, or a planar motion vector prediction mode.

In a second case, a planar motion vector prediction mode is not considered to be present in the subblock merge mode. In other words, the subblock merge mode may comprise at least one of an affine mode or an advanced temporal motion vector prediction mode.

The following describes implementations of this application in detail from a perspective of a decoder side with reference to the accompanying drawings. Specifically, the manner may be performed by a video decoder 30, or may be implemented by a motion compensation module in a video decoder, or may be performed by a processor.

For the first case, several possible implementations, a first implementation to a fifth implementation, are provided as examples according to some embodiments.

Figure 9:
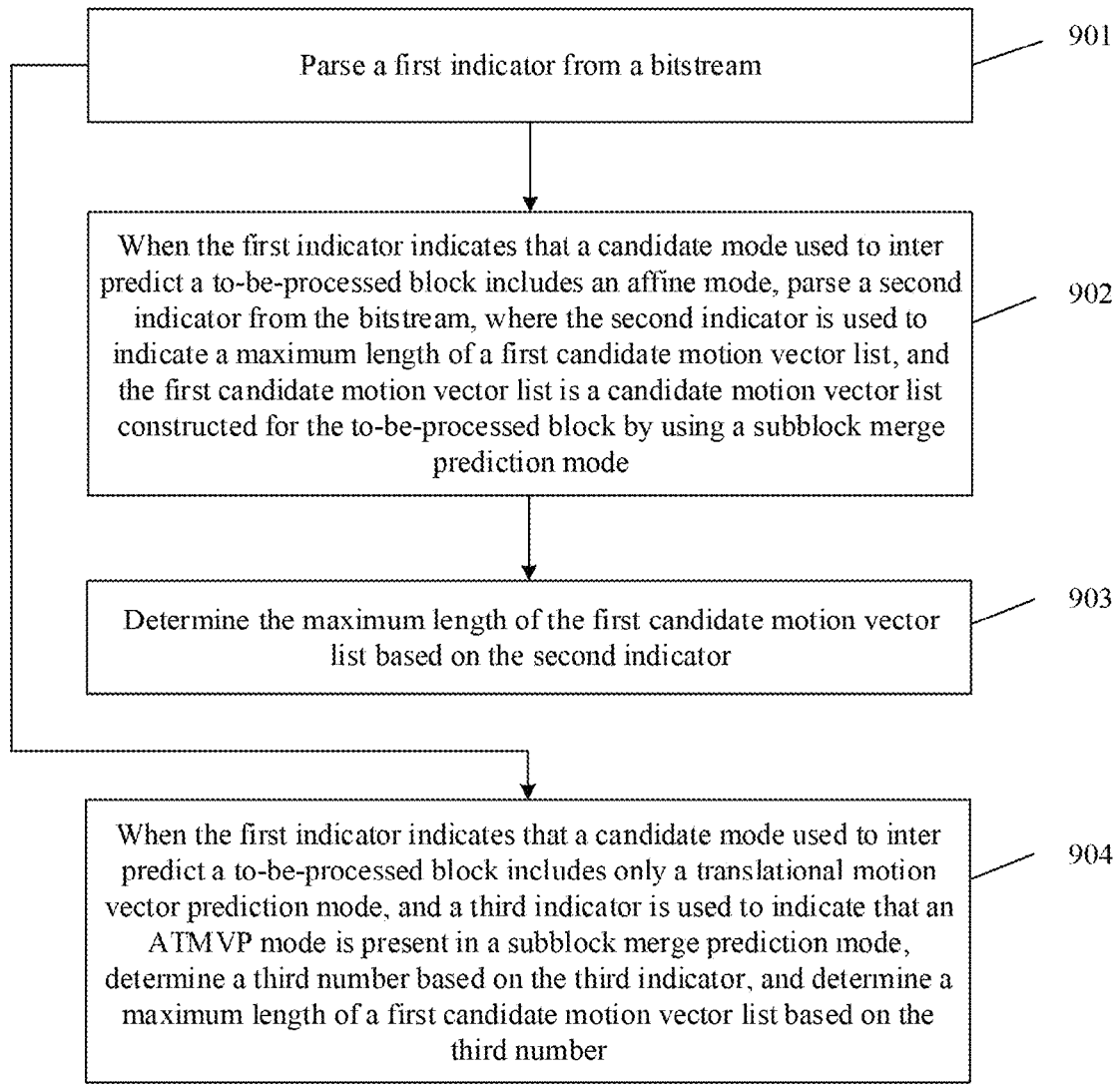
FIG. 9 is a schematic flowchart of a video picture prediction method for implementing embodiments of this application.

FIG. 9 shows descriptions of the first implementation according to some embodiments.

Operation S901: Parse a first indicator from a bitstream. Perform S902 or S904.

The first indicator is used to indicate whether a candidate mode used to inter predict a to-be-processed block comprises the affine mode. In other words, the indicator 1 is used to indicate whether the affine mode can (or is allowed to) be used to perform motion compensation on a to-be-processed block.

For example, the first indicator may be configured in an SPS in the bitstream. On this basis, parsing the first indicator from the bitstream may be implemented in the following manner: parsing the indicator 1 from the SPS in the bitstream. Alternatively, the first indicator may be configured in a slice header of a slice in the bitstream, the to-be-processed block is comprised in the slice. Based on this, parsing the first indicator from the bitstream may be implemented in the following manner: parsing the first indicator from the slice header of the slice in the bitstream, the to-be-processed block is comprised in the slice.

For example, the first indicator may be represented by a syntax element sps_affine_enabled_flag, and sps_affine_enabled_flag is used to specify whether an affine mode can be used to inter predict a picture block comprised in a video picture. For example, when sps_affine_enabled_flag=0, it indicates that the affine mode cannot be used to inter predict the picture block comprised in the video picture. When sps_affine_enabled_flag=1, it indicates that an affine motion model can be used to inter predict the picture block comprised in the video picture.

Operation S902: When the first indicator indicates that the candidate mode used to inter predict the to-be-processed block comprises the affine mode, parse a second indicator from the bitstream, where the second indicator is used to indicate (or determine) a maximum length of a first candidate motion vector list, and the first candidate motion vector list is a candidate motion vector list constructed for the to-be-processed block by using a subblock merge prediction mode. The first candidate motion vector list may be referred to as MaxNumSubblockMergeCand.

For example, the second indicator may be configured in the SPS, a PPS, or the slice header. Based on this, parsing the second indicator from the bitstream may be implemented in the following manner: parsing the second indicator from the sequence parameter set in the bitstream; or parsing the second indicator from the slice header of the slice, including the to-be-processed block, in the bitstream.

For example, the second indicator may be represented by K_minus_max_num_subblock_merge_cand.

For example, a value of K_minus_max_num_subblock_merge_cand is allowed to be in a range of 0 to 4.

For example, a maximum value of MaxNumSubblockMergeCand is allowed to be 5.

When the maximum value of MaxNumSubblockMergeCand is allowed to be 5, the second indicator may be represented by five_minus_max_num_subblock_merge_cand.

Table 5 shows an example of a syntax structure for parsing the second indicator.

TABLE 5

| | Descriptor |
|---|---|
| slice header( ) { | |
| ... | |
|   if(sps_affine_enable_flag) | |
|     five_minus_max_num_subblock_merge_cand | ue(v) |
| ... | |
| } | |

Operation S903: Determine the maximum length of the first candidate motion vector list based on the second indicator.

In an example, when the first indicator indicates that the candidate mode used to inter predict the to-be-processed block comprises the affine mode, the maximum length (MaxNumSubblockMergeCand) of the first candidate motion vector list may be obtained according to the following formula: MaxNumSubblockMergeCand=K K_minus_max_num_subblock_merge_cand, where MaxNumSubblockMergeCand represents the maximum length of the first candidate motion vector list, K_minus_max_num_subblock_merge_cand represents the second indicator, and K is a preset non-negative integer.

Operation S904: When the first indicator indicates that the candidate mode used to inter predict the to-be-processed block only comprises the translational motion vector prediction mode, and the third indicator is used to indicate that the ATMVP mode is present in the subblock merge prediction mode, determine a third number based on the third indicator, and determine the maximum length of the first candidate motion vector list based on the third number.

That the candidate mode used to inter predict the to-be-processed block only comprises the translational motion vector prediction mode means that the candidate mode used to inter predict the to-be-processed block cannot (is not allowed to) comprise the affine mode. The third indicator is used to indicate whether the ATMVP mode is present in the subblock merge prediction mode. In other words, the third indicator is used to indicate whether the ATMVP mode is allowed to be used to inter predict the to-be-processed block. The third indicator may be configured in the SPS, the PPS, or the slice header.

In an example, when the first indicator indicates that the candidate mode used to inter predict the to-be-processed block only comprises the translational motion vector prediction mode, and the third indicator is used to indicate that the ATMVP mode is present in the subblock merge prediction mode, the maximum length (MaxNumSubblockMergeCand) of the first candidate motion vector list is equal to the third number.

For example, the third indicator may be represented by sps_sbtmvp_enabled_flag. For example, when sps_sbtmvp_enabled_flag is equal to a first value, it indicates that the ATMVP mode is not present in the subblock merge prediction mode; or when sps_sbtmvp_enabled_flag is equal to a second value, it indicates that the ATMVP mode is present in the subblock merge prediction mode. For example, the first value is equal to 0, and the second value is equal to 1.

For example, the third number may be used to indicate the maximum number of motion vectors that are supported in prediction performed by using the ATMVP mode. For example, when the first indicator indicates that the candidate mode used to inter predict the to-be-processed block only comprises the translational motion vector prediction mode, if sps_sbtmvp_enabled_flag=0, the third number is equal to 0, or if sps_sbtmvp_enabled_flag=1, the third number is equal to the maximum number of motion vectors that are supported in prediction performed by using the ATMVP mode. In addition, when the maximum number of motion vectors that are supported in prediction performed by using the ATMVP mode is 1, the third number may be equal to a value of sps_sbtmvp_enabled_flag. For example, if sps_sbtmvp_enabled_flag=0, the third number is equal to 0; or if sps_sbtmvp_enabled_flag=1, the third number is equal to 1.

That the maximum value of MaxNumSubblockMergeCand is allowed to be 5 is used as an example. If sps_affine_enable_flag=0, MaxNumSubblockMergeCand is obtained according to the following formula:

MaxNumSubblockMergeCand=sps_sbtmvp_enabled_flag.

If sps_affine_enable_flag=1, MaxNumSubblockMergeCand is obtained according to the following formula:

MaxNumSubblockMergeCand=5−five_minus_max_num_subblock_merge_cand.

For example, five_minus_max_num_subblock_merge_cand may be defined as subtracting a maximum length of a subblock-based merging motion vector prediction list in a slice from 5 (five_minus_max_num_subblock_merge_cand specifies the maximum number of subblock-based merging motion vector prediction (MVP) candidates supported in the slice subtracted from 5).

The maximum number of subblock-based merging MVP candidates, MaxNumSubblockMergeCand, is derived as follows:

If sps_affine_enabled_flag is equal to 0:

MaxNumSubblockMergeCand=sps_sbtmvp_enabled_flag;

Otherwise (sps_affine_enabled_flag is equal to 1):

MaxNumSubblockMergeCand=5−five_minus_max_num_subblock_merge_cand.

A value of MaxNumSubblockMergeCand shall be in a range of 0 to 5, inclusive.

Figure 10:
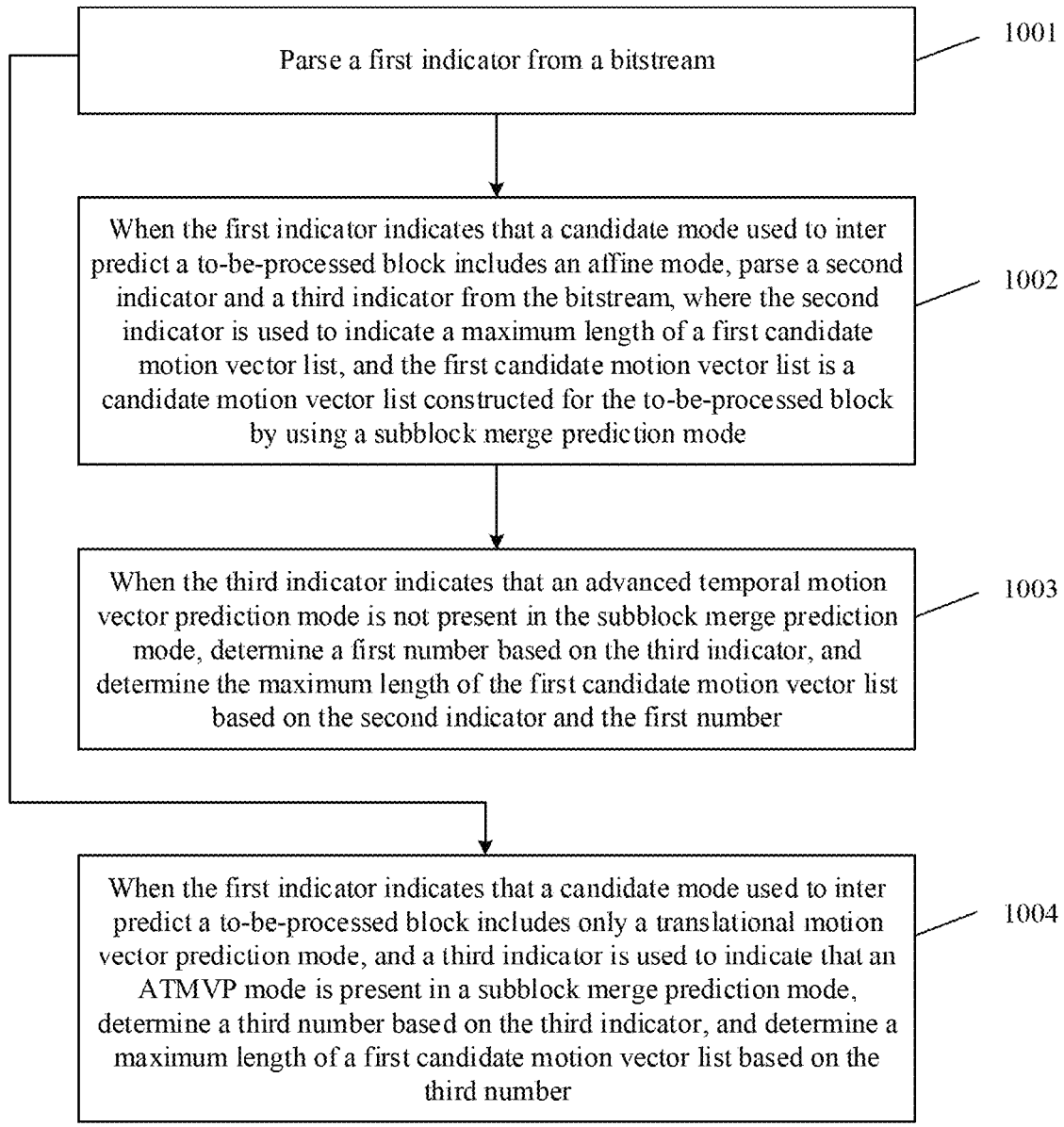
FIG. 10 is a schematic flowchart of another video picture prediction method for implementing embodiments of this application.

FIG. 10 shows descriptions of the second implementation according to some embodiments.

Operation S1001: For details of S1001, refer to S901. The details are not described herein again. Perform S1002 or S1004.

Operation S1002: When the first indicator indicates that the candidate mode used to inter predict the to-be-processed block comprises the affine mode, parse a second indicator and a third indicator from the bitstream, where the second indicator is used to indicate (or determine) a maximum length of a first candidate motion vector list, and the first candidate motion vector list is a candidate motion vector list constructed for the to-be-processed block by using a subblock merge prediction mode.

Operation S1003: When the third indicator indicates that the advanced temporal motion vector prediction mode is not present in the subblock merge prediction mode, determine a first number based on the third indicator, and determine the maximum length of the first candidate motion vector list based on the second indicator and the first number.

For explanations of the first indicator, the second indicator, and the third indicator, refer to the embodiment corresponding to FIG. 9. Details are not described herein again.

When the third indicator indicates that the ATMVP mode is not present in the subblock merge prediction mode, the first number may be equal to the maximum number of motion vectors that are supported in prediction performed by using the ATMVP mode. For example, the third indicator may be represented by sps_sbtmvp_enabled_flag. When sps_sbtmvp_enabled_flag=0, it indicates that the advanced temporal motion vector prediction mode is not present in the subblock merge prediction mode. In this case, the first number is equal to the maximum number of motion vectors that are supported in prediction performed by using the ATMVP mode. On the contrary, when sps_sbtmvp_enabled_flag=1, it indicates that the advanced temporal motion vector prediction mode is present in the subblock merge prediction mode. In this case, the first number is equal to 0. For example, the maximum number of motion vectors that are supported in prediction performed by using the ATMVP mode may be 1. In this case, the first number may be equal to a value of the third indicator. For details, refer to the descriptions in the embodiment corresponding to FIG. 9. The details are not described herein again.

In a possible example, when the first indicator indicates that the candidate mode used to inter predict the to-be-processed block comprises the affine mode, the maximum length of the first candidate motion vector list may be obtained according to the following formula:

MaxNumSubblockMergeCand=$K$-$K$_minus_
max_num_subblock_merge_cand-$L1$, where MaxNumSubblockMergeCand represents the maximum length of the first candidate motion vector list, K_minus_max_num_subblock_merge_cand represents the second indicator, L1 represents the first number, and K is a preset non-negative integer.

For example, a value of K_minus_max_num_subblock_merge_cand may be allowed to be in a range of 0 to 3.

For example, a maximum value of MaxNumSubblockMergeCand is allowed to be 5.

When the maximum value of MaxNumSubblockMergeCand is allowed to be 5, the second indicator may be represented by five_minus_max_num_subblock_merge_cand.

In an example, L1 may be obtained according to the following formula:

$L1$=sps_sbtmvp_enabled_flag==1?0:1. If
sps_sbtmvp_enabled_flag=1, $L1$=0. If
sps_sbtmvp_enabled_flag=0, $L1$=1.

S1004: For details of S1004, refer to S904. The details are not described herein again.

That the maximum value of MaxNumSubblockMergeCand is allowed to be 5 is used as an example. If sps_affine_enable_flag=0, MaxNumSubblockMergeCand is obtained according to the following formula:

MaxNumSubblockMergeCand=sps_sbtmvp_enabled_flag.

If sps_affine_enable_flag=1, MaxNumSubblockMergeCand is obtained according to the following formula:

MaxNumSubblockMergeCand=5-five_minus_
max_num_subblock_merge_cand-
(sps_sbtmvp_enabled_flag==1?0:1).

For example, five_minus_max_num_subblock_merge_cand may be defined as subtracting a maximum length of a subblock-based merging motion vector prediction list in a slice from 5 (five_minus_max_num_subblock_merge_cand specifies the maximum number of subblock-based merging motion vector prediction (MVP) candidates supported in the slice subtracted from 5). The maximum number of subblock-based merging MVP candidates, MaxNumSubblockMergeCand, is derived as follows:

If sps_affine_enabled_flag is equal to 0:

MaxNumSubblockMergeCand=sps_sbtmvp_enabled_flag;

Otherwise (sps_affine_enabled_flag is equal to 1):

MaxNumSubblockMergeCand=5-five_minus_
max_num_subblock_merge_cand-
(sps_sbtmvp_enabled_flag==1?0:1).

A value of MaxNumSubblockMergeCand shall be in a range of 0 to 5, inclusive.

Figure 11:
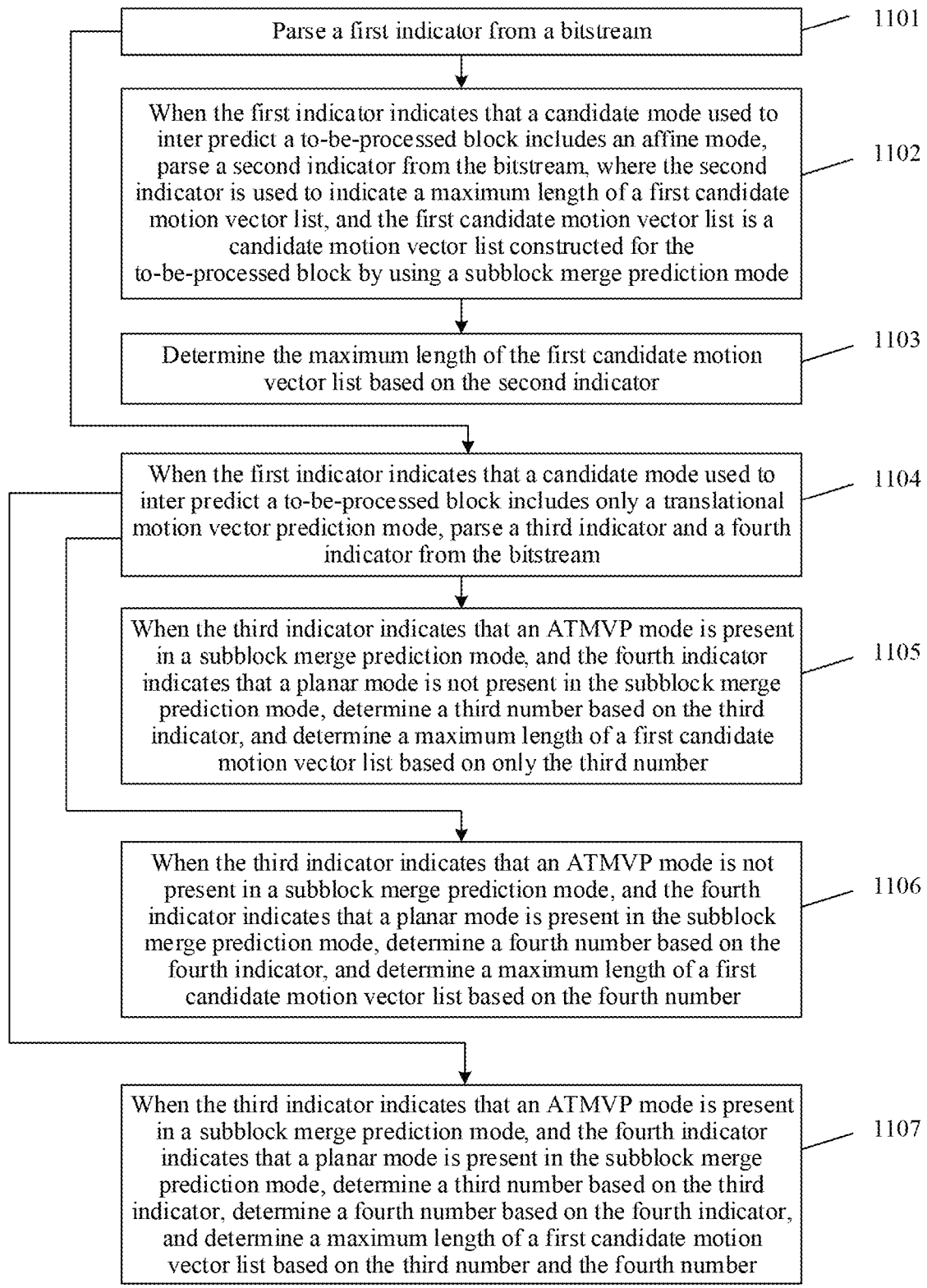
FIG. 11 is a schematic flowchart of still another video picture prediction method for implementing embodiments of this application.

FIG. 11 shows descriptions of the third implementation according to some embodiments.

Operations S1101 to S1103: For details of S1101 to S1103, refer to S901 to S903. The details are not described herein again.

It should be noted that, in the third implementation, a maximum value of MaxNumSubblockMergeCand may be allowed to be 5. For example, the second indicator may be represented by K_minus_max_num_subblock_merge_cand, where a value of K_minus_max_num_subblock_merge_cand is allowed to be in a range of 0 to 4. When the maximum value of MaxNumSubblockMergeCand is allowed to be 5, the second indicator may be represented by five_minus_max_num_subblock_merge_cand.

Operation S1104: When the first indicator indicates that the candidate mode used to inter predict the to-be-processed block comprises only the translational motion vector prediction mode, parse a third indicator and a fourth indicator from the bitstream. Perform operation S1105, S1106, or S1107.

The third indicator is used to indicate a presence state of the ATMVP mode in the subblock merge prediction mode. For related descriptions of the third indicator, refer to the descriptions in the embodiment corresponding to FIG. 9. Details are not described herein again.

The fourth indicator is used to indicate a presence state of the translational (PLANAR) motion vector prediction mode in the subblock merge prediction mode. In other words, the fourth indicator is used to indicate whether the planar mode is allowed to be used to inter predict the to-be-processed block.

Operation S1105: When the third indicator indicates that the ATMVP mode is present in the subblock merge prediction mode, and the fourth indicator indicates that the planar mode is not present in the subblock merge prediction mode, determine a third number based on the third indicator, and determine the maximum length of the first candidate motion vector list based on only the third number.

For example, when the fourth indicator is a third value, it indicates that the planar mode is not present in the subblock merge prediction mode; or when the fourth indicator is a fourth value, it indicates that the planar mode is present in the subblock merge prediction mode. For example, the third value is equal to 0, and the fourth value is equal to 1. For example, the fourth indicator may be configured in an SPS, a PPS, or a slice header. The fourth indicator may be represented by sps_planar_enabled_flag.

Operation S1106: When the third indicator indicates that the ATMVP mode is not present in the subblock merge prediction mode, and the fourth indicator indicates that the planar mode is present in the subblock merge prediction mode, determine a fourth number based on the fourth indicator, and determine the maximum length of the first candidate motion vector list based on the fourth number.

For example, when the fourth indicator indicates that the planar mode is present in the subblock merge prediction mode, the fourth number is equal to the maximum number of motion vectors that are supported in prediction performed by using the planar mode.

For example, in operation S1106, the maximum length of the first candidate motion vector list is equal to the fourth number. For example, if the maximum number of motion vectors that are supported in prediction performed by using the planar mode is 1, the maximum length of the first candidate motion vector list is 1. For another example, when the fourth indicator is 1, it indicates that the planar mode is present in the subblock merge prediction mode. In this case, the maximum length of the first candidate motion vector list is equal to the fourth indicator.

Operation S1107: When the third indicator indicates that the ATMVP mode is present in the subblock merge prediction mode, and the fourth indicator indicates that the planar mode is present in the subblock merge prediction mode, determine a third number based on the third indicator, determine a fourth number based on the fourth indicator, and determine the maximum length of the first candidate motion vector list based on the third number and the fourth number.

In an example, when the first indicator indicates that the candidate mode used to inter predict the to-be-processed block only comprises the translational motion vector prediction mode, the maximum number of motion vectors that are supported in prediction performed by using the planar mode is 1, and the maximum number of motion vectors that are supported in prediction performed by using in the ATMVP mode is 1, if the third indicator is 1, it indicates that the ATMVP mode is present in the subblock merge prediction mode; or if the third indicator is 0, it indicates that the ATMVP mode is not present in the subblock merge prediction mode; and if the fourth indicator is 1, it indicates that the PLANAR mode is present in the subblock merge prediction mode; or if the fourth indicator is 0, it indicates that the planar mode is present in the subblock merge prediction mode. In this case, the maximum length of the first candidate motion vector list may be equal to a sum of the third indicator and the fourth indicator.

The third indicator is represented by sps_sbtmvp_enabled_flag, and the fourth indicator is represented by sps_planar_enabled_flag. The maximum length of the first candidate motion vector list may be obtained according to the following formula:

MaxNumSubblockMergeCand=sps_sbtmvp_enabled_flag+sps_planar_enabled_flag.

When sps_sbtmvp_enabled_flag=1 (indicating that the ATMVP mode is present in the subblock merge prediction mode), and sps_planar_enabled_flag=0 (indicating that the planar mode is not present in the subblock merge prediction mode), MaxNumSubblockMergeCand=sps_sbtmvp_enabled_flag=1, which corresponds to operation S1105. When sps_sbtmvp_enabled_flag=0 (indicating that the ATMVP mode is not present in the subblock merge prediction mode), and sps_planar_enabled_flag=1 (indicating that the planar mode is present in the subblock merge prediction mode), MaxNumSubblockMergeCand=sps_planar_enabled_flag=1, which corresponds to operation S1106. When sps_sbtmvp_enabled_flag=1, and sps_planar_enabled_flag=1, MaxNumSubblockMergeCand=sps_sbtmvp_enabled_flag+sps_planar_enabled_flag=2, which corresponds to operation S1107.

Certainly, when the first indicator indicates that the candidate mode used to inter predict the to-be-processed block only comprises the translational motion vector prediction mode, the third indicator indicates that the ATMVP mode is not present in the subblock merge prediction mode, and the fourth indicator indicates that the planar mode is not present in the subblock merge prediction mode, MaxNumSubblockMergeCand=0.

That the maximum value of MaxNumSubblockMergeCand is allowed to be 5 is used as an example.

If sps_affine_enable_flag=0, MaxNumSubblockMergeCand is obtained according to the following formula:

MaxNumSubblockMergeCand-sps_sbtmvp_enabled_flag+sps_planar_enabled_flag.

If sps_affine_enable_flag=1, MaxNumSubblockMergeCand is obtained according to the following formula:

MaxNumSubblockMergeCand=5-five_minus_max_num_subblock_merge_cand.

For example, five_minus_max_num_subblock_merge_cand may be defined as subtracting a maximum length of a subblock-based merging motion vector prediction list in a slice from 5 (five_minus_max_num_subblock_merge_cand specifies the maximum number of subblock-based merging motion vector prediction (MVP) candidates supported in the slice subtracted from 5).

The maximum number of subblock-based merging MVP candidates, MaxNumSubblockMergeCand, is derived as follows:

If sps_affine_enabled_flag is equal to 0:

MaxNumSubblockMergeCand=sps_sbtmvp_enabled_flag+sps_planar_enabled_flag;

Otherwise (sps_affine_enabled_flag is equal to 1):

MaxNumSubblockMergeCand=5-five_minus_max_num_subblock_merge_cand.

A value of MaxNumSubblockMergeCand shall be in a range of 0 to 5, inclusive.

Figure 12A:
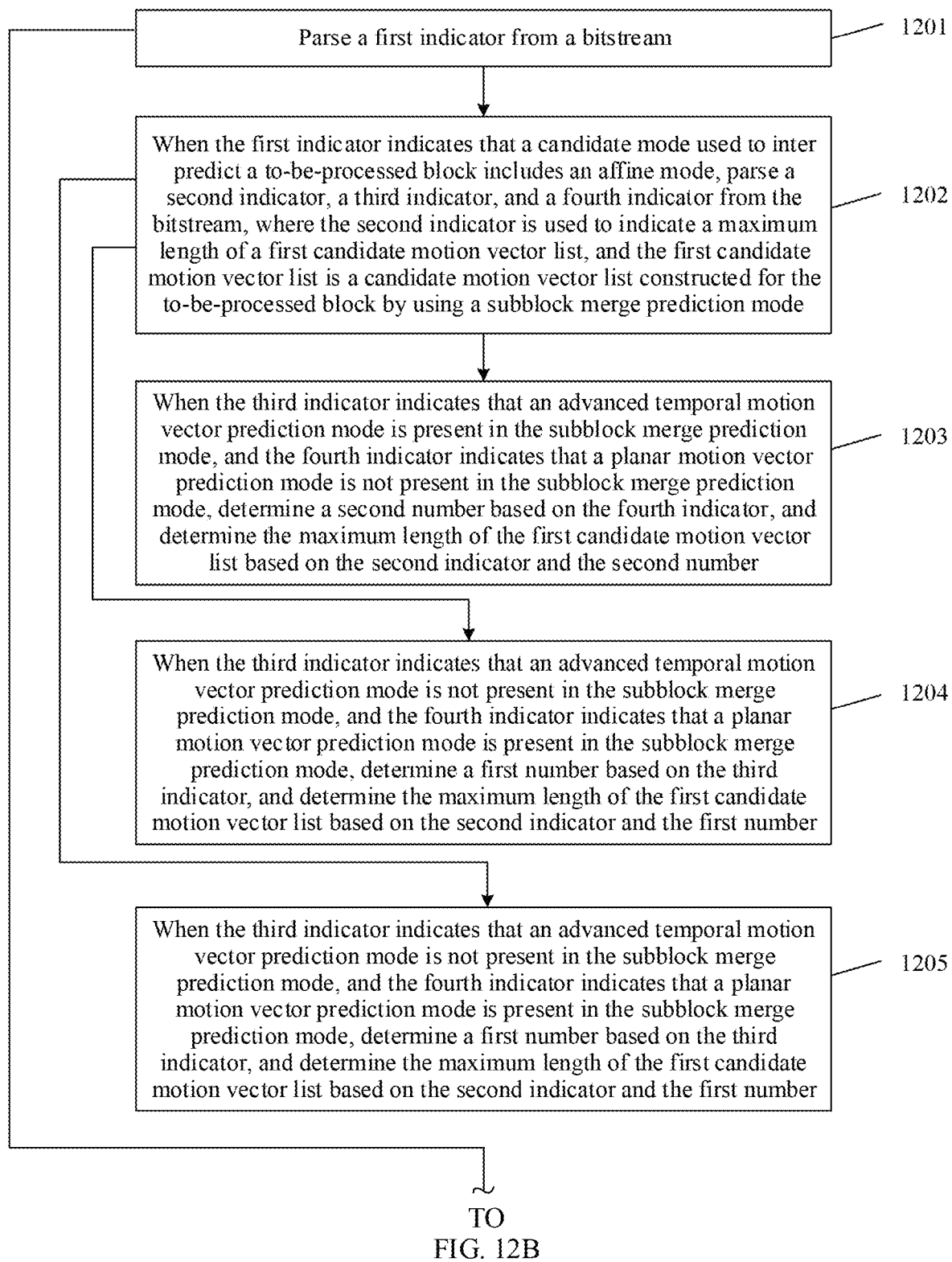
FIG. 12A and FIG. 12B is a schematic flowchart of yet another video picture prediction method for implementing embodiments of this application.
Figure 12B:
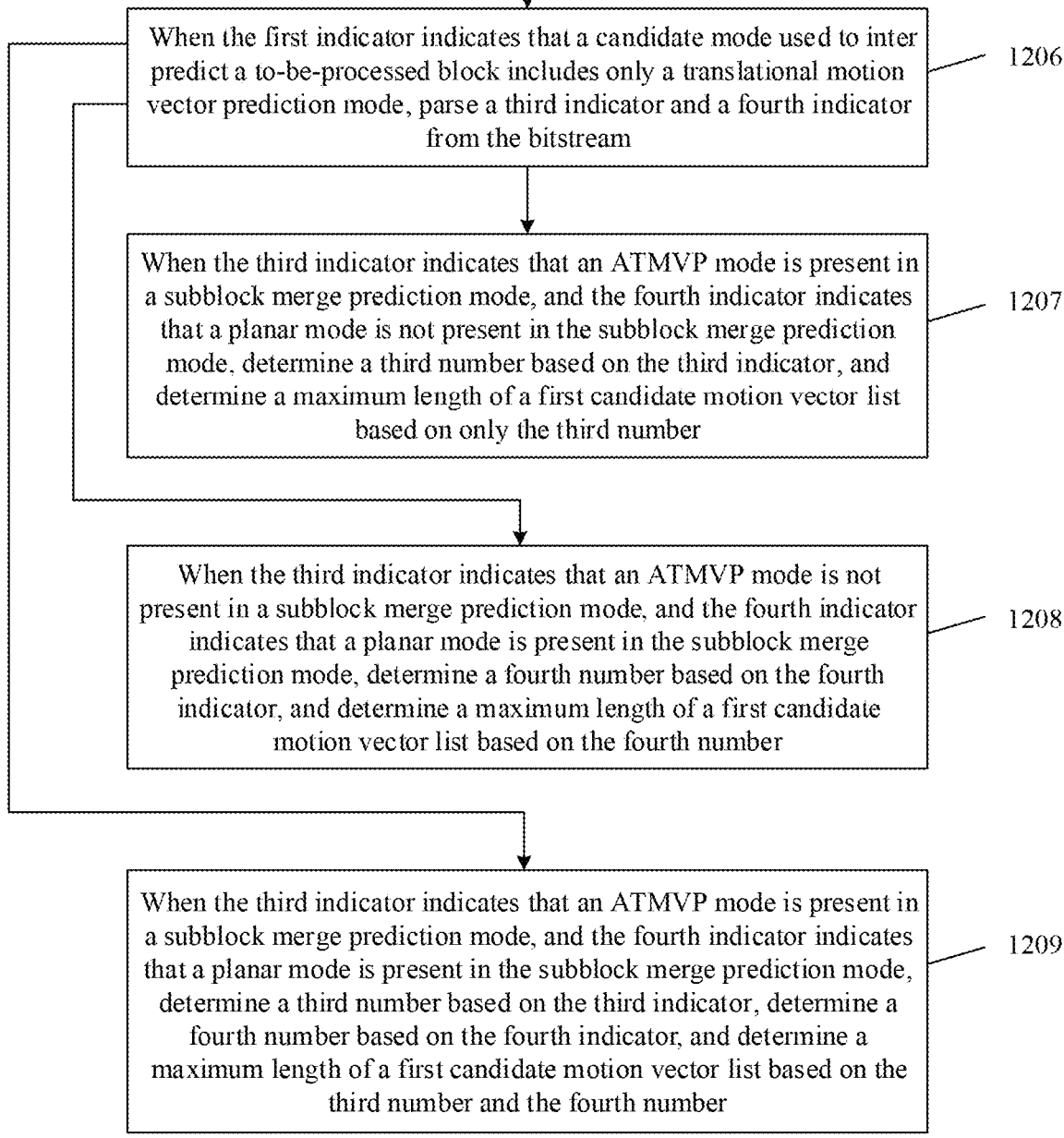

FIG. 12A and FIG. 12B shows descriptions of the fourth implementation according to some embodiments.

Operation S1201: For details of operation S1201, refer to operation S901. The details are not described herein again. Perform operation S1202 or S1206.

Operation S1202: When the first indicator indicates that the candidate mode used to inter predict the to-be-processed block comprises the affine mode, parse a second indicator, a third indicator, and a fourth indicator from the bitstream, where the second indicator is used to indicate (or determine) a maximum length of a first candidate motion vector list, and the first candidate motion vector list is a candidate motion vector list constructed for the to-be-processed block by using a subblock merge prediction mode. Perform S1203, S1204, or S1205.

Operation S1203: When the third indicator indicates that the advanced temporal motion vector prediction mode is present in the subblock merge prediction mode, and the fourth indicator indicates that the planar motion vector prediction mode is not present in the subblock merge prediction mode, determine a second number based on the fourth indicator, and determine the maximum length of the first candidate motion vector list based on the second indicator and the second number.

Operation S1204: When the third indicator indicates that the advanced temporal motion vector prediction mode is not present in the subblock merge prediction mode, and the fourth indicator indicates that the planar motion vector prediction mode is present in the subblock merge prediction mode, determine a first number based on the third indicator, and determine the maximum length of the first candidate motion vector list based on the second indicator and the first number.

Operation S1205: When the third indicator indicates that the advanced temporal motion vector prediction mode is not present in the subblock merge prediction mode, and the fourth indicator indicates that the planar motion vector prediction mode is not present in the subblock merge prediction mode, determine the first number based on the third indicator, determine a second number based on the fourth indicator, and determine the maximum length of the first candidate motion vector list based on the second indicator, the first number, and the second number.

When the fourth indicator indicates that the planar mode is not present in the subblock merge prediction mode, the second number may be equal to the maximum number of motion vectors that are supported in prediction performed by using the planar mode. For example, the fourth indicator may be represented by sps_planar_enabled_flag. When sps_planar_enabled_flag=0, it indicates that the planar motion vector prediction mode is not present in the subblock merge prediction mode. In this case, the second number is equal to the maximum number of motion vectors that are supported in prediction performed by using the ATMVP mode. On the contrary, when sps_planar_enabled_flag=1, it indicates that the planar motion vector prediction mode is present in the subblock merge prediction mode. In this case, the second number is equal to 0. For example, the maximum number of motion vectors that are supported in prediction performed by using the planar mode may be 1. In this case, the second number may be equal to a value of sps_planar_enabled_flag.

In a possible example, when the first indicator indicates that the candidate mode used to inter predict the to-be-processed block comprises the affine mode, the maximum length of the first candidate motion vector list may be obtained according to the following formula:

MaxNumSubblockMergeCand=K-K_minus_max_num_subblock_merge_cand-L1-L2,

For example, in the fourth implementation, a value of K_minus_max_num_subblock_merge_cand may be allowed to be in a range of 0 to 2 or 0 to 3.

For example, a maximum value of MaxNumSubblockMergeCand may be allowed to be 5 or 6.

When the maximum value of MaxNumSubblockMergeCand is allowed to be 5, the second indicator may be represented by five_minus_max_num_subblock_merge_cand. When the maximum value of MaxNumSubblockMergeCand is allowed to be 6, the second indicator may be represented by six_minus_max_num_subblock_merge_cand.

In an example, L1 may be obtained according to the following formula:

L1=sps_sbtmvp_enabled_flag==1?0:1. If sps_sbtmvp_enabled_flag=1, L1=0. If sps_sbtmvp_enabled_flag=0, L1=1.

In an example, L2 may be obtained according to the following formula:

L2=sps_planar_enabled_flag==1?0:1. If sps_planar_enabled_flag=1, L2=0. If sps_sbtmvp_enabled_flag=0, L2=1.

Operations S1206 to S1209: For details of operations S1206 to S1209, refer to operations S1104 to S1107. The details are not described herein again.

For example, the maximum value of MaxNumSubblockMergeCand may be allowed to be 5. A value of five_minus_max_num_subblock_merge_cand is in a range of 0 to 2.

If sps_affine_enable_flag=0, MaxNumSubblockMergeCand is obtained according to the following formula:

MaxNumSubblockMergeCand=sps_sbtmvp_enabled_flag+sps_planar_enabled_flag.

Otherwise, (if sps_affine_enable_flag=1), MaxNumSubblockMergeCand is obtained according to the following formula:

MaxNumSubblockMergeCand=5-five_minus_max_num_subblock_merge_cand-(sps_sbtmvp_enabled_flag==1?0:1)-(sps_planar_enabled_flag==1?0:1), where (five_minus_max_num_subblock_merge_cand specifies the maximum number of subblock-based merging motion vector prediction (MVP) candidates supported in the slice subtracted from 5), the maximum number of subblock-based merging MVP candidates, MaxNumSubblockMergeCand, is derived as follows:

If sps_affine_enabled_flag is equal to 0:

MaxNumSubblockMergeCand=sps_sbtmvp_enabled_flag+sps_planar_enabled_flag;

Otherwise (sps_affine_enabled_flag is equal to 1):

MaxNumSubblockMergeCand=5-five_minus_max_num_subblock_merge_cand-(sps_sbtmvp_enabled_flag==1?0:1)-(sps_planar_enabled_flag==1?0:1).

A value of MaxNumSubblockMergeCand shall be in a range of 0 to 5, inclusive.

For example, the maximum value of MaxNumSubblockMergeCand may be allowed to be 6. A value of five_minus_max_num_subblock_merge_cand is in a range of 0 to 3.

If sps_affine_enable_flag=0, MaxNumSubblockMergeCand is obtained according to the following formula:

MaxNumSubblockMergeCand=sps_sbtmvp_enabled_flag+sps_planar_enabled_flag;

Otherwise, (if sps_affine_enable_flag=1), MaxNumSubblockMergeCand is obtained according to the following formula:

MaxNumSubblockMergeCand=6-six_minus_max_num_subblock_merge_cand-(sps_sbtmvp_enabled_flag==1?0:1)-(sps_planar_enabled_flag==1?0:1).

where (six_minus_max_num_subblock_merge_cand specifies the maximum number of subblock-based merging motion vector prediction (MVP) candidates supported in the slice subtracted from 6), the maximum number of subblock-based merging MVP candidates, MaxNumSubblockMergeCand, is derived as follows:

If sps_affine_enabled_flag is equal to 0:

MaxNumSubblockMergeCand=sps_sbtmvp_enabled_flag+sps_planar_enabled_flag;

Otherwise (sps_affine_enabled_flag is equal to 1):

MaxNumSubblockMergeCand=6-six_minus_max_num_subblock_merge_cand-(sps_sbtmvp_enabled_flag==1?0:1)-(sps_planar_enabled_flag==1?0:1).

A value of MaxNumSubblockMergeCand shall be in a range of 0 to 6, inclusive.

For the second case, the planar motion vector prediction mode is not considered to be present in the subblock merge mode. In other words, when the subblock merge mode may comprise at least one of the affine mode and the advanced temporal motion vector prediction mode, the first implementation or the second implementation may be used. Details are not described herein again.

Figure 13:
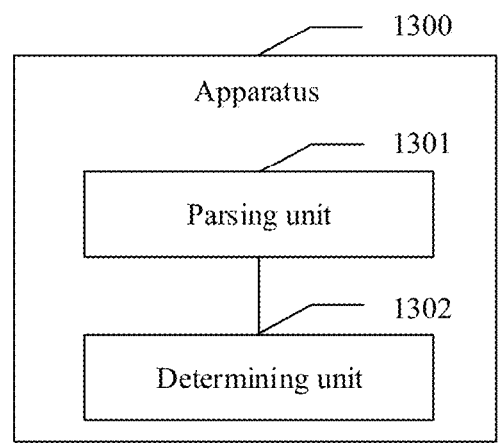
FIG. 13 is a schematic diagram of an apparatus 1300 for implementing embodiments of this application.

Based on a same inventive concept as the method embodiments, an embodiment of this application further provides an apparatus. As shown in FIG. 13, the apparatus 1300 may be specifically a processor in a video decoder, a chip, a chip system, or a module in a video decoder, for example, the entropy decoding unit 304 and/or the inter prediction unit 344.

For example, the apparatus may comprise a parsing unit 1301 and a determining unit 1302. The parsing unit 1301 and the determining unit 1302 perform the method operations described in the embodiments corresponding to FIG. 9 to FIG. 12A and FIG. 12B. For example, the parsing unit 1301 may be configured to parse indicators (for example, a first indicator, a second indicator, a third indicator, or a fourth indicator) comprised in a bitstream, and the determining unit 1302 is configured to determine a maximum length of a first candidate motion vector list.

Figure 14:
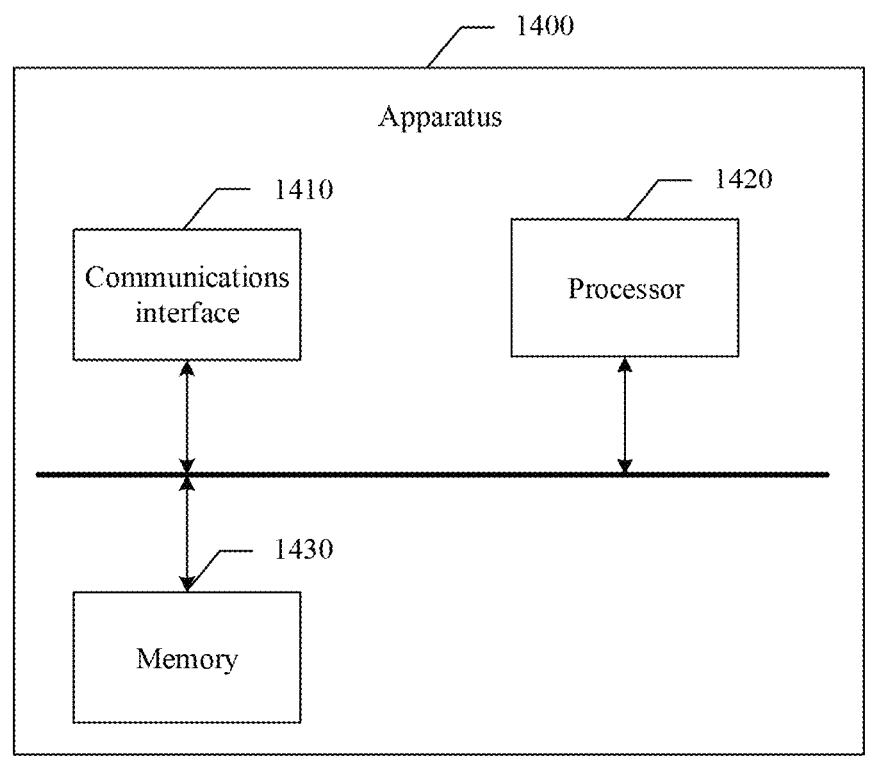
FIG. 14 is a schematic diagram of an apparatus 1400 for implementing embodiments of this application.

An embodiment of this application further provides another structure of an apparatus used in a decoder. As shown in FIG. 14, the apparatus 1400 may comprise a communications interface 1410 and a processor 1420. Optionally, the apparatus 1400 may further comprise a memory 1430. The memory 1430 may be disposed inside or outside the apparatus. Both the parsing unit 1301 and the determining unit 1302 shown in FIG. 13 may be implemented by the processor 1420. The processor 1420 sends or receives a video stream or a bitstream through the communications interface 1410, and is configured to implement the methods in FIG. 9 to FIG. 12A and FIG. 12B. In an implementation process, operations in a processing procedure may be performed by using an integrated logic circuit of hardware in the processor 1420 or an instruction in a form of software, to complete the methods in FIG. 9 to FIG. 12A and FIG. 12B.

The communications interface 1410 in this embodiment of this application may be a circuit, a bus, a transceiver, or any other apparatus that can be configured to exchange information. For example, the another apparatus may be a device connected to the apparatus 1400. For example, if the apparatus is a video encoder, the another apparatus may be a video decoder.

In this embodiment of this application, the processor 1420 may be a general-purpose processor, a digital signal processor, an application-specific integrated circuit, a field programmable gate array or another programmable logic device, a discrete gate or transistor logic device, or a discrete hardware component, and may implement or execute the methods, operations, and logic block diagrams disclosed in the embodiments of this application. The general-purpose processor may be a microprocessor, any conventional processor, or the like. The operations of the methods disclosed with reference to the embodiments of this application may be directly performed by a hardware processor, or may be performed by using a combination of hardware in the processor and a software unit. Program code executed by the processor 1420 to implement the foregoing methods may be stored in the memory 1430. The memory 1430 is coupled to the processor 1420.

The coupling in this embodiment of this application may be an indirect coupling or a communication connection between apparatuses, units, or modules in an electrical form, a mechanical form, or another form, and is used for information exchange between the apparatuses, the units, or the modules.

The processor 1420 may operate in collaboration with the memory 1430. The memory 1430 may be a nonvolatile memory, for example, a hard disk drive (HDD) or a solid-state drive (SSD), or may be a volatile memory, for example, a random-access memory (RAM). The memory 1430 is any other medium that can be configured to carry or store expected program code in a form of an instruction or a data structure and that can be accessed by a computer, but is not limited thereto.

In this embodiment of this application, a specific connection medium between the communications interface 1410, the processor 1420, and the memory 1430 is not limited. In this embodiment of this application, the memory 1430, the processor 1420, and the communications interface 1410 are connected through a bus in FIG. 14. The bus is represented by a thick line in FIG. 14. A connection mode between other components is merely schematically described, and is not limited thereto. The bus may be classified into an address bus, a data bus, a control bus, and the like. For ease of representation, only one thick line is used to represent the bus in FIG. 14, but this does not mean that there is only one bus or only one type of bus.

The foregoing feasible implementations and specific embodiments related to FIG. 9 to FIG. 12A and FIG. 12B provide descriptions of one or more video data decoding apparatuses in this application. It should be understood that, according to the foregoing descriptions, an encoder side usually determines an inter prediction mode and encodes the inter prediction mode in a bitstream. After an inter prediction mode is finally selected, an indicator (for example, the first indicator, the second indicator, the third indicator, or the fourth indicator described above) for the inter prediction mode is encoded in the bitstream by using an encoding process that is completely inverse to the foregoing decoding method (the encoding process corresponds to the decoding process of parsing the first indicator, the second indicator, the third indicator, or the fourth indicator). It should be understood that determining a maximum length of a first candidate motion vector list by the encoder side is completely consistent with that by the decoder side. A specific embodiment of the encoder side is not described. However, it should be understood that the video picture prediction method described in this application is also used in an encoding apparatus.

Figure 15:
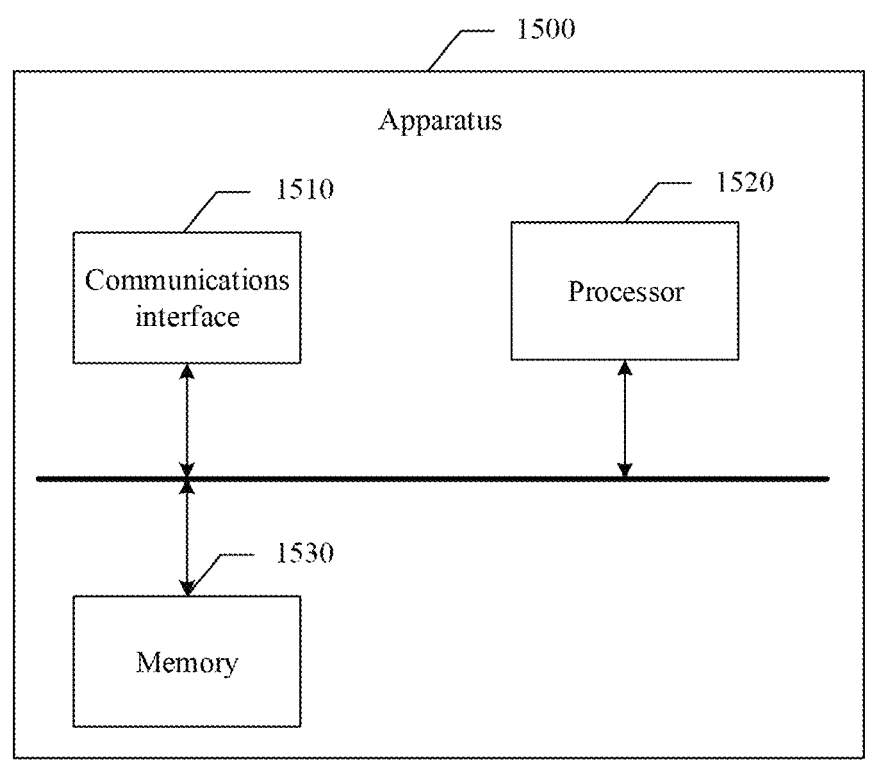
FIG. 15 is a schematic diagram of an apparatus 1500 for implementing embodiments of this application.

An embodiment of this application further provides an apparatus used in an encoder. As shown in FIG. 15, the apparatus 1500 may comprise a communications interface 1510 and a processor 1520. Optionally, the apparatus 1500 may further comprise a memory 1530. The memory 1530 may be disposed inside or outside the apparatus. The processor 1520 sends or receives a video stream or a bitstream through the communications interface 1510.

In one aspect, the processor 1520 is configured to: encode a first indicator in a bitstream; and when the first indicator indicates that a candidate mode used to inter predict the to-be-processed block comprises an affine mode, encode a second indicator in the bitstream, where the second indicator is used to indicate a maximum length of a first candidate motion vector list, and the first candidate motion vector list is a candidate motion vector list constructed for the to-be-processed block by using a subblock merge prediction mode.

The communications interface 1510 in this embodiment of this application may be a circuit, a bus, a transceiver, or any other apparatus that can be configured to exchange information. For example, the another apparatus may be a device connected to the apparatus 1500. For example, if the apparatus is a video encoder, the another apparatus may be a video decoder.

In this embodiment of this application, the processor 1520 may be a general-purpose processor, a digital signal processor, an application-specific integrated circuit, a field programmable gate array or another programmable logic device, a discrete gate or transistor logic device, or a discrete hardware component, and may implement or execute the methods, operations, and logic block diagrams disclosed in the embodiments of this application. The general-purpose processor may be a microprocessor, any conventional processor, or the like. The operations of the methods disclosed with reference to the embodiments of this application may be directly performed by a hardware processor, or may be performed by using a combination of hardware in the processor and a software unit. Program code executed by the processor 1520 to implement the foregoing methods may be stored in the memory 1530. The memory 1530 is coupled to the processor 1520.

The coupling in this embodiment of this application may be an indirect coupling or a communication connection between apparatuses, units, or modules in an electrical form, a mechanical form, or another form, and is used for information exchange between the apparatuses, the units, or the modules.

The processor 1520 may operate in collaboration with the memory 1530. The memory 1530 may be a nonvolatile memory, for example, a hard disk drive (HDD) or a solid-state drive (SSD), or may be a volatile memory, for example, a random-access memory (RAM). The memory 1530 is any other medium that can be configured to carry or store expected program code in a form of an instruction or a data structure and that can be accessed by a computer, but is not limited thereto.

In this embodiment of this application, a specific connection medium between the communications interface 1510, the processor 1520, and the memory 1530 is not limited. In this embodiment of this application, the memory 1530, the processor 1520, and the communications interface 1510 are connected through a bus in FIG. 15. The bus is represented by a thick line in FIG. 15. A connection mode between other components is merely schematically described, and is not limited thereto. The bus may be classified into an address bus, a data bus, a control bus, and the like. For ease of representation, only one thick line is used to represent the bus in FIG. 15, but this does not mean that there is only one bus or only one type of bus.

Based on the foregoing embodiments, an embodiment of this application further provides a computer storage medium. The storage medium stores a software program. When the software program is read and executed by one or more processors, the method provided in any one or more of the foregoing embodiments can be implemented. The computer storage medium may comprise any medium that can store program code, such as a USB flash drive, a removable hard disk, a read-only memory, a random access memory, a magnetic disk, or an optical disc.

Based on the foregoing embodiments, an embodiment of this application further provides a chip. The chip comprises a processor, configured to implement the functions in any one or more of the foregoing embodiments, for example, obtaining or processing information or a message used in the foregoing methods. Optionally, the chip further comprises a memory. The memory is configured to store a program instruction and data that are necessary and executed by the processor. The chip may comprise a chip, or may comprise a chip and another discrete device.

Although specific aspects of this application have been described with reference to the video encoder 20 and the video decoder 30, it should be understood that the technologies of this application may be used by many other video encoding and/or decoding units, processors, processing units, and hardware-based decoding units and the like, for example, encoders/decoders (CODEC). In addition, it should be understood that the operations described and shown in FIG. 8A to FIG. 12A and FIG. 12B are merely provided as feasible implementations. In other words, the operations described in the feasible implementations in FIG. 8A to FIG. 12A and FIG. 12B are not necessarily performed in the order shown in FIG. 8A to FIG. 12A and FIG. 12B, and fewer, additional, or alternative operations may be performed.

Further, it should be understood that depending on the feasible implementations, specific actions or events in any of the methods described in this specification may be performed in different orders, an action or event may be added, or the actions or events may be combined, or omitted (for example, not all of the described actions or events are necessary for implementing the methods). Further, in a particular feasible implementation, the actions or events may (for example) undergo multi-threading processing or interrupt processing, or may be processed by a plurality of processors simultaneously instead of sequentially. Further, although specific aspects of this application are described as being performed by a single module or unit for the purpose of clarity, it should be understood that the technologies of this application may be performed by a combination of units or modules associated with the video decoder.

In one or more feasible implementations, the described functions may be implemented by using hardware, software, firmware, or any combination thereof. If the functions are implemented by using software, the functions may be stored in a computer-readable medium as one or more instructions or code, or transmitted through a computer-readable medium and executed by a hardware-based processing unit. The computer-readable medium may comprise a computer-readable storage medium or a communications medium. The computer-readable storage medium corresponds to a tangible medium such as a data storage medium. The communications medium comprises any medium that facilitates transmission of a computer program (for example) from one location to another location according to a communications protocol.

In this manner, the computer-readable medium may correspond to, for example, (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may comprise a computer-readable medium.

By way of a feasible implementation rather than a limitation, the computer-readable storage medium may comprise a RAM, a ROM, an EEPROM, a CD-ROM or another optical disk storage apparatus, a magnetic disk storage apparatus or another magnetic storage apparatus, a flash memory, or any other medium that can be used to store required code in a form of an instruction or a data structure and that can be accessed by a computer. Likewise, any connection may be appropriately referred to as a computer-readable medium. For example, if an instruction is transmitted from a website, server, or another remote source through a coaxial cable, an optical fiber, a twisted pair, a digital subscriber line (DSL), or wireless technologies such as infrared, radio, and microwave, the coaxial cable, optical fiber, twisted pair, DSL, or wireless technologies such as infrared, radio, and microwave are comprised in a definition of medium.

However, it should be understood that the computer-readable storage medium and the data storage medium may not comprise a connection, a carrier, a signal, or another transitory medium, but alternatively mean non-transitory tangible storage media. A magnetic disk and an optical disc described in this specification comprise a compact disc (CD), a laser disc, an optical disc, a digital versatile disc (DVD), a floppy disk, and a Blu-ray disc. The magnetic disk usually reproduces data magnetically, and the optical disc reproduces data optically through a laser. A combination of the foregoing magnetic disk and optical disc shall also be comprised in a scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or another structure that is used to implement the technologies described in this specification. In addition, in some aspects, the functions described in this specification may be provided within dedicated hardware and/or software modules configured for encoding and decoding, or may be incorporated into a combined codec. Likewise, the technologies may all be implemented in one or more circuits or logic elements.

The technologies in this application may be implemented in various apparatuses or devices, including a wireless mobile phone, an integrated circuit (IC), or a set of ICs (for example, a chip set). Various components, modules, or units are described in this application to emphasize functional aspects of an apparatus configured to perform the disclosed technologies, but are not necessarily implemented by different hardware units. More precisely, as described above, various units may be combined into a codec hardware unit or provided by interoperable hardware units (including one or more processors described above) in combination with an appropriate software and/or firmware set.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A video picture prediction method for encoding, comprising:
   obtaining a first indicator;
   if a value of the first indicator is equal to a first value,
      obtaining a second indicator, wherein, the second indicator is used to indicate a maximum length of a first candidate motion vector list according to following formula: MaxNumSubblockMergeCand=K−K_minus_max_num_subblock_merge_cand, wherein MaxNumSubblockMergeCand represents the maximum length of the first candidate motion vector list, K_minus_max_num_subblock_merge_cand represents the second indicator, and K is a preset non-negative integer, wherein the first candidate motion vector list is constructed for a block to be processed when a subblock merge prediction mode is used for the block; and encoding the first indicator and second indicator in a bitstream;
   if the value of the first indicator is equal to a second value,
      obtaining a third indicator, wherein, the third indicator is used to indicate the maximum length of the first candidate motion vector list, the second value is different from the first value; and encoding the first indicator and third indicator in the bitstream.

2. The method of claim 1, wherein
the maximum length of the first candidate motion vector list is 0, if a value of the third indicator is 0.

3. The method of claim 1, wherein
determining the maximum length of the first candidate motion vector list is 1, if a value of the third indicator is 1.

4. The method of claim 3, wherein
the value of the third indicator being 1 indicates that an advanced temporal motion vector prediction mode is present in the subblock merge prediction mode.

5. The method of claim 2, wherein
the value of the third indicator being 0 indicates that an advanced temporal motion vector prediction mode is not present in the subblock merge prediction mode.

6. The method of claim 4, wherein
the advanced temporal motion vector prediction mode is a prediction mode based on temporal motion vector of subblock.

7. The method of claim 1, wherein
the value of the first indicator indicates whether a candidate mode used to inter predict the block comprises an affine mode.

8. The method of claim 1, wherein
the first value is 1, the second value is 0.

9. A video encoder comprising:
   one or more processors; and
   a non-transitory computer-readable storage medium coupled to the processors and storing programming for execution by the processors, wherein the programming, when executed by the processors, configures the encoder to carry out operations comprising:
      obtaining a first indicator;
      if a value of the first indicator is equal to a first value,
         obtaining a second indicator, wherein, the second indicator is used to indicate a maximum length of a first candidate motion vector list according to following formula: MaxNumSubblockMergeCand-K-K_minus_max_num_subblock_merge_cand, wherein MaxNumSubblockMergeCand represents the maximum length of the first candidate motion vector list, K_minus_max_num_subblock_merge_cand represents the second indicator, and K is a preset non-negative integer, wherein the first candidate motion vector list is constructed for a block to be processed when a subblock merge prediction mode is used for the block; and encoding the first indicator and second indicator in a bitstream;
      if the value of the first indicator is equal to a second value,
         obtaining a third indicator, wherein, the third indicator is used to indicate the maximum length of the first candidate motion vector list, the second value is different from the first value; and encoding the first indicator and third indicator in the bitstream.

10. The encoder of claim 9, wherein
the maximum length of the first candidate motion vector list is 0, if a value of the third indicator is 0.

11. The encoder of claim 9, wherein
the maximum length of the first candidate motion vector list is 1, if a value of the third indicator is 1.

12. The encoder of claim 11, wherein
the value of the third indicator being 1 indicates that an advanced temporal motion vector prediction mode is present in the subblock merge prediction mode.

13. The encoder of claim 10, wherein
the value of the third indicator being 0 indicates that an advanced temporal motion vector prediction mode is not present in the subblock merge prediction mode.

14. The encoder of claim 12, wherein
the advanced temporal motion vector prediction mode is a prediction mode based on temporal motion vector of subblock.

15. The encoder of claim 9, wherein
the value of the first indicator indicates whether a candidate mode used to inter predict the block comprises an affine mode.

16. The encoder of claim 9, wherein
the first value is 1, the second value is 0.

17. A computer program product comprising:
a program code for performing the method according to claim 1 when executed on a computer or a processor.

18. A video data encoding device, comprising:
an encoder, configured to perform the method according to the claim 1; and
a non-transitory memory storage, configured to store the bitstream.

* * * * *

UNITED STATES PATENT AND TRADEMARK OFFICE
CERTIFICATE OF CORRECTION

PATENT NO. : 12,273,507 B2
APPLICATION NO. : 18/527914
DATED : April 8, 2025
INVENTOR(S) : Huanbang Chen and Haitao Yang Page 1 of 1

It is certified that error appears in the above-identified patent and that said Letters Patent is hereby corrected as shown below:

In the Claims

In Column 68, Claim 9, Line 27-28, delete "MaxNumSubblockMergeCand--K_minus_max_num_subblock_merge_cand" and insert --MaxNumSubblockMergeCand=K--K_minus_max_num_subblock_merge_cand--.

Signed and Sealed this
Seventeenth Day of June, 2025

Coke Morgan Stewart
*Acting Director of the United States Patent and Trademark Office*